US012688166B2

(12) United States Patent
Chang et al.

(10) Patent No.: US 12,688,166 B2
(45) Date of Patent: Jul. 21, 2026

(54) MACHINE LEARNING TECHNIQUES FOR DISCOVERING KEYS IN RELATIONAL DATASETS

(71) Applicant: Ab Initio Technology LLC, Lexington, MA (US)

(72) Inventors: Andrew Chang, Westford, MA (US); Richard Oberdorf, Spokane, WA (US); Song Wang, Westford, MA (US); Nathan Smith, Signal Mountain, TN (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/783,851

(22) Filed: Jul. 25, 2024

(65) Prior Publication Data

US 2025/0036602 A1     Jan. 30, 2025

Related U.S. Application Data

(60) Provisional application No. 63/516,447, filed on Jul. 28, 2023.

(51) Int. Cl.
| | |
|---|---|
| *G06F 16/21* | (2019.01) |
| *G06F 16/22* | (2019.01) |
| *G06F 40/30* | (2020.01) |

(52) U.S. Cl.
CPC ........ *G06F 16/211* (2019.01); *G06F 16/2282* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 8,386,529 B2 | 2/2013 | Chaudhuri et al. | |
| 10,379,995 B1 * | 8/2019 | Walters | G06F 17/16 |

(Continued)

FOREIGN PATENT DOCUMENTS

WO      WO 2018/013318 A1      1/2018

OTHER PUBLICATIONS

Artificial Intelligence and Machine Learning for Lead-to-Candidate Decision-Making and Beyond (Year: 2023).*

(Continued)

*Primary Examiner* — Kim T Nguyen

(74) *Attorney, Agent, or Firm* — Wolf, Greenfield & Sacks, P.C.

(57) ABSTRACT

Techniques for discovering primary, unique, and/or foreign keys for relational datasets are described. The techniques include profiling the relational datasets to obtain respective data profiles; identifying one or more primary key candidates for a first relational dataset using a first data profile of the first relational dataset and a first trained machine learning model; identifying one or more foreign key proposals for a second relational dataset using the one or more primary key candidates by performing a subset analysis of the second relational dataset with respect to the first relational dataset; identifying one or more foreign key candidates for the second relational dataset using the first data profile, a second data profile of the second relational dataset, and a second trained machine learning model different from the first trained machine learning model; and outputting the at primary key candidate(s) and the foreign key candidate(s).

20 Claims, 31 Drawing Sheets

(56) References Cited

U.S. PATENT DOCUMENTS

| | | | | |
|---|---|---|---|---|
| 10,452,455 | B1 * | 10/2019 | Walters ................... | G06F 18/22 |
| 10,459,954 | B1 * | 10/2019 | Walters ................... | G06F 18/24 |
| 10,489,384 | B2 | 11/2019 | Gould et al. | |
| 11,526,809 | B2 | 12/2022 | Xu et al. | |
| 11,876,875 | B2 * | 1/2024 | Banerjee ................. | H04L 41/06 |
| 12,292,863 | B2 * | 5/2025 | Filho ..................... | G06F 16/288 |
| 2014/0280151 | A1 | 9/2014 | Micaelian | |
| 2018/0018579 | A1 | 1/2018 | Xu et al. | |
| 2020/0380212 | A1 | 12/2020 | Butler et al. | |
| 2020/0387924 | A1 * | 12/2020 | Patel .................. | G06Q 30/0242 |
| 2021/0155221 | A1 * | 5/2021 | Gottehrer ............. | B60W 20/40 |
| 2022/0147529 | A1 | 5/2022 | Egenolf et al. | |
| 2023/0013479 | A1 * | 1/2023 | Sankaranarayanan ....................... | |
| | | | | G06N 20/00 |
| 2023/0065616 | A1 * | 3/2023 | Sankaranarayanan ....................... | |
| | | | | G06F 16/213 |
| 2023/0113327 | A1 * | 4/2023 | Banerjee .............. | H04L 67/147 |
| | | | | 709/226 |
| 2023/0120592 | A1 * | 4/2023 | Deshwal .......... | G06F 16/24528 |
| | | | | 707/760 |
| 2023/0185777 | A1 * | 6/2023 | Matety .................. | G06N 5/025 |
| | | | | 707/760 |
| 2024/0095219 | A1 * | 3/2024 | Joyce ................... | G06F 16/211 |
| 2024/0296376 | A1 * | 9/2024 | Sinha ..................... | G06N 20/00 |
| 2024/0296400 | A1 * | 9/2024 | Sinha .............. | G06Q 10/06315 |
| 2024/0320224 | A1 * | 9/2024 | Parks ............... | G06F 16/24568 |
| 2025/0036602 | A1 * | 1/2025 | Chang .................. | G06F 16/211 |
| 2025/0103582 | A1 * | 3/2025 | Bailey ................ | G06F 16/2365 |
| 2025/0208838 | A1 * | 6/2025 | Radivojevic ........ | G06F 3/04842 |

OTHER PUBLICATIONS

Prediction of Candidate Primary Immunodeficiency Disease Genes Using a Support Vector Machine Learning Approach (Year: 2009).*

International Search Report and Written Opinion for International Application No. PCT/US2024/039543 mailed Nov. 13, 2024.

Flach et al., Database dependency discovery: a machine learning approach. AI communications. Jan. 1, 1999;12(3). 22 pages.

Hofmann, Tracer: a machine learning approach to data lineage (Doctoral dissertation, Massachusetts Institute of Technology). May 20, 2020. 79 pages.

Huhtala et al., TANE: An efficient algorithm for discovering functional and approximate dependencies. The computer journal. Jan. 1999;42(2):100-11.

Papenbrock et al., A hybrid approach to functional dependency discovery. Proceedings of the 2016 International Conference on Management of Data Jun. 14, 2016:821-33.

Papenbrock et al., A hybrid approach for efficient unique col. combination discovery. Datenbanksysteme fur Business, Technologie und Web (BTW 2017). 10 pages.

Rostin et al., A machine learning approach to foreign key discovery. WebDB Jun. 28, 2009. 7 pages.

International Preliminary Report on Patentability mailed Feb. 12, 2026 in connection with International Application No. PCT/US2024/039543.

* cited by examiner

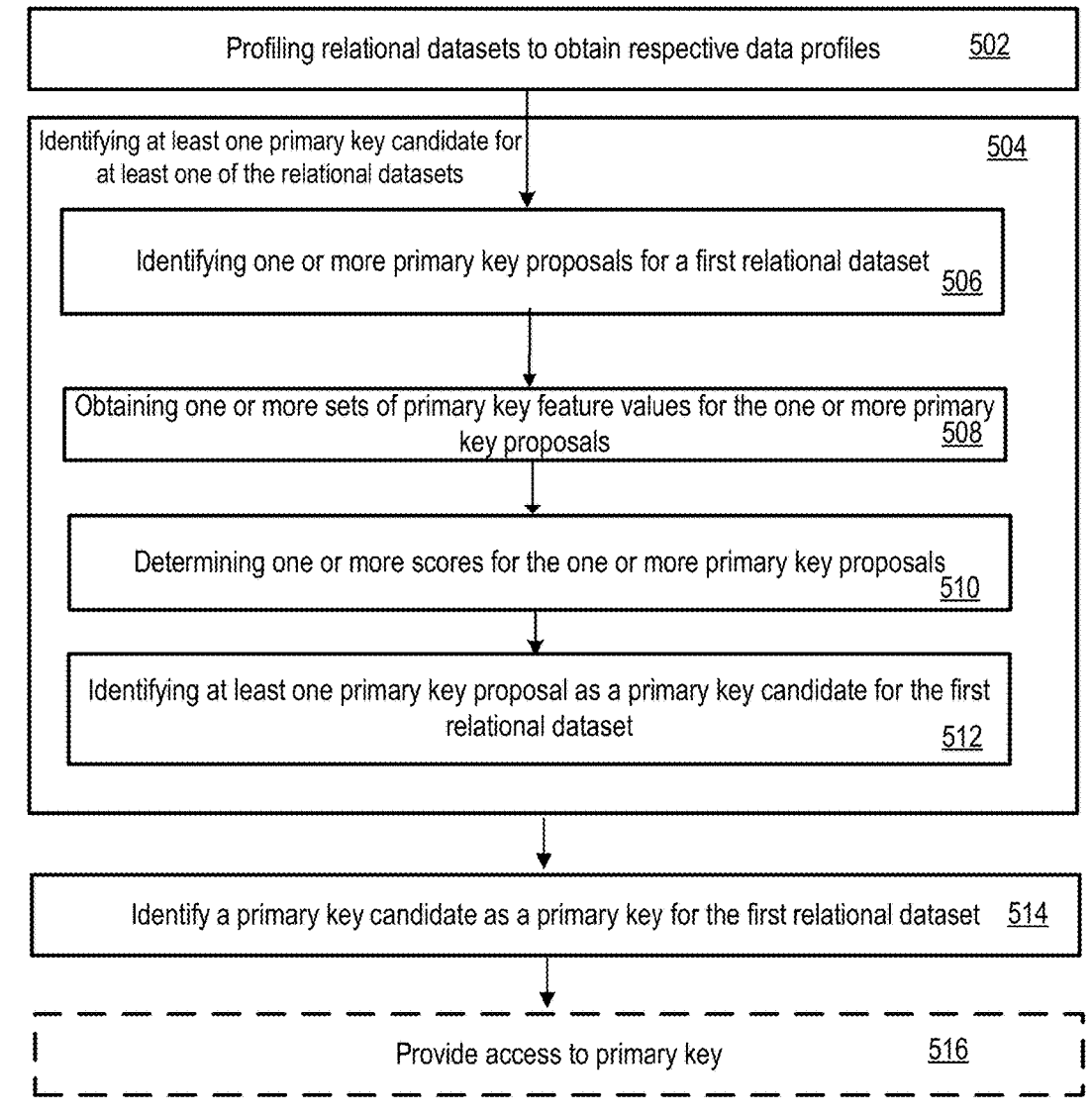

500

Profiling relational datasets to obtain respective data profiles     502

Identifying at least one primary key candidate for at least one of the relational datasets     504

Identifying one or more primary key proposals for a first relational dataset     506

Obtaining one or more sets of primary key feature values for the one or more primary key proposals     508

Determining one or more scores for the one or more primary key proposals     510

Identifying at least one primary key proposal as a primary key candidate for the first relational dataset     512

Identify a primary key candidate as a primary key for the first relational dataset     514

Provide access to primary key     516

FIG. 5A

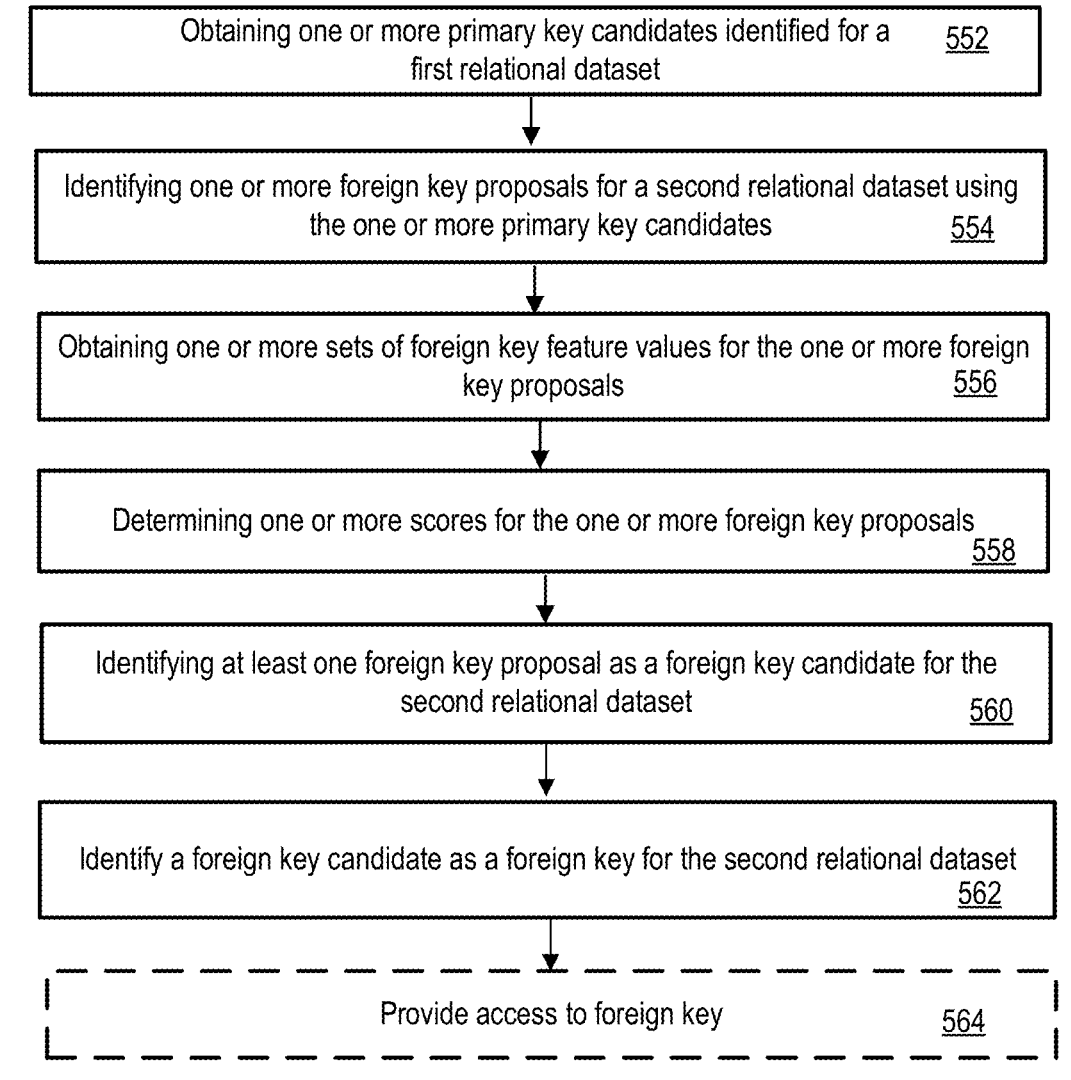

550

Obtaining one or more primary key candidates identified for a        552
first relational dataset Identifying one or more foreign key proposals for a second relational dataset using
the one or more primary key candidates        554

Obtaining one or more sets of foreign key feature values for the one or more foreign
key proposals        556

Determining one or more scores for the one or more foreign key proposals
558

Identifying at least one foreign key proposal as a foreign key candidate for the
second relational dataset        560

Identify a foreign key candidate as a foreign key for the second relational dataset
562

Provide access to foreign key        564

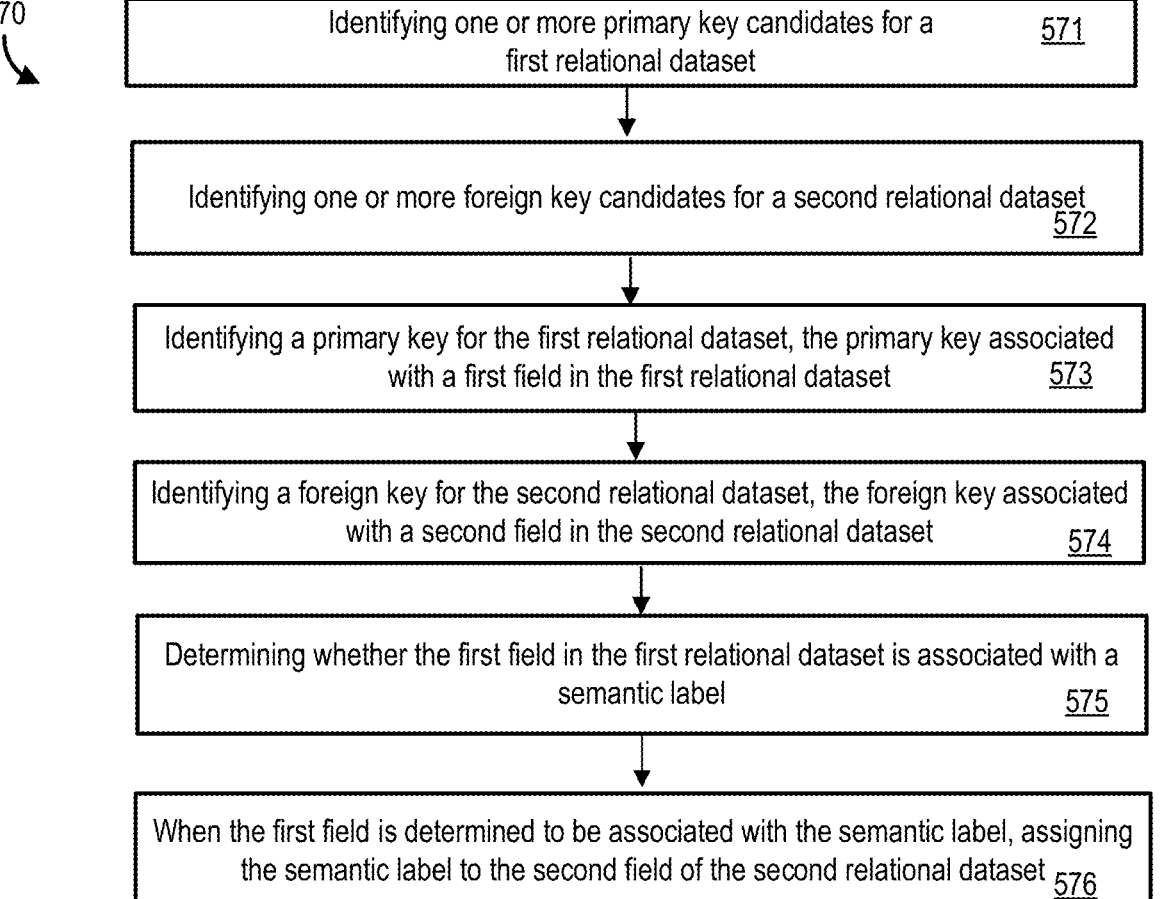

Identifying one or more primary key candidates for a first relational dataset    571

Identifying one or more foreign key candidates for a second relational dataset 572

Identifying a primary key for the first relational dataset, the primary key associated with a first field in the first relational dataset    573

Identifying a foreign key for the second relational dataset, the foreign key associated with a second field in the second relational dataset    574

Determining whether the first field in the first relational dataset is associated with a semantic label    575

When the first field is determined to be associated with the semantic label, assigning the semantic label to the second field of the second relational dataset 576

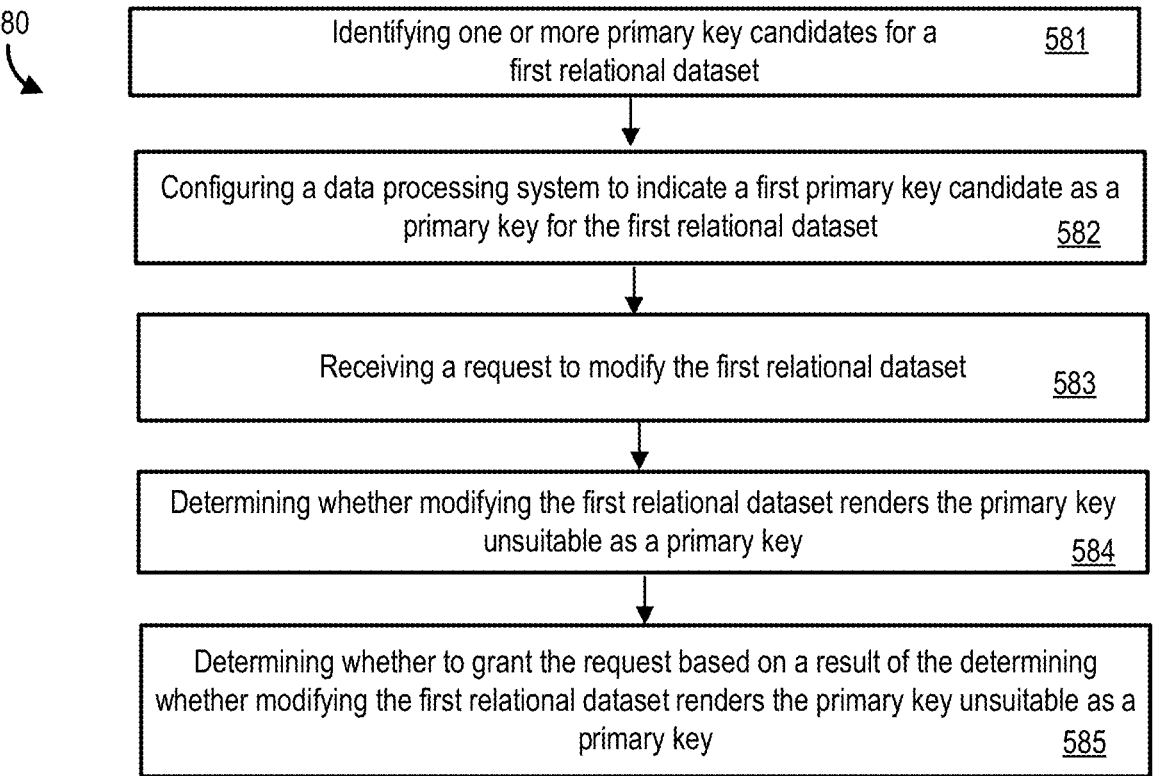

Identifying one or more primary key candidates for a first relational dataset          581

Configuring a data processing system to indicate a first primary key candidate as a primary key for the first relational dataset          582

Receiving a request to modify the first relational dataset          583

Determining whether modifying the first relational dataset renders the primary key unsuitable as a primary key          584

Determining whether to grant the request based on a result of the determining whether modifying the first relational dataset renders the primary key unsuitable as a primary key          585

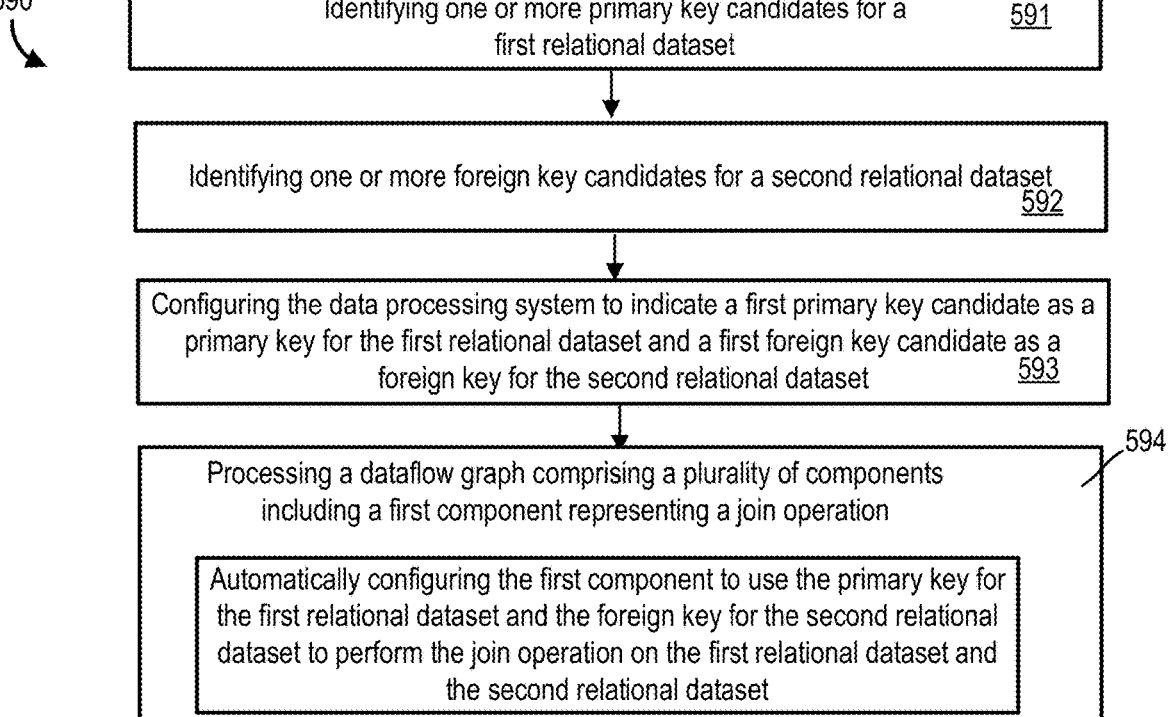

Identifying one or more primary key candidates for a
first relational dataset        591

Identifying one or more foreign key candidates for a second relational dataset
592

Configuring the data processing system to indicate a first primary key candidate as a
primary key for the first relational dataset and a first foreign key candidate as a
foreign key for the second relational dataset        593

594

Processing a dataflow graph comprising a plurality of components
including a first component representing a join operation Automatically configuring the first component to use the primary key for
the first relational dataset and the foreign key for the second relational
dataset to perform the join operation on the first relational dataset and
the second relational dataset

FIG. 5E

MACHINE LEARNING TECHNIQUES FOR DISCOVERING KEYS IN RELATIONAL DATASETS

RELATED APPLICATIONS

This application claims the benefit of priority under 35 U.S.C. 119 (e) to U.S. Provisional Patent Application Ser. No. 63/516,447, filed on Jul. 28, 2023, titled "Machine Learning Techniques for Discovering Keys in Relational Datasets," which is hereby incorporated by reference herein in its entirety.

BACKGROUND

In a wide variety of databases and other data store solutions, data is stored in relational datasets. A relational dataset includes records and records include fields storing respective values. A table is an example of a relational dataset. Rows of a table may represent records and columns may represent fields (or vice versa).

A relational dataset may have a primary key, one or more unique keys, and one or more foreign keys. One or more fields (e.g., one or more columns) that uniquely identify each row of a relational dataset and do not contain null or blank values may serve as a primary key for that relational dataset. A relational dataset can have only one primary key. A field of a relational dataset which does not contain duplicate values, but can contain one null or blank value, may serve as a unique key for the relational dataset. A relational dataset can have multiple unique keys. A foreign key is a field in a first relational dataset that refers to a field in a second relational dataset. The foreign key values typically refer to primary key or unique key values in the second relational dataset. A foreign key can refer to fields in different relational datasets. Therefore, a relational dataset can have multiple foreign keys.

SUMMARY

Some embodiments are directed to a method for discovering keys in relational datasets. The method comprises using at least one computer hardware processor to perform: profiling the relational datasets to obtain respective data profiles, each of the data profiles corresponding to a respective one of the relational datasets, the data profiles including a first data profile of a first relational dataset of the relational datasets; identifying at least one primary key candidate for at least one of the relational datasets using the data profiles and a first trained machine learning model trained to score primary key proposals for a relational dataset using feature values obtained using a data profile derived from the relational dataset, the identifying comprising: identifying one or more primary key proposals for the first relational dataset by selecting the one or more primary key proposals from among possible single-field and multi-field primary keys for the first relational dataset; obtaining, using the first data profile, one or more sets of primary key feature values for the one or more primary key proposals; determining one or more scores for the one or more primary key proposals by processing the one or more sets of primary key feature values using the first trained machine learning model, wherein a score for a primary key proposal is indicative of an extent to which the primary key proposal can serve as a primary key for the first relational dataset; and identifying, in accordance with the one or more scores, at least one primary key candidate for the first relational dataset; and outputting the at least one primary key candidate for the first relational dataset.

Some embodiments are directed to a method for discovering keys in relational datasets including first and second relational datasets. The method comprises using at least one computer hardware processor to perform: profiling the relational datasets to obtain respective data profiles, each of the data profiles corresponding to a respective one of the relational datasets, the data profiles including first and second data profiles of the first and second relational datasets; identifying one or more primary key candidates for the first relational dataset using the first data profile and a first trained machine learning model trained to score primary key proposals for a relational dataset using feature values obtained using a data profile derived from the relational dataset; identifying one or more foreign key proposals for the second relational dataset using the one or more primary key candidates for the first relational dataset by performing a subset analysis of the second relational dataset with respect to the first relational dataset; identifying one or more foreign key candidates for the second relational dataset using the first data profile, the second data profile, the one or more foreign key proposals, and a second trained machine learning model different from the first trained machine learning model, the second trained machine learning model trained to score foreign key proposals; and outputting the one or more primary key candidates and the one or more foreign key candidates.

Some embodiments are directed to method for discovering keys in relational datasets using a data processing system. The method comprises using at least one computer hardware processor to perform: profiling the relational datasets to obtain respective data profiles, each of the data profiles corresponding to a respective one of the relational datasets, the data profiles including a first data profile of a first relational dataset in the relational datasets; identifying multiple primary key candidates for at least one of the relational datasets using the data profiles and a first trained machine learning model, the identifying comprising: obtaining, using the first data profile, multiple sets of primary key feature values for multiple primary key proposals; determining scores for the multiple primary key proposals by processing the multiple sets of primary key feature values using the first trained machine learning model, wherein a score for a primary key proposal is indicative of an extent to which the primary key proposal can serve as a primary key for the first relational dataset; and identifying, in accordance with the scores, at least some of the multiple primary key proposals as the multiple primary key candidates for the first relational dataset; generating a graphical user interface displaying the multiple primary key candidates and a quality rating of each of the multiple primary key candidates that is determined based on the scores; and receiving, via the graphical user interface, a selection of a particular primary key candidate from the displayed multiple primary key candidates as the primary key for the first relational dataset.

Some embodiments are directed to a method for identifying labels for keys discovered using a data processing system. The method comprises using at least one computer hardware processor to perform: identifying one or more primary key candidates for a first relational dataset using a first data profile of the first relational dataset and a first trained machine learning model trained to score primary key proposals for a relational dataset using feature values obtained using a data profile derived from the relational dataset; identifying one or more foreign key candidates for a second relational dataset using the first data profile, a second data profile of the second relational dataset, one or more foreign key proposals, and a second trained machine learning model different from the first trained machine learning model, the second trained machine learning model trained to score the one or more foreign key proposals; identifying, from among the one or more primary key candidates, a primary key for the first relational dataset, the primary key being associated with a first field in the first relational dataset; identifying, from among the one or more foreign key candidates, a foreign key for the second relational dataset, wherein the foreign key is associated with a second field in the second relational dataset and references the primary key for the first relational dataset; determining whether the first field in the first relational dataset is associated with a semantic label that indicates a semantic meaning of the first field; and when the first field of the first relational dataset, with which the primary key is associated, is determined to be associated with the semantic label, assigning the semantic label to the second field of the second relational dataset with which the foreign key is associated.

Some embodiments are directed to a method for identifying data quality violations using keys discovered using a data processing system. The method comprises using at least one computer hardware processor to perform: identifying one or more primary key candidates for a first relational dataset using a first data profile of the first relational dataset and a first trained machine learning model trained to score primary key proposals for a relational dataset using feature values obtained using a data profile derived from the relational dataset; configuring the data processing system to indicate a first primary key candidate as a primary key for the first relational dataset; receiving a request to modify the first relational dataset; determining whether modifying the first relational dataset renders the primary key unsuitable as a primary key; and determining whether to grant the request based on a result of the determining whether modifying the first relational dataset renders the primary key unsuitable as a primary key.

Some embodiments are directed to a method for performing join operations in a dataflow graph using keys discovered using one or more machine learning models. The method comprises using at least one computer hardware processor to perform: identifying one or more primary key candidates for a first relational dataset using a first data profile of the first relational dataset and a first trained machine learning model trained to score primary key proposals for a relational dataset using feature values obtained using a data profile derived from the relational dataset; identifying one or more foreign key candidates for a second relational dataset using the first data profile, a second data profile of the second relational dataset, one or more foreign key proposals, and a second trained machine learning model different from the first trained machine learning model, the second trained machine learning model trained to score the one or more foreign key proposals; configuring the data processing system to indicate a first primary key candidate as a primary key for the first relational dataset and a first foreign key candidate as a foreign key for the second relational dataset, wherein the foreign key for the second relational dataset references the primary key for the first relational dataset; and processing a dataflow graph comprising a plurality of components representing a plurality of operations to be performed on input data, the plurality of components including a first component representing a join operation that combines records from the first relational dataset and the second relational dataset, wherein processing the dataflow graph comprises: automatically configuring the first component to use the primary key for the first relational dataset and the foreign key for the second relational dataset to perform the join operation on the first relational dataset and the second relational dataset

BRIEF DESCRIPTION OF DRAWINGS

FIG. 5A is a flowchart of an illustrative process 500 for identifying primary key candidates for relational datasets, in accordance with some aspects of the technology described herein.

FIG. 5B is a flowchart of an illustrative process 550 for identifying foreign key candidates for relational datasets, in accordance with some aspects of the technology described herein.

FIG. 5C is a flowchart of an illustrative process 570 for identifying labels for keys discovered using the key discovery system, in accordance with some aspects of the technology described herein.

FIG. 5D is a flowchart of an illustrative process 580 for identifying data quality violations using keys discovered using the key discovery system, in accordance with some aspects of the technology described herein.

FIG. 5E is a flowchart of an illustrative process 590 for performing join operations in a dataflow graph using keys discovered using the key discovery system, in accordance with some aspects of the technology described herein.

DETAILED DESCRIPTION

Figure 1A:
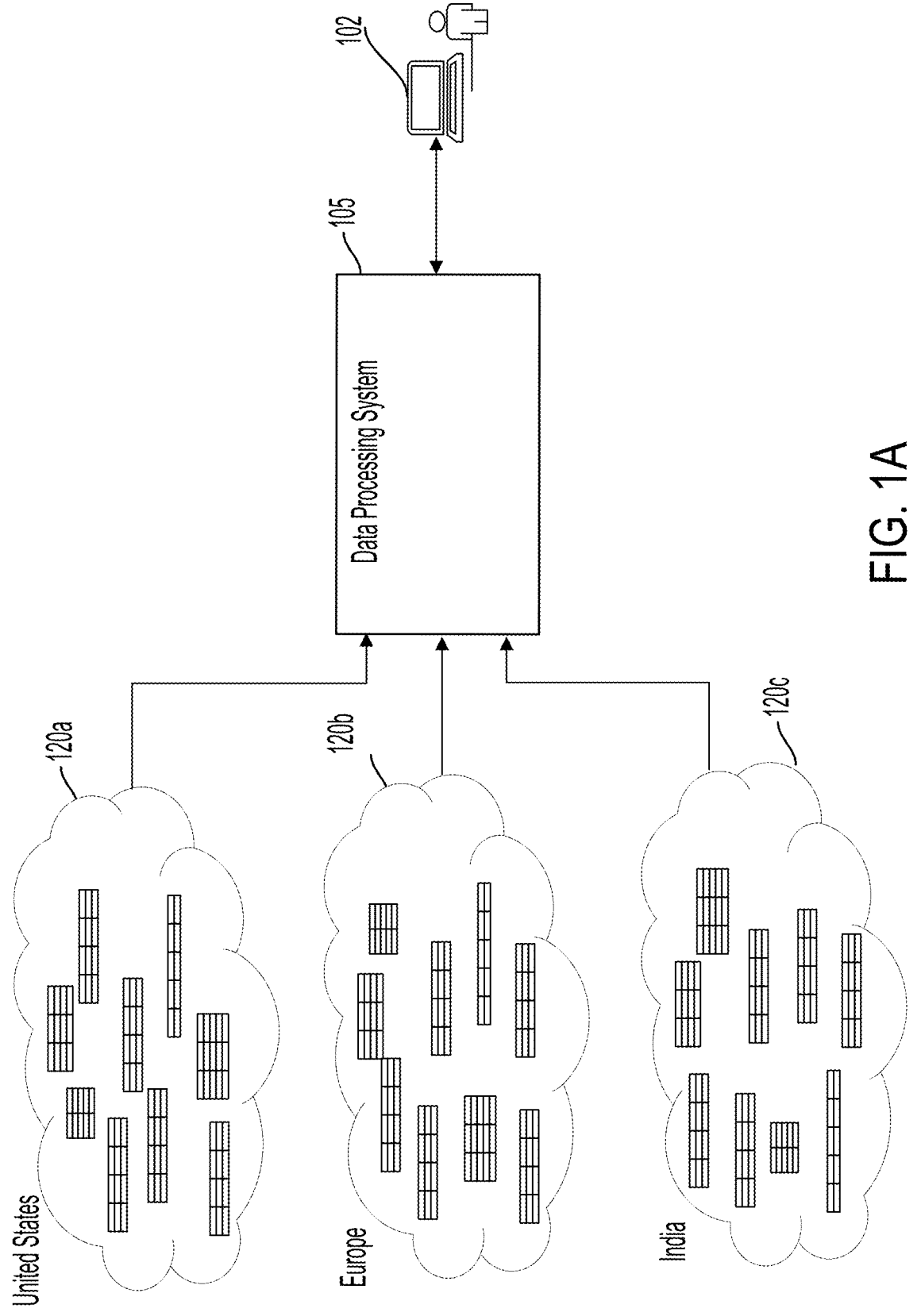
FIG. 1A is a diagram illustrating an example enterprise system environment in which a data processing system 105 may be used, in accordance with some aspects of the technology described herein.

The inventors have developed new techniques that provide for an efficient, scalable, and widely applicable auto-mated approach for discovering primary key and foreign key candidates for relational datasets managed by a data processing system. A data processing system may manage thousands, millions, billions of relational datasets. The techniques described herein facilitate automated discovery of primary key and/or foreign key candidates for relational datasets that allow for fast querying and retrieval of data in relational datasets. The techniques described herein generate graphical user interfaces that guide users to efficiently evaluate whether the discovered primary and/or foreign key candidates can serve as primary and/or foreign keys for the relational datasets.

As described herein, an enterprise may store and manage large numbers (e.g., thousands, millions, billions) of relational datasets, such as tables. Each relational dataset may include numerous columns representing fields and an even larger number (e.g., millions or billions) of rows that include values for the fields. Identifying primary keys and foreign keys for relational datasets is beneficial because they enable faster querying and retrieval of data in relational datasets. For instance, retrieval of data from a relational dataset is typically performed by querying the relational dataset using a primary key for the relational dataset. Also, foreign keys relate data across or establish relationships between two or more relational datasets thereby enabling data retrieval through joining of the two or more relational datasets. The inventors have appreciated that determining which of the numerous fields of a relational dataset can serve as a primary key or a foreign key is a difficult task. This is because determining whether a field can serve as a primary key or a foreign key depends on various attributes of the field, such as its name, its values, its position in a record, and/or other information and assessing this attribute information for numerous fields belonging to a large number of relational datasets is time-consuming and inefficient.

In some conventional systems, identification of primary keys and foreign keys for relational datasets stored in the system is performed manually by a designer of an application or applications utilizing the relational datasets, where the designer would have to manually examine the information stored in the relational datasets and the code of the application(s) that creates or uses the stored information. For example, to identify a primary key for each relational dataset stored in the system, the designer would have to manually examine each field of each relational dataset managed by the data processing system and its attributes and assess whether the field can serve as the primary key. Examining this information, even for a single relational dataset, is challenging because of the sheer size of the dataset. Identification of foreign keys for the relational datasets is even more challenging because (a) the designer typically first has to identify the primary keys for relational datasets since foreign keys refer to the primary keys and (b) the designer typically does not have knowledge of relationships between fields of different datasets. The designer may again need to examine fields of various datasets and their attributes to identify relationships between fields and determine whether the fields can serve as foreign keys. These are difficult and time-consuming tasks. They are also error prone as the designer may overlook certain important attributes of the fields when trying to identify primary keys and/or foreign keys for relational datasets.

The quality of data being examined also impacts the identification of primary and/or foreign keys. A large enterprise may obtain data from various sources and in different formats. In some cases, large portions of this obtained data may have quality issues, such as duplicative information and missing or inaccurate data. Having to manually examine poor quality data increases the complexity of primary key and/or foreign key identification. In addition, there may be cases where even though primary and/or foreign keys were initially designed for the relational datasets by designers, those keys may be unavailable or difficult to extract (e.g., undocumented, and only implied by logic of poorly understood, legacy code).

Some conventional techniques attempt automated identification of primary and foreign keys. However, such techniques are not scalable, cannot overcome data quality issues that may be present in the data, are computationally expensive (e.g., require significant computational resources, such as processor resources, memory resources, etc.), do not produce reliable primary and foreign keys for use in real-time production environments for large enterprises and, as a result, are not widely used.

Conventional techniques that attempt to identify primary and foreign keys are designed to identify only single-field primary and/or foreign keys. The inventors have recognized that oftentimes there are scenarios where a relational database may not possess a single unique field that can serve as the primary key. In these scenarios, identifying a combination of fields (i.e., multiple fields) of the relational database that can serve as the primary key is beneficial. However, the conventional techniques are not designed to identify such multi-field primary keys.

To address shortcomings of conventional techniques for identifying primary keys and/or foreign keys, the inventors have developed new technology that efficiently discovers primary key and/or foreign key candidates for relational datasets managed by an enterprise using machine learning. The technology developed by the inventors enables discovery of primary key and/or foreign key candidates while utilizing significantly less computational resources than conventional techniques. In addition, the technology developed by the inventors enables automated discovery of not only single-field primary and/or foreign key candidates but also multi-field primary candidates (e.g., for scenarios where the relational database does not possess a single unique field).

In some embodiments, the techniques developed by the inventors involve analyzing data profiles corresponding to relational datasets using machine learning techniques to identify primary and/or foreign keys. A data profile corresponding to a particular relational dataset may include summary statistics, such as metadata and statistical information relating to the fields in the particular relational dataset.

In some embodiments, a first machine learning model may be used to identify primary keys for each of one or more relational datasets. To this end, a set of primary key proposals may be identified (e.g., proposed fields that could serve as primary keys) for each relational dataset. The first machine learning model may be used to assess whether each such primary key proposal can serve as a primary key for a first relational dataset. The first machine learning model may determine a score for each primary key proposal, where the score indicates an extent to which the primary key proposal can serve as the primary key for the first relational dataset. To score a particular primary key proposal, a set of primary key feature values for the primary key proposal may be obtained using the data profile corresponding to the first relational dataset. The set of primary key feature values may be provided as input to the first machine learning model whose output includes a score for the primary key proposal. In this way, multiple sets of primary key feature values for multiple primary key proposals may be provided as input to the first machine learning model and the first machine learning model may determine a score for each of the multiple primary key proposals. In some embodiments, primary key candidates for the first relational dataset may be identified using the score(s) determined by the first machine learning model.

In some embodiments, a second machine learning model different from the first machine learning model may be used to identify foreign keys for each of one or more relational datasets. To this end, a set of foreign key proposals may be identified (e.g., proposed fields that could serve as foreign keys) for a second relational dataset using primary key candidates(s) identified for the first relational dataset. In some embodiments, a subset analysis of the second relational dataset with respect to the first relational dataset is performed to determine whether values of data stored in a field of the second relational dataset are a subset of values of data stored in a primary key candidate(s) for the first relational dataset. When the analysis indicates that the values of data stored in the field of the second relational dataset are a subset of values of data stored in the primary key candidate(s) for the first relational dataset, that field of the second relational dataset may be identified as a foreign key proposal for the second relational dataset. The second machine learning model may be used to assess whether each such foreign key proposal can serve as a foreign key for the second relational dataset. The second machine learning model may determine a score for each foreign key proposal, where the score indicates an extent to which the foreign key proposal can serve as a foreign key for the second relational dataset. To score a particular foreign key proposal, a set of foreign key feature values for the foreign key proposal may be obtained using the data profiles corresponding to the first and second relational datasets. The set of foreign key feature values may be provided as input to the second machine learning model whose output includes a score for the foreign key proposal. In this way, multiple sets of foreign key feature values for multiple foreign key proposals may be provided as input to the second machine learning model and the second machine learning model may determine a score for each of the multiple foreign key proposals. In some embodiments, foreign key candidates for the second relational dataset may be identified using the score(s) determined by the second machine learning model.

In some embodiments, the techniques developed by the inventors further involve generating graphical user interfaces that allow users to efficiently evaluate whether the discovered primary and/or foreign key candidates can serve as primary and/or foreign keys for the relational datasets. Having recognized that primary and/or foreign keys identified by conventional automated techniques may not always be reliable, the inventors developed a hybrid technique that not only uses machine learning models to facilitate quick and efficient discovery of primary and/or foreign key candidates but also generates intuitive graphical user interfaces that provide users with supporting information that guides the user when deciding which of the primary and/or foreign key candidates should be approved for use in a production environment of an enterprise.

In some embodiments, the techniques developed by the inventors involve using a data processing system to perform a method comprising: (A) profiling relational datasets to obtain respective data profiles, each of the data profiles corresponding to a respective one of the relational datasets, the data profiles including a first data profile (including, e.g., summary statistics but not the data) of a first relational dataset in the relational datasets; and (B) identifying at least one primary key candidate for at least one of the relational datasets using the data profiles and a first trained machine learning (ML) model (e.g., a random forest model or any other suitable type of trained ML model) trained to score primary key proposals for a relational dataset using feature values obtained using a data profile derived from the relational dataset.

In some embodiments, identifying the at least one primary key candidate for the at least one of the relational datasets includes: (1) identifying one or more primary key proposals for the first relational dataset by selecting the one or more primary key proposals from among possible single-field and multi-field primary keys for the first relational data (e.g., by identifying unique field combinations of the first relational dataset); (2) obtaining, using the first data profile, one or more sets of primary key feature values for the one or more primary key proposals; (3) determining one or more scores for the one or more primary key proposals by processing the one or more sets of primary key feature values using the first trained ML model, wherein a score for a primary key proposal is indicative of an extent to which the primary key proposal can serve as a primary key for the first relational dataset; and (4) identifying, in accordance with the score(s), at least one primary key proposal as a primary key candidate for the first relational dataset. The primary key candidate(s) identified in this way may be presented to a user (e.g., an administrator) for further review (e.g., along with supporting information explaining why the candidate(s) were identified by the first ML model). The user may select one of the primary key candidates as a primary key for the first relational dataset and the data processing system may store that selection. Alternatively, in some embodiments, the data processing system may automatically select a primary key for the first relational dataset from among the proposed candidate(s) without user input.

In some embodiments, profiling the relational datasets includes profiling the first relational dataset to obtain the first data profile. In some embodiments, profiling the first relational dataset includes (1) determining metadata for each of one or more fields in the first relational dataset; and (2) determining one or more statistics about each of the one more fields from data stored in the each of the one or more fields.

In some embodiments, the first relational dataset may include a first field and values of the data stored in the first field. In some embodiments, determining the metadata includes determining metadata for the first field including by determining: (1) an ordinal position of the column or row in the first relational dataset storing the values for the first field, (2) a datatype for the data stored in the first field, (3) a format for the data stored in the first field, and/or (4) a name for the first field.

In some embodiments, determining the one or more statistics includes determining one or more statistics from the data stored in the first field including by determining: (1) a maximum of the values of the data stored in the first field, (2) a minimum of the values of the data stored in the first field, (3) a maximum length of the values of the data stored in the first field, and/or (4) a minimum length of the values of the data stored in the first field.

In some embodiments, identifying one or more primary key proposals for the first relational dataset includes identifying one or more unique field combinations of the first relational dataset such that any particular identified unique field combination contains no greater than a specified percentage of duplicate entries. The specified percentage may be 2%, 1%, 0.5%, or any other suitable percentage. In some embodiments, the one or more unique field combinations may include a unique column combination including a set of columns that contain no greater than the specified percentage of duplicate entries. In some embodiments, the one or more primary key proposals may be identified using a hybrid discovery algorithm that identifies the unique field combinations. Examples of hybrid discovery algorithms may include, but not be limited to, the Tane algorithm described in article titled "An Efficient Algorithm for Discovering Functional and Approximate Dependencies," by Huhtala et al. (The Computer Journal, Vol. 42, No. 2, 1999); the induction algorithm described in article titled "Database dependency discovery: a machine learning approach," by Flach et. al.; the HyFD algorithm described in article titled "A Hybrid Approach to Functional Dependency Discovery," by Papenbrock et. al. (SIGMOD' 16, Jun. 26-Jul. 1, 2016), and the HyUCC algorithm described in article titled "A Hybrid Approach for Efficient Unique Column Combination Discovery," by Papenbrock et. al, each of which is incorporated herein by reference in its entirety.

In some embodiments, selecting the one or more primary key proposals from among possible single-field and multi-field primary keys for the first relational dataset comprises selecting one or more single-field primary key proposals, selecting one or more multi-field primary key proposals, and/or a combination of single-field and multi-field primary key proposals. In some embodiments, selecting one or more single-field primary key proposals may include selecting a subset of all possible single-field primary keys or selecting all possible single-field primary keys. Selection of primary key proposals from among possible single-field and multi-field primary keys reduces the computational resources required by the first trained ML model for processing primary key feature value(s) corresponding to the primary key proposals.

In some embodiments, identifying at least one primary key proposal as a primary key candidate for the first relational dataset is performed automatically in accordance with the one or more scores determined for the one or more primary key proposals.

Figure 6A:
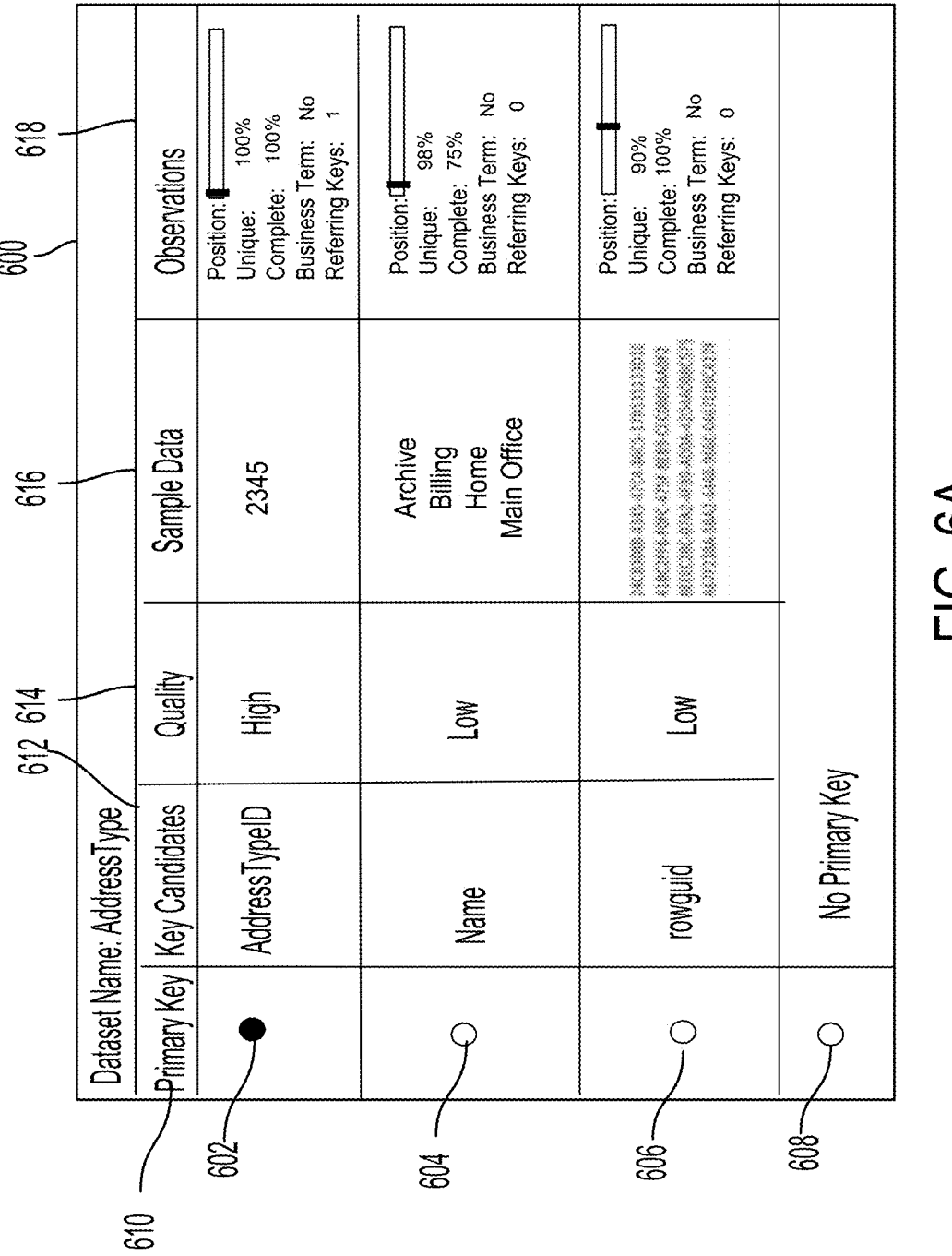
FIG. 6A is an example graphical user interface showing a listing of primary key candidates discovered by the key discovery system, in accordance with some aspects of the technology described herein.

In some embodiments, the techniques developed by the inventors involve using the data processing system to further perform: (1) generating a graphical user interface (GUI) displaying the at least one primary key candidate and a quality rating of the at least one primary key candidate that is determined based on the one or more scores (e.g., GUI 600 of FIG. 6A showing a listing of candidates 612 and quality ratings 614); and (2) receiving, via the GUI, a selection of a particular primary key candidate as the primary key for the first relational dataset (e.g., shown as selection of GUI element 602 in GUI 600).

In some embodiments, the techniques developed by the inventors involve using a data processing system to perform a method comprising: (A) profiling relational datasets to obtain respective data profiles, each of the data profiles corresponding to a respective one of the relational datasets, the data profiles including first and second data profiles (including, e.g., summary statistics but not the data) of first and second relational datasets; (B) identifying one or more primary key candidates for the first relational dataset using the first data profile and a first trained machine learning (ML) model (e.g., a random forest model or any other suitable type of trained ML model) trained to score primary key proposals for a relational dataset using feature values obtained using a data profile derived from the relational dataset; (C) identifying one or more foreign key proposals for the second relational dataset using the one or more primary key candidates for the first relational dataset by performing a subset analysis of the second relational dataset with respect to the first relational dataset; (D) identifying one or more foreign key candidates for the second relational dataset using the first data profile, the second data profile, the one or more foreign key proposals, and a second trained machine learning model (e.g., a random forest model or any other suitable type of trained ML model) different from the first trained machine learning model, the second trained machine learning model trained to score foreign key proposals; and (E) outputting the one or more primary key candidates and the one or more foreign key candidates. Thus, the data processing system utilizes two different ML models, one for identifying primary key candidates and the other for identifying foreign key candidates. The identified foreign key candidate(s) may also be presented to a user (e.g., an administrator) for further review (e.g., along with supporting information explaining why the candidate(s) were identified by the second ML model). The user may select a primary key target (e.g., a field of the first relational dataset selected as the primary key) for each of one or more foreign key candidate(s). The selection may cause foreign key candidate(s) with selected primary key targets to be identified as a foreign key(s) for the second relational dataset and the data processing system may store that selection. Alternatively, in some embodiments, the data processing system may automatically select primary key target(s) for the foreign key candidate(s) without user input.

In some embodiments, identifying the one or more primary key candidates for the first relational dataset comprises (A) obtaining, using the first data profile, one or more sets of primary key feature values for one or more primary key proposals; (B) determining one or more scores for the one or more primary key proposals by processing the one or more sets of primary key feature values using the first trained machine learning model, wherein a score for a primary key proposal is indicative of an extent to which the primary key proposal can serve as a primary key for the first relational dataset; and (C) identifying, in accordance with the one or more scores, at least one primary key candidate for the first relational dataset.

In some embodiments, obtaining, using the first data profile, the one or more sets of primary key feature values for the one or more primary key proposals comprises generating a first set of primary key features values for a first primary key proposal of the one or more primary key proposals. For example, the one or more sets of primary key feature values may be determined from information in the first data profile.

In some embodiments, performing the subset analysis comprises determining whether values of data stored in a field of the second relational dataset are a subset of values of data stored in a primary key candidate for the first relational dataset; and identifying the field of the second relational dataset as a foreign key proposal for the second relational dataset when the values of data stored in the field of the second relational dataset are a subset of the values of data stored in the primary key candidate for the first relational dataset.

In some embodiments, identifying the one or more foreign key candidates for the second relational dataset comprises (A) obtaining, using the first data profile and the second data profile, one or more sets of foreign key feature values for the one or more foreign key proposals; (B) determining one or more scores for the one or more foreign key proposals by processing the one or more sets of foreign key feature values using the second trained machine learning model, wherein a score for a foreign key proposal is indicative of an extent to which the foreign key proposal can serve as a foreign key for the second relational dataset that references a particular primary key candidate for the first relational dataset; and (C) identifying, in accordance with the one or more scores, at least one foreign key candidate for the second relational dataset.

In some embodiments, obtaining, using the first data profile and the second data profile, the one or more sets of foreign key feature values for the one or more foreign key proposals comprises generating a first set of foreign key features values for a first foreign key proposal of the one or more foreign key proposals. For example, the one or more sets of foreign key feature values may be determined from information in the first and second data profiles.

In some embodiments, outputting the one or more primary key candidates and the one or more foreign key candidates comprises (A) generating a graphical user interface (e.g., GUI 600 of FIG. 6A) displaying the one or more primary key candidates (e.g., listing of candidates 612 in GUI 600) and a quality rating of each of the one or more primary key candidates that is determined based on the one or more scores (e.g., quality ratings 614 shown in GUI 600); and (B) generating a graphical user interface (e.g., GUI 650 of FIG. 6B) displaying the one or more foreign key candidates (e.g., listing 652 in GUI 650), one or more primary key targets for each foreign key candidate of the one or more foreign key candidates (e.g., shown in listing 658 for each candidate in GUI 650), and a quality rating of each of the one or more primary key targets (e.g. quality ratings 656 shown in GUI 650).

In some embodiments, the techniques developed by the inventors involve using a data processing system to perform a method comprising: (A) profiling the relational datasets to obtain respective data profiles, each of the data profiles corresponding to a respective one of the relational datasets, the data profiles including a first data profile of a first relational dataset in the relational datasets; (B) identifying multiple primary key candidates for at least one of the relational datasets using the data profiles and a first trained machine learning model, the identifying comprising: (1) obtaining, using the first data profile, multiple sets of primary key feature values for multiple primary key proposals; (2) determining scores for the multiple primary key proposals by processing the multiple sets of primary key feature values using the first trained machine learning model, wherein a score for a primary key proposal is indicative of an extent to which the primary key proposal can serve as a primary key for the first relational dataset; and (3) identifying, in accordance with the scores, at least some of the multiple primary key proposals as the multiple primary key candidates for the first relational dataset; (C) generating a graphical user interface displaying the multiple primary key candidates and a quality rating of each of the multiple primary key candidates that is determined based on the scores; and (D) receiving, via the graphical user interface, a selection of a particular primary key candidate from the displayed multiple primary key candidates as the primary key for the first relational dataset.

In some embodiments, the GUI displays metrics for each primary key candidate of the one or more primary key candidates (shown under the observations column 618 of GUI 600 of FIG. 6, for example). The metrics include one or more of the following: (1) a position metric indicating a position of a field with respect to a start of a record of the first relational dataset; (2) a uniqueness metric indicating a percentage of field values that are unique; (3) a completeness metric indicating a percentage of field values that are not null; (4) a business term metric indicating whether a field is associated with a business term; and (5) a referring keys metric indicating whether a field is a target of one or more foreign keys.

In some embodiments, the method further includes in response to receiving the selection of the particular primary key candidate as the primary key for the first relational dataset: configuring the data processing system to indicate the selected particular primary key candidate as the primary key for the first relational dataset, wherein the configuring comprises storing a variable whose value indicates that the selected particular primary key candidate is the primary key for the first relational dataset.

In some embodiments, the method further includes in response to receiving the selection of the particular primary key candidate as the primary key for the first relational dataset, (1) retaining one or more foreign keys referencing the particular primary key candidate; and (2) discarding one or more other foreign keys referencing one or more unselected primary key candidates.

In some embodiments, the method further includes receiving a query by the data processing system, the query requesting data stored, at least in part, in the first relational dataset; and processing the query using the primary key to retrieve the requested data from the first relational dataset.

In some embodiments, the method further includes receiving a request to modify the first relational dataset; determining whether modifying the first relational dataset renders the primary key unsuitable as a primary key; in response to determining that modifying the first relational dataset renders the primary key unsuitable as the primary key, denying the request to modify the first relational dataset; and in response to determining that modifying the record in the first relational dataset does not render the primary key unsuitable as the primary key, granting the request to modify the first relational dataset.

In some embodiments, determining whether modifying the first relational dataset renders the primary key unsuitable as the primary key comprises determining whether modifying the first relational dataset causes a uniqueness constraint associated with the primary key to be violated, wherein the uniqueness constraint is violated when the primary key does not uniquely identify each record in the first relational dataset.

In some embodiments, the relational datasets include a second relational dataset, the data profiles include a second data profile of the second relational dataset, and the method further comprises identifying multiple foreign key candidates for at least one of the relational datasets, the identifying comprising: (A) obtaining, using the first data profile and the second data profile, multiple sets of foreign key feature values for multiple foreign key proposals; (B) determining scores for the multiple foreign key proposals by processing the multiple sets of foreign key feature values using a second trained machine learning model different from the first trained machine learning model, wherein a score for a foreign key proposal is indicative of an extent to which the foreign key proposal can serve as a foreign key for the second relational dataset that references a particular primary key candidate for the first relational dataset; and (C) identifying, in accordance with the scores, at least some of the multiple foreign key proposals as the multiple foreign key candidates for the second relational dataset.

In some embodiments, the techniques developed by the inventors involve using the data processing system to further perform: (1) generating a GUI (e.g., GUI 650 of FIG. 6A)

displaying the multiple foreign key candidates (e.g., listing 652 in GUI 650), one or more primary key targets for each foreign key candidate of the multiple foreign key candidates (e.g., shown in listing 658 for each candidate in GUI 650), and a quality rating of each of the one or more primary key targets (e.g. quality ratings 656 shown in GUI 650); and (2) receiving, for each foreign key candidate and via the graphical user interface, a selection of a primary key target from among the one or more primary key targets (e.g., shown as selection of GUI element 672 in GUI 650).

Figure 14A:
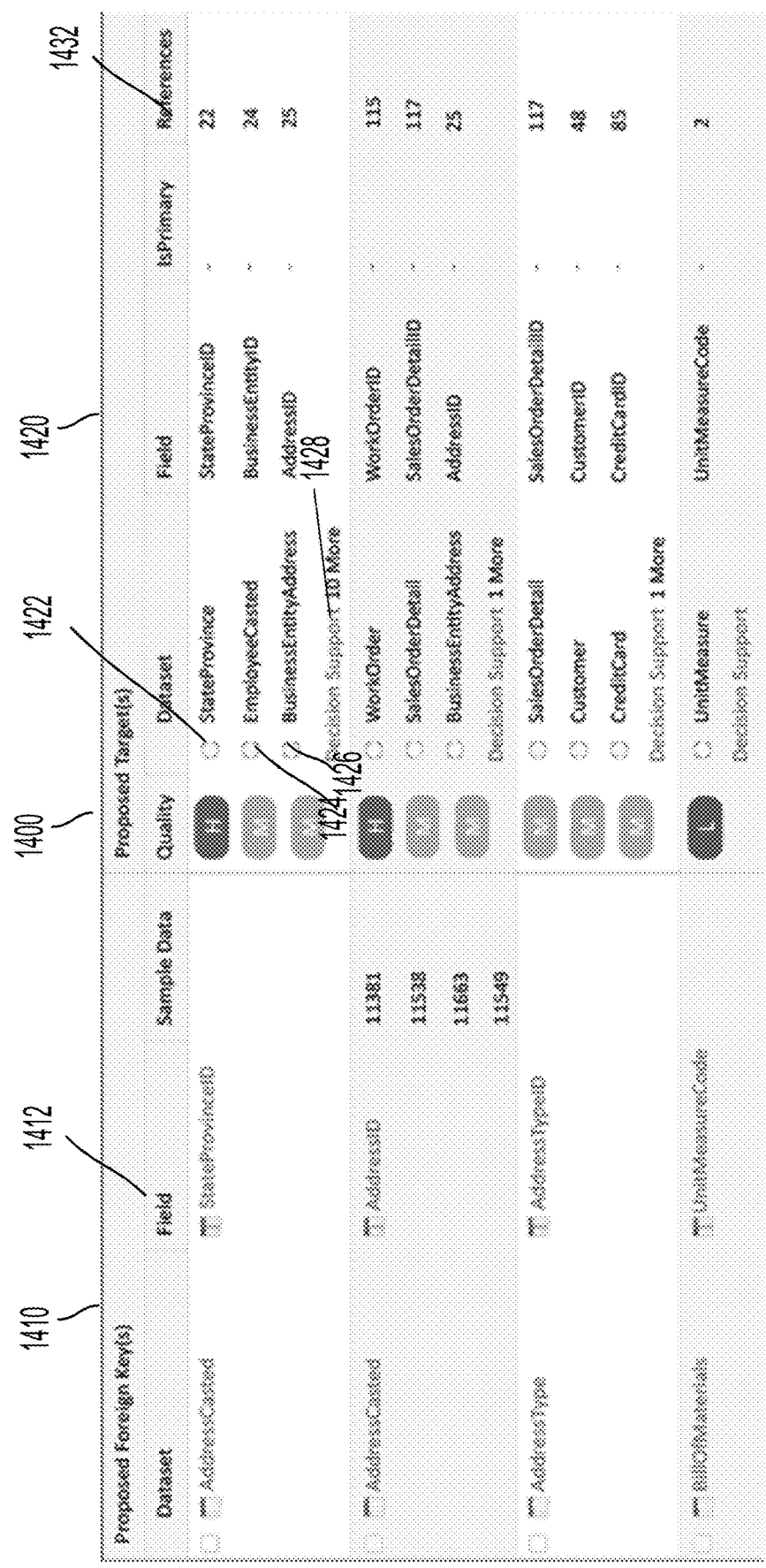
FIG. 14A is an example graphical user interface showing a listing of foreign key candidates discovered by the key discovery system, in accordance with some aspects of the technology described herein.
Figure 14B:
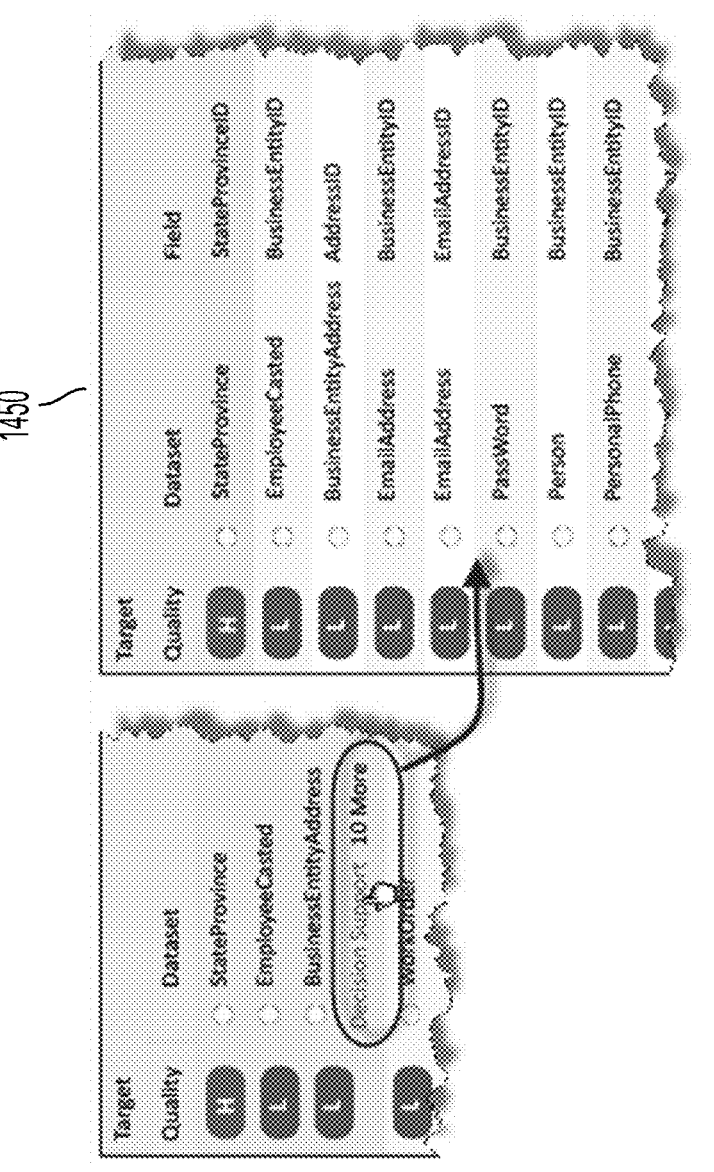
FIG. 14B is an example graphical user interface showing an expanded listing of primary key targets for a foreign key candidate, in accordance with some aspects of the technology described herein.

In some embodiments, the GUI displays, for each primary key target, a number of other foreign keys referencing the primary key target (shown in FIG. 14A under references column 1432, for example).

In some embodiments, the method further includes in response to receiving, for a first foreign key candidate, a selection of a first primary key target from among the one or more primary key targets, identifying the first foreign key candidate as the foreign key for the second relational dataset, wherein the first primary key target is the primary key for the first relational dataset and the foreign key for the second relational dataset references the primary key for the first relational dataset.

In some embodiments, the method further comprises receiving a request to modify the second relational dataset; determining whether modifying the second relational dataset renders the foreign key unsuitable as a foreign key; in response to determining that modifying the second relational dataset renders the foreign key unsuitable as a foreign key, denying the request to modify the second relational dataset; and in response to determining that modifying the record in the second relational dataset does not render the foreign key unsuitable as a foreign key, granting the request to modify the second relational dataset.

In some embodiments, determining whether modifying the second relational dataset renders the foreign key unsuitable as a foreign key comprises determining whether modifying the second relational dataset causes a foreign key constraint to be violated, wherein the foreign key constraint is violated when values of data stored in the foreign key is not a subset of values of data stored in the primary key for the first relational dataset.

In some embodiments, the method further comprises processing a dataflow graph comprising a plurality of components representing a plurality of operations to be performed on input data, the plurality of components including a first component representing a join operation that combines records from the first relational dataset and the second relational dataset, wherein processing the dataflow graph comprises automatically configuring the first component to use the primary key for the first relational dataset and the foreign key for the second relational dataset to perform the join operation on the first relational dataset and the second relational dataset.

In some embodiments, the method further comprises determining whether the primary key for the first relational dataset has a previously-assigned label that indicates a semantic meaning of the primary key; and when the primary key is determined to have previously-assigned label, assigning the previously-assigned label to the foreign key for the second relational dataset.

In some embodiments, the techniques developed by the inventors involve using a data processing system to perform a method comprising: (A) identifying one or more primary key candidates for a first relational dataset using a first data profile (including, e.g., summary statistics but not the data) of the first relational dataset and a first trained machine learning model (e.g., a random forest model or any other suitable type of trained ML model) trained to score primary key proposals for a relational dataset using feature values obtained using a data profile derived from the relational dataset; (B) identifying one or more foreign key candidates for a second relational dataset using the first data profile, a second data profile of the second relational dataset, one or more foreign key proposals, and a second trained machine learning model (e.g., a random forest model or any other suitable type of trained ML model) different from the first trained machine learning model, the second trained machine learning model trained to score the one or more foreign key proposals; (C) identifying, from among the one or more primary key candidates, a primary key for the first relational dataset, the primary key being associated with a first field in the first relational dataset; (D) identifying, from among the one or more foreign key candidates, a foreign key for the second relational dataset, wherein the foreign key is associated with a second field in the second relational dataset and references the primary key for the first relational dataset; (E) determining whether the first field in the first relational dataset is associated with a semantic label that indicates a semantic meaning of the first field; and (F) when the first field of the first relational dataset, with which the primary key is associated, is determined to be associated with the semantic label, assigning the semantic label to the second field of the second relational dataset with which the foreign key is associated. Thus, the data processing system utilizes the primary and foreign keys discovered using the techniques described herein to assign semantic labels (e.g., business terms) to fields of relational datasets. For example, a business term mapped to a column identified as a primary key for the first relational dataset may be used to assign the business term to a column identified as a foreign key for the second relational dataset.

In some embodiments, the method further comprises profiling the first relational dataset to obtain the first data profile and the second relational dataset to obtain the second data profile.

In some embodiments, identifying one or more primary key candidates for a first relational dataset comprises: obtaining, using the first data profile, one or more sets of primary key feature values for one or more primary key proposals; determining one or more scores for the one or more primary key proposals by processing the one or more sets of primary key feature values using the first trained machine learning model, wherein a score for a primary key proposal is indicative of an extent to which the primary key proposal can serve as a primary key for the first relational dataset; and identifying, in accordance with the one or more scores, the one or more primary key candidates for the first relational dataset.

In some embodiments, the method further comprises identifying the one or more foreign key proposals for the second relational dataset using the one or more primary key candidates for the first relational dataset by performing a subset analysis of the second relational dataset with respect to the first relational dataset.

In some embodiments, performing the subset analysis comprises: determining whether values of data stored in a field of the second relational dataset are a subset of values of data stored in a primary key candidate for the first relational dataset; and identifying the field of the second relational dataset as a foreign key proposal for the second relational dataset when the values of data stored in the field of the second relational dataset are a subset of the values of data stored in the primary key candidate for the first relational dataset.

In some embodiments, identifying the one or more foreign key candidates for the second relational dataset comprises: obtaining, using the first data profile and the second data profile, one or more sets of foreign key feature values for the one or more foreign key proposals; determining one or more scores for the one or more foreign key proposals by processing the one or more sets of foreign key feature values using the second trained machine learning model, wherein a score for a foreign key proposal is indicative of an extent to which the foreign key proposal can serve as a foreign key for the second relational dataset that references a particular primary key candidate for the first relational dataset; and identifying, in accordance with the one or more scores, the one or more foreign key candidate for the second relational dataset.

In some embodiments, the method further comprises outputting the one or more primary key candidates and the one or more foreign key candidates.

In some embodiments, outputting the one or more primary key candidates and the one or more foreign key candidates comprises: generating a graphical user interface displaying the one or more primary key candidates and a quality rating of each of the one or more primary key candidates that is determined based on the one or more scores; and generating a graphical user interface displaying the one or more foreign key candidates, one or more primary key targets for each foreign key candidate of the one or more foreign key candidates, and a quality rating of each of the one or more primary key targets.

In some embodiments, the method further comprises: receiving, via the graphical user interface, a selection of a particular primary key candidate from the displayed one or more primary key candidates as the primary key for the first relational dataset; and in response to receiving the selection of the particular primary key candidate as the primary key for the first relational dataset: configuring the data processing system to indicate the selected particular primary key candidate as the primary key for the first relational dataset, wherein the configuring comprises storing a variable whose value indicates that the selected particular primary key candidate is the primary key for the first relational dataset.

In some embodiments, the method further comprises: receiving, for each foreign key candidate of the displayed one or more foreign key candidates and via the graphical user interface, a selection of a primary key target from among the one or more primary key targets; and in response to receiving, for a first foreign key candidate, a selection of a first primary key target from among the one or more primary key targets, identifying the first foreign key candidate as the foreign key for the second relational dataset, and configuring the data processing system to indicate the first foreign key candidate as the foreign key for the second relational dataset, wherein the configuring comprises storing a variable whose value indicates the first foreign key candidate is the foreign key for the second relational dataset, wherein the first primary key target is the primary key for the first relational dataset.

In some embodiments, the techniques developed by the inventors involve using a data processing system to perform a method comprising: (A) identifying one or more primary key candidates for a first relational dataset using a first data profile (including, e.g., summary statistics but not the data) of the first relational dataset and a first trained machine learning model (e.g., a random forest model or any other suitable type of trained ML model) trained to score primary key proposals for a relational dataset using feature values obtained using a data profile derived from the relational dataset; (B) configuring the data processing system to indicate a first primary key candidate as a primary key for the first relational dataset; (C) receiving a request to modify the first relational dataset; (D) determining whether modifying the first relational dataset renders the primary key unsuitable as a primary key; and (E) determining whether to grant the request based on a result of the determining whether modifying the first relational dataset renders the primary key unsuitable as a primary key.

In some embodiments, the method further comprises: in response to determining that modifying the first relational dataset renders the primary key unsuitable as the primary key, denying the request to modify the first relational dataset; and in response to determining that modifying the record in the first relational dataset does not render the primary key unsuitable as the primary key, granting the request to modify the first relational dataset.

In some embodiments, determining whether modifying the first relational dataset renders the primary key unsuitable as the primary key comprises determining whether modifying the first relational dataset causes a uniqueness constraint associated with the primary key to be violated, wherein the uniqueness constraint is violated when the primary key does not uniquely identify each record in the first relational dataset.

In some embodiments, identifying one or more primary key candidates for a first relational dataset comprises: obtaining, using the first data profile, one or more sets of primary key feature values for one or more primary key proposals; determining one or more scores for the one or more primary key proposals by processing the one or more sets of primary key feature values using the first trained machine learning model, wherein a score for a primary key proposal is indicative of an extent to which the primary key proposal can serve as a primary key for the first relational dataset; and identifying, in accordance with the one or more scores, the one or more primary key candidates for the first relational dataset.

In some embodiments, the method further comprises: identifying one or more foreign key candidates for a second relational dataset using the first data profile, a second data profile of the second relational dataset, one or more foreign key proposals, and a second trained machine learning model different from the first trained machine learning model, the second trained machine learning model trained to score the one or more foreign key proposals; and configuring a first foreign key candidate as a foreign key for the second relational dataset, wherein the foreign key for the second relational dataset references the primary key for the first relational dataset.

In some embodiments, the method further comprises: identifying the one or more foreign key proposals for the second relational dataset using the one or more primary key candidates for the first relational dataset by performing a subset analysis of the second relational dataset with respect to the first relational dataset.

In some embodiments, the method further comprises: outputting the one or more primary key candidates and the one or more foreign key candidates, wherein the outputting comprises: generating a graphical user interface displaying the one or more primary key candidates and a quality rating of each of the one or more primary key candidates that is determined based on the one or more scores; and generating a graphical user interface displaying the one or more foreign key candidates, one or more primary key targets for each foreign key candidate of the one or more foreign key candidates, and a quality rating of each of the one or more primary key targets.

In some embodiments, the method further comprises: receiving, for each foreign key candidate of the displayed one or more foreign key candidates and via the graphical user interface, a selection of a primary key target from among the one or more primary key targets; and in response to receiving, for a first foreign key candidate, a selection of a first primary key target from among the one or more primary key targets, identifying the first foreign key candidate as the foreign key for the second relational dataset, wherein the first primary key target is the primary key for the first relational dataset.

In some embodiments, the method further comprises: receiving a request to modify the second relational dataset; determining whether modifying the second relational dataset renders the foreign key unsuitable as a foreign key; in response to determining that modifying the second relational dataset renders the foreign key unsuitable as a foreign key, denying the request to modify the second relational dataset; and in response to determining that modifying the record in the second relational dataset does not render the foreign key unsuitable as a foreign key, granting the request to modify the second relational dataset.

In some embodiments, determining whether modifying the second relational dataset renders the foreign key unsuitable as a foreign key comprises: determining whether modifying the second relational dataset causes a foreign key constraint to be violated, wherein the foreign key constraint is violated when values of data stored in the foreign key is not a subset of values of data stored in the primary key for the first relational dataset.

Thus, the data processing system utilizes the primary and foreign keys discovered using the key discovery techniques described herein to identify data quality violations in relational datasets. The discovered primary keys may help maintain entity integrity and the discovered foreign keys help maintain referential integrity in relational datasets.

In some embodiments, the techniques developed by the inventors involve using a data processing system to perform a method comprising: (A) identifying one or more primary key candidates for a first relational dataset using a first data profile (including, e.g., summary statistics but not the data) of the first relational dataset and a first trained machine learning model (e.g., a random forest model or any other suitable type of trained ML model) trained to score primary key proposals for a relational dataset using feature values obtained using a data profile derived from the relational dataset; (B) identifying one or more foreign key candidates for a second relational dataset using the first data profile, a second data profile (including, e.g., summary statistics but not the data) of the second relational dataset, one or more foreign key proposals, and a second trained machine learning model (e.g., a random forest model or any other suitable type of trained ML model) different from the first trained machine learning model, the second trained machine learning model trained to score the one or more foreign key proposals; (C) configuring the data processing system to indicate a first primary key candidate as a primary key for the first relational dataset and a first foreign key candidate as a foreign key for the second relational dataset, wherein the foreign key for the second relational dataset references the primary key for the first relational dataset; and (D) processing a dataflow graph comprising a plurality of components representing a plurality of operations to be performed on input data, the plurality of components including a first component representing a join operation that combines records from the first relational dataset and the second relational dataset, wherein processing the dataflow graph comprises: automatically configuring the first component to use the primary key for the first relational dataset and the foreign key for the second relational dataset to perform the join operation on the first relational dataset and the second relational dataset. Thus, the data processing system utilizes the primary and foreign keys discovered using the key discovery techniques described herein to automatically perform a join operation on two or more relational datasets.

In some embodiments, the method further comprises profiling the first relational dataset to obtain the first data profile and the second relational dataset to obtain the second data profile.

In some embodiments, identifying one or more primary key candidates for a first relational dataset comprises: obtaining, using the first data profile, one or more sets of primary key feature values for one or more primary key proposals; determining one or more scores for the one or more primary key proposals by processing the one or more sets of primary key feature values using the first trained machine learning model, wherein a score for a primary key proposal is indicative of an extent to which the primary key proposal can serve as a primary key for the first relational dataset; and identifying, in accordance with the one or more scores, the one or more primary key candidates for the first relational dataset.

In some embodiments, the method further comprises identifying the one or more foreign key proposals for the second relational dataset using the one or more primary key candidates for the first relational dataset by performing a subset analysis of the second relational dataset with respect to the first relational dataset.

In some embodiments, performing the subset analysis comprises: determining whether values of data stored in a field of the second relational dataset are a subset of values of data stored in a primary key candidate for the first relational dataset; and identifying the field of the second relational dataset as a foreign key proposal for the second relational dataset when the values of data stored in the field of the second relational dataset are a subset of the values of data stored in the primary key candidate for the first relational dataset.

In some embodiments, identifying the one or more foreign key candidates for the second relational dataset comprises: obtaining, using the first data profile and the second data profile, one or more sets of foreign key feature values for the one or more foreign key proposals; determining one or more scores for the one or more foreign key proposals by processing the one or more sets of foreign key feature values using the second trained machine learning model, wherein a score for a foreign key proposal is indicative of an extent to which the foreign key proposal can serve as a foreign key for the second relational dataset that references a particular primary key candidate for the first relational dataset; and identifying, in accordance with the one or more scores, the one or more foreign key candidate for the second relational dataset.

In some embodiments, the method further comprises outputting the one or more primary key candidates and the one or more foreign key candidates.

In some embodiments, outputting the one or more primary key candidates and the one or more foreign key candidates comprises: generating a graphical user interface displaying the one or more primary key candidates and a quality rating of each of the one or more primary key candidates that is determined based on the one or more scores; and generating a graphical user interface displaying the one or more foreign key candidates, one or more primary key targets for each foreign key candidate of the one or more foreign key candidates, and a quality rating of each of the one or more primary key targets.

In some embodiments, the method further comprises receiving, via the graphical user interface, a selection of a particular primary key candidate from the displayed one or more primary key candidates as the primary key for the first relational dataset; and in response to receiving the selection of the particular primary key candidate as the primary key for the first relational dataset: configuring the data processing system to indicate the selected particular primary key candidate as the primary key for the first relational dataset, wherein the configuring comprises storing a variable whose value indicates that the selected particular primary key candidate is the primary key for the first relational dataset.

In some embodiments, the method further comprises: receiving, for each foreign key candidate of the displayed one or more foreign key candidates and via the graphical user interface, a selection of a primary key target from among the one or more primary key targets; and in response to receiving, for a first foreign key candidate, a selection of a first primary key target from among the one or more primary key targets, identifying the first foreign key candidate as the foreign key for the second relational dataset, wherein the first primary key target is the primary key for the first relational dataset.

Machine Learning

I. Features for Identifying Primary Key(s)

In some embodiments, as described herein, one or more primary key proposals may be identified for a first relational dataset and a set of primary key feature values for each primary key proposal may be obtained using a data profile corresponding to the first relational dataset. The set can include feature values for one or more of the features listed below.

Values of any one or more (e.g., one, two, at least five, at least ten, all, etc.) of the features described below may be obtained for a primary key proposal. In some embodiments, the values of any one or more of the features may be obtained from the data profile corresponding to the first relational dataset. In these embodiments, the values of the features may be determined during the profiling of the first relational dataset. The primary key proposal may have multiple fields. The data profile for a relational dataset may have information about values of those fields in the relational dataset. This information may be derived from the values of the fields when the data profile was generated. In some embodiments, the data profile does not include all the values of all the fields themselves, but rather only information derived from those values. In some embodiments, the values of any one or more of the features may be generated using information in the data profile. In these embodiments, the values of the features may be determined or computed after the profiling of the first relational dataset.

For example, the relational dataset may be a table and the primary key proposal may correspond to a column of the table. The data profile for the table may include information about values in that column of the table. The information may be derived from the values in the column during generation of the data profile. In some embodiments, the data profile does not include all the field values in the column, but rather includes only information derived from those values, which information may specify directly or may be used to determine values for the features described below.

As another example, the primary key proposal may correspond to a combination of two or more columns of the table. The data profile for the table may include information about values in those columns of the table. The information may be derived from the values in the columns during generation of the data profile. In some embodiments, the data profile does not include all the field values in the columns, but rather includes only information derived from those values, which information may specify directly or may be used to determine values for the features described below.

One example of a feature for a primary key proposal is a feature whose value indicates an average length of field values in fields for the primary key proposal. This feature may be termed "AverageLengthField". The value of this feature may be float. For example, when the primary key proposal corresponds to a column of a table, the value of this feature indicates average length of the values in that column of the table. In some embodiments, the value of this feature may be determined during the profiling of the relational dataset. For example, as the data profile for the table is being generated, the lengths of all values in the column of the table may be determined and the average length of the values may be computed from the determined lengths.

Another example of a feature for a primary key proposal is a feature whose value indicates whether a name of a field for the primary key proposal contains a name of the relational dataset. This feature may be termed "ContainsDatasetName". The value of this feature may be Boolean, where the value "0" indicates that a name of a field for the primary key proposal does not contain a name of the relational dataset and the value "1" indicates that a name of a field for the primary key proposal contains a name of the relational dataset. For example, when the primary key proposal corresponds to a column of the table, the value of this feature indicates whether that column's name contains a name of the relational dataset. Since it is common practice to append the string "ID" to a dataset's name when creating a primary key, a value of this feature is highly informative to the primary key discovery process. In some embodiments, the value of this feature may be determined after the profiling of the relational dataset. For example, a data profile may be generated that includes metadata including a name of the table and a name of each of the columns of the table. After generating the data profile, a determination may be made regarding whether a name of a field of the primary key proposal contains the name of the table.

Another example of a feature for a primary key proposal is a feature whose value indicates a number of values inside a field for the primary key proposal. This feature may be termed "Count". The value of this feature may be integer. For example, when the primary key proposal corresponds to a column of the table, the value of this feature indicates a number of values in that column of the table. In some embodiments, the value of this feature may be determined during the profiling of the relational dataset.

Another example of a feature for a primary key proposal is a feature whose value indicates a number of distinct values inside a field for the primary key proposal. This feature may be termed "CountDistinct". The value of this feature may be integer. For example, when the primary key proposal corresponds to a column of the table, the value of this feature indicates a number of distinct values in that column of the table. In some embodiments, the value of this feature may be determined during the profiling of the relational dataset.

Another example of a feature for a primary key proposal is a feature whose value indicates a number of fields in a relational dataset for which the primary key proposal is identified. This feature may be termed "DatasetFieldCount". The value of this feature may be integer. In some embodiments, the value of this feature may be determined during the profiling of the relational dataset.

Another example of a feature for a primary key proposal is a feature whose value indicates a distance from a name of a field for the primary key proposal to a name of the relational dataset. This feature may be termed "EditDistanceToDatasetName." The value of this feature may be integer. For example, when the primary key proposal corresponds to a column of the table, the value of this feature indicates a distance from that column's name to the name of the relational dataset. In some embodiments, the value of this feature may be determined after the profiling of the relational dataset. For example, a data profile may be generated that includes metadata including a name of the table and a name of each of the columns of the table. After generating the data profile, a distance (e.g., Levenshtein Distance, hamming distance, etc.) between a name of a field of the primary key proposal and the name of the table may be determined.

Another example of a feature for a primary key proposal is a feature whose value indicates a distance between a position of the right-most field of the proposal and a position of the left-most field of the proposal. This feature may be termed "FieldDistances". The value of this feature may be integer. For example, if the proposal is a single-field proposal, the distance is 1, and if the proposal is a multi-field proposal including three fields next to one another, the distance is 3. This feature captures the fact that fields of a multi-field key are more likely to occur next to each other. In some embodiments, the value of this feature may be determined after the profiling of the relational dataset.

Another example of a feature for a primary key proposal is a feature whose value indicates a proportion of field values in fields of the primary key proposal that are blank. This feature may be termed "FractionBlank". The value of this feature may be float. For example, when the primary key proposal corresponds to a column of the table, the value of this feature indicates a proportion of values in that column that are blank. Since primary keys do not contain blank values, the value of this feature is highly informative to the primary key discovery process. In some embodiments, the value of this feature may be determined after the profiling of the relational dataset.

Another example of a feature for a primary key proposal is a feature whose value indicates a proportion of field values in fields of the primary key proposal that are distinct. This feature may be termed "FractionDistinct". The value of this feature may be float. For example, when the primary key proposal corresponds to a column of the table, the value of this feature indicates a proportion of values in that column that are distinct. In other words, the value indicates a proportion of distinct rows (i.e., non-duplicative rows) for the column. In this case, two or more rows may contain duplicate values, but the feature counts all of those rows as corresponding to a distinct value. In some embodiments, the value of this feature may be determined after the profiling of the relational dataset.

Another example of a feature for a primary key proposal is a feature whose value indicates a proportion of field values in fields of the primary key proposal that are empty. This feature may be termed "FractionEmpty". The value of this feature may be float. For example, when the primary key proposal corresponds to a column of the table, the value of this feature indicates a proportion of values in that column that are empty. In other words, the value indicates a proportion of rows for the column that are empty. In some embodiments, the value of this feature may be determined after the profiling of the relational dataset.

Another example of a feature for a primary key proposal is a feature whose value indicates a proportion of field values in fields of the primary key proposal that are invalid. This feature may be termed "FractionInvalid". The value of this feature may be float. For example, when the primary key proposal corresponds to a column of the table, the value of this feature indicates a proportion of values in that column that are invalid. In other words, the value indicates a proportion of rows for the column having invalid values. In some embodiments, the value of this feature may be determined after the profiling of the relational dataset.

Another example of a feature for a primary key proposal is a feature whose value indicates a proportion of field values in fields of the primary key proposal that are null. This feature may be termed "FractionNull". The value of this feature may be float. For example, when the primary key proposal corresponds to a column of the table, the value of this feature indicates a proportion of values in that column that are null. In other words, the value indicates a proportion of rows for the column having null values. Since primary keys do not contain null values, the value of this feature is highly informative to the primary key discovery process. In some embodiments, the value of this feature may be determined after the profiling of the relational dataset.

Another example of a feature for a primary key proposal is a feature whose value indicates a proportion of field values in fields of the primary key proposal that are unique. This feature may be termed "FractionUnique". The value of this feature may be float. For example, when the primary key proposal corresponds to a column of the table, the value of this feature indicates a proportion of values in that column that are unique. In other words, the value indicates a proportion of rows for the column having unique values. In this case, uniqueness indicates no duplicate values in the column. Since primary keys should contain unique values, the value of this feature is highly informative to the primary key discovery process. In some embodiments, the value of this feature may be determined after the profiling of the relational dataset.

Another example of a feature for a primary key proposal is a feature whose value indicates whether field values for fields of the primary key proposal contain a date. This feature may be termed "HasDate". The value of this feature may be Boolean, where a value of "0" indicates that the field value does not contain a date and a value of "1" indicates that the field value contains a date. For example, when the primary key proposal corresponds to a column of the table, the value of this feature indicates whether values of that column contain a date. In some embodiments, the value of this feature may be determined during the profiling of the relational dataset.

Another example of a feature for a primary key proposal is a feature whose value indicates whether field values for fields of the primary key proposal contain a datetime. This feature may be termed "HasDateTime". The value of this feature may be Boolean, where a value of "0" indicates that the field value does not contain a datetime and a value of "1" indicates that the field value contains a datetime. For example, when the primary key proposal corresponds to a column of the table, the value of this feature indicates whether values of that column contain a datetime. In some embodiments, the value of this feature may be determined during the profiling of the relational dataset.

Another example of a feature for a primary key proposal is a feature whose value indicates whether field values for fields of the primary key proposal contain a float. This feature may be termed "HasFloat". The value of this feature may be Boolean, where a value of "0" indicates that the field value does not contain a float and a value of "1" indicates that the field value contains a float. For example, when the primary key proposal corresponds to a column of the table, the value of this feature indicates whether values of that column contain a float. In some embodiments, the value of this feature may be determined during the profiling of the relational dataset.

Another example of a feature for a primary key proposal is a feature whose value indicates whether field values for fields of the primary key proposal contain an integer. This feature may be termed "HasInteger". The value of this feature may be Boolean, where a value of "0" indicates that the field value does not contain an integer and a value of "1" indicates that the field value contains an integer. For example, when the primary key proposal corresponds to a column of the table, the value of this feature indicates whether values of that column contain an integer. In some embodiments, the value of this feature may be determined during the profiling of the relational dataset.

Another example of a feature for a primary key proposal is a feature whose value indicates whether field values for fields of the primary key proposal contain a string. This feature may be termed "HasString". The value of this feature may be Boolean, where a value of "0" indicates that the field value does not contain a string and a value of "1" indicates that the field value contains a string. For example, when the primary key proposal corresponds to a column of the table, the value of this feature indicates whether values of that column contain a string. In some embodiments, the value of this feature may be determined during the profiling of the relational dataset.

Another example of a feature for a primary key proposal is a feature whose value indicates a number of foreign keys for which the primary key proposal serves as a target. This feature may be termed "IsTargetCount". The value of this feature may be integer. For example, when the primary key proposal corresponds to a column of the table, the value of this feature indicates a number of foreign keys for which that column serves as a target. In some embodiments, the value of this feature may be determined after the profiling of the relational dataset.

Another example of a feature for a primary key proposal is a feature whose value indicates a position of a field for the primary key proposal relative to a last column field of the relational dataset. This feature may be termed "LastFieldPositionFromEnd". The value of this feature may be integer. For example, when the primary key proposal corresponds to a column of the table, the value of this feature indicates a position of that column relative to a last column of the relational dataset. In some embodiments, the value of this feature may be determined after the profiling of the relational dataset.

Another example of a feature for a primary key proposal is a feature whose value indicates a maximum length of field values in fields for the primary key proposal. This feature may be termed "Max Field Length". The value of this feature may be integer. For example, when the primary key proposal corresponds to a column of a table, the value of this feature indicates a maximum length of the values in that column of the table. In some embodiments, the value of this feature may be determined during the profiling of the relational dataset.

Another example of a feature for a primary key proposal is a feature whose value indicates how far from the left of a relational dataset a first field of the primary key proposal is. This feature may be termed "MinFieldPosition". The value of this feature may be integer. For example, when a multi-field primary key proposal corresponds to multiple columns of a table, the value of this feature includes how far from the left of the table a first column of the proposal is. In some embodiments, the value of this feature may be determined after the profiling of the relational dataset.

II. Features for Identifying Foreign Key(s)

In some embodiments, as described herein, one or more foreign key proposals may be identified for the second relational dataset using primary key candidate(s) identified for the first relational dataset. A set of foreign key feature values for each foreign key proposal may be obtained using data profiles corresponding to the first and second relational datasets. The set can include feature values for one or more of the features listed below.

Values of any one or more (e.g., one, two, at least five, at least ten, all, etc.) of the features described below may be obtained for a foreign key proposal. In some embodiments, the values of any one or more of the features may be obtained from the data profiles corresponding to the first and second relational datasets. In these embodiments, the values of the features may be determined during the profiling of the first and second relational datasets. The data profile for the second relational dataset may have information about values of those fields in the second relational dataset. This information may be derived from the values of the fields when the data profile was generated. In some embodiments, the data profile does not include the all the values of all the fields themselves, but rather only information derived from those values. In some embodiments, the values of any one or more of the features may be generated using information in the data profiles. In these embodiments, the values of the features may be determined or computed after the profiling of the first and second relational datasets.

For example, the second relational dataset may be a table and the foreign key proposal may correspond to a column of the table. The data profile for the table may include information about values in that column of the table. The information may be derived from the values in the column during generation of the data profile. In some embodiments, the data profile does not include all the field values in the column, but rather includes only information derived from those values.

In some embodiments, the derived information from a data profile for the first relational dataset (including information about a primary key candidate) and a data profile for second relational dataset (including information about a foreign key proposal) may specify directly or may be used to determine values for the features described below.

One example of a feature for a foreign key proposal is a feature whose value indicates whether a name of a field for a foreign key proposal matches a name of a field for a primary key candidate. This feature may be termed "Key-NamesMatch". The value of this feature may be Boolean, where a value of "0" indicates that a field name for a foreign key proposal does not match a field name for a primary key candidate and a value of "1" indicates that a field name for a foreign key proposal matches a field name for a primary key candidate. For example, when the foreign key proposal corresponds to a column of the second table and the primary key candidate corresponds to column of a first table, the value of this feature indicates whether the two column names match. In some embodiments, the value of this feature may be determined after the profiling of the relational dataset(s). For example, a first data profile of the first table may include metadata including the name of each of the columns in the first table and a second data profile of the second table may include metadata including the name of each of the columns in the second table. After generating the first and second data profiles, a determination may be made regarding whether the column names of the first table and the second table (e.g., column names corresponding to the primary key candidate and the foreign key proposal, respectively) match.

Another example of a feature for a foreign key proposal is a feature whose value indicates a similarity measure between a field name for a foreign key proposal and a field name for a primary key candidate. This feature may be termed "KeyNamesEditDistance." The value of this feature may be integer. In some embodiments, the value of this feature may be determined after the profiling of the relational dataset(s). For example, a first data profile of a first table may include metadata including the name of each of the columns in the first table and a second data profile of a second table may include metadata including the name of each of the columns in the second table. After generating the first and second data profiles, a similarity measure between column names of the first table and the second table (e.g., column names corresponding to the primary key candidate and the foreign key proposal, respectively) may be determined. In some embodiments, the similarity measure may be determined by calculating a distance (e.g., Levenshtein Distance, hamming distance, etc.) between the column names.

Another example of a feature for a foreign key proposal is a feature whose value indicates a difference between an average length of field values in fields for the foreign key proposal and an average length of field values in fields for the primary key candidate. This feature may be termed "ValueLengthDifference". The value of this feature may be float. For example, when the foreign key proposal corresponds to a column of one table and the primary key candidate corresponds to column of another table, the value of this feature indicates a difference between an average length of values in the two columns. In some embodiments, the value of this feature may be determined after the profiling of the relational dataset(s). For example, a first data profile of the first table may include statistics including an average length of the values in each column of the first table and a second data profile of the second table may include statistics including an average length of values in each column of the second table. After generating the first and second data profiles, a difference between the average length of values in columns of the first table and the second table (e.g., column names corresponding to the primary key candidate and the foreign key proposal, respectively) may be determined.

Another example of a feature for a foreign key proposal is a feature whose value indicates a ratio of a number of values inside a field for the foreign key proposal and a number of values inside a field for the primary key candidate. This feature may be termed "CountRatio". The value of this feature may be float. For example, when the foreign key proposal corresponds to a column of one table and the primary key candidate corresponds to column of another table, the value of this feature indicates ratio of values in the two columns. In some embodiments, the value of this feature may be determined after the profiling of the relational dataset(s). For example, a first data profile of the first table may include statistics including a number of values in each column of the first table and a second data profile of the second table may include statistics including a number of values in each column of the second table. After generating the first and second data profiles, a ratio of the number of values in the columns of the first table and the second table (e.g., column names corresponding to the primary key candidate and the foreign key proposal, respectively) may be determined.

Another example of a feature for a foreign key proposal is a feature whose value indicates whether values in a field for the primary key candidate are the same as values in a field for the foreign key proposal. This feature may be termed "EqualValueSets." The value of this feature may be Boolean. A value of "1" may indicate that the field values are the same and a value of "0" may indicate that the field values are not the same. In some embodiments, the value of this feature may be determined after the profiling of the relational dataset(s).

Another example of a feature for a foreign key proposal is a feature whose value indicates a percentage of values in a field for the primary key candidate that exist in a field for the foreign key proposal. This feature may be termed "PrimaryCoverage." The value of this feature may be float. In some embodiments, the value of this feature may be determined after the profiling of the relational dataset(s).

Another example of a feature for a foreign key proposal is a feature whose value indicates a similarity between values inside a field for the foreign key proposal and values inside a field for the primary key candidate. This feature may be termed "JaccardIndex". The value of this feature may be float. For example, when the foreign key proposal corresponds to a column of one table and the primary key candidate corresponds to column of another table, the value of this feature indicates a similarity between values in the two columns. In some embodiments, the value of this feature may be determined after the profiling of the relational dataset(s).

Another example of a feature for a foreign key proposal is a feature whose value indicates a percentage of values in a field for the foreign key proposal that exist in a field for the primary key candidate. This feature may be termed "ReferenceCoverage." The value of this feature may be float. In some embodiments, the value of this feature may be determined after the profiling of the relational dataset(s).

Another example of a feature for a foreign key proposal is a feature whose value indicates a number of foreign keys for which the foreign key proposal serves as a target. This feature may be termed "ReferenceIsTargetCount". The value of this feature may be integer. For example, when the foreign key proposal corresponds to a column of the table, the value of this feature indicates a number of foreign keys for which that column serves as a target. In some embodiments, the value of this feature may be determined after the profiling of the relational dataset(s).

Another example of a feature for a foreign key proposal is a feature whose value indicates how often a field for the foreign key proposal is mentioned as a target by other foreign key proposals. This feature may be termed "ReferenceIsSourceCount." The value of this feature may be integer. In some embodiments, the value of this feature may be determined after the profiling of the relational dataset(s).

Another example of a feature for a foreign key proposal is a feature whose value indicates an average length of field values in fields for the primary key candidate. This feature may be termed "Primary AverageLengthField". The value of this feature may be float. For example, when the primary key candidate corresponds to a column of a table, the value of this feature indicates average length of the values in that column of the table. In some embodiments, the value of this feature may be determined during the profiling of the relational dataset(s). For example, as the data profile for the table is being generated, the lengths of all values in the column of the table may be determined and the average length of the values may be computed from the determined lengths.

Another example of a feature for a foreign key proposal is a feature whose value indicates whether a name of a field for the primary key candidate contains a name of the first relational dataset. This feature may be termed "PrimaryContainsDatasetName". The value of this feature may be Boolean, where the value "0" indicates that a name of a field for the primary key proposal does not contain a name of the first relational dataset and the value "1" indicates that a name of a field for the primary key proposal contains a name of the first relational dataset. For example, when the primary key proposal corresponds to a column of the table, the value of this feature indicates whether that column's name contains a name of the first relational dataset. In some embodiments, the value of this feature may be determined after the profiling of the relational dataset(s).

Another example of a feature for a foreign key proposal is a feature whose value indicates a number of values inside a field for the primary key candidate. This feature may be termed "PrimaryCount". The value of this feature may be integer. For example, when the primary key candidate corresponds to a column of the table, the value of this feature indicates a number of values in that column of the table. In some embodiments, the value of this feature may be determined during the profiling of the relational dataset(s).

Another example of a feature for a foreign key proposal is a feature whose value indicates a number of distinct values inside a field for the primary key candidate. This feature may be termed "PrimaryCountDistinct". The value of this feature may be integer. For example, when the primary key candidate corresponds to a column of the table, the value of this feature indicates a number of distinct values in that column of the table. In some embodiments, the value of this feature may be determined during the profiling of the relational dataset(s).

Another example of a feature for a foreign key proposal is a feature whose value indicates a number of fields in a first relational dataset for which the primary key candidate is identified. This feature may be termed "PrimaryDatasetFieldCount". The value of this feature may be integer. In some embodiments, the value of this feature may be determined during the profiling of the relational dataset(s).

Another example of a feature for a foreign key proposal is a feature whose value indicates a distance from a name of a field for the primary key candidate to a name of the first relational dataset. This feature may be termed "PrimaryEditDistanceToDatasetName." The value of this feature may be integer. For example, when the primary key candidate corresponds to a column of the table, the value of this feature indicates a distance from that column's name to the name of the first relational dataset. In some embodiments, the value of this feature may be determined after the profiling of the relational dataset(s).

Another example of a feature for a foreign key proposal is a feature whose value indicates a distance between a position of the right-most field of the primary key candidate and a position of the left-most field of the primary key candidate. This feature may be termed "PrimaryFieldDistances." The value of this feature may be integer. For example, if the primary key candidate is a single-field candidate, the distance is 1, and if the primary key candidate is a multi-field candidate including three fields next to one another, the distance is 3. This feature captures the fact that fields of a multi-field key are more likely to occur next to each other. In some embodiments, the value of this feature may be determined after the profiling of the relational dataset(s).

Another example of a feature for a foreign key proposal is a feature whose value indicates a proportion of field values in fields of the primary key candidate that are blank. This feature may be termed "PrimaryFractionBlank". The value of this feature may be float. For example, when the primary key candidate corresponds to a column of the table, the value of this feature indicates a proportion of values in that column that are blank. In some embodiments, the value of this feature may be determined after the profiling of the relational dataset(s).

Another example of a feature for a foreign key proposal is a feature whose value indicates a proportion of field values in fields of the primary key candidate that are distinct. This feature may be termed "PrimaryFractionDistinct". The value of this feature may be float. For example, when the primary key candidate corresponds to a column of the table, the value of this feature indicates a proportion of values in that column that are distinct. In some embodiments, the value of this feature may be determined after the profiling of the relational dataset(s).

Another example of a feature for a foreign key proposal is a feature whose value indicates a proportion of field values in fields of the primary key candidate that are empty. This feature may be termed "PrimaryFractionEmpty". The value of this feature may be float. For example, when the primary key candidate corresponds to a column of the table, the value of this feature indicates a proportion of values in that column that are empty. In other words, the value indicates a proportion of rows for the column that are empty. In some embodiments, the value of this feature may be determined after the profiling of the relational dataset(s).

Another example of a feature for a foreign key proposal is a feature whose value indicates a proportion of field values in fields of the primary key candidate that are invalid. This feature may be termed "PrimaryFractionInvalid". The value of this feature may be float. For example, when the primary key candidate corresponds to a column of the table, the value of this feature indicates a proportion of values in that column that are invalid. In other words, the value indicates a proportion of rows for the column having invalid values. In some embodiments, the value of this feature may be determined after the profiling of the relational dataset(s).

Another example of a feature for a foreign key proposal is a feature whose value indicates a proportion of field values in fields of the primary key candidate that are null. This feature may be termed "PrimaryFractionNull". The value of this feature may be float. For example, when the primary key candidate corresponds to a column of the table, the value of this feature indicates a proportion of values in that column that are null. In other words, the value indicates a proportion of rows for the column having null values. In some embodiments, the value of this feature may be determined after the profiling of the relational dataset(s).

Another example of a feature for a foreign key proposal is a feature whose value indicates a proportion of field values in fields of the primary key candidate that are unique. This feature may be termed "PrimaryFractionUnique". The value of this feature may be float. For example, when the primary key candidate corresponds to a column of the table, the value of this feature indicates a proportion of values in that column that are unique. In some embodiments, the value of this feature may be determined after the profiling of the relational dataset(s).

Another example of a feature for a foreign key proposal is a feature whose value indicates whether field values for fields of the primary key candidate contain a date. This feature may be termed "Primary HasDate". The value of this feature may be Boolean, where a value of "0" indicates that the field value does not contain a date and a value of "1" indicates that the field value contains a date. For example, when the primary key candidate corresponds to a column of the table, the value of this feature indicates whether values of that column contain a date. In some embodiments, the value of this feature may be determined during the profiling of the relational dataset(s).

Another example of a feature for a foreign key proposal is a feature whose value indicates whether field values for fields of the primary key candidate contain a datetime. This feature may be termed "Primary HasDateTime". The value of this feature may be Boolean, where a value of "0" indicates that the field value does not contain a datetime and a value of "1" indicates that the field value contains a datetime. For example, when the primary key candidate corresponds to a column of the table, the value of this feature indicates whether values of that column contain a datetime. In some embodiments, the value of this feature may be determined during the profiling of the relational dataset(s).

Another example of a feature for a foreign key proposal is a feature whose value indicates whether field values for fields of the primary key candidate contain a float. This feature may be termed "Primary HasFloat". The value of this feature may be Boolean, where a value of "O" indicates that the field value does not contain a float and a value of "1" indicates that the field value contains a float. For example, when the primary key candidate corresponds to a column of the table, the value of this feature indicates whether values of that column contain a float. In some embodiments, the value of this feature may be determined during the profiling of the relational dataset(s).

Another example of a feature for a foreign key proposal is a feature whose value indicates whether field values for fields of the primary key candidate contain an integer. This feature may be termed "PrimaryHasInteger". The value of this feature may be Boolean, where a value of "0" indicates that the field value does not contain an integer and a value of "1" indicates that the field value contains an integer. For example, when the primary key candidate corresponds to a column of the table, the value of this feature indicates whether values of that column contain an integer. In some embodiments, the value of this feature may be determined during the profiling of the relational dataset(s).

Another example of a feature for a foreign key proposal is a feature whose value indicates whether field values for fields of the primary key candidate contain a string. This feature may be termed "PrimaryHasString". The value of this feature may be Boolean, where a value of "0" indicates that the field value does not contain a string and a value of "1" indicates that the field value contains a string. For example, when the primary key candidate corresponds to a column of the table, the value of this feature indicates whether values of that column contain a string. In some embodiments, the value of this feature may be determined during the profiling of the relational dataset(s).

Another example of a feature for a foreign key proposal is a feature whose value indicates a number of foreign keys for which the primary key candidate serves as a target. This feature may be termed "PrimaryIsTargetCount". The value of this feature may be integer. For example, when the primary key candidate corresponds to a column of the table, the value of this feature indicates a number of foreign keys for which that column serves as a target. In some embodiments, the value of this feature may be determined after the profiling of the relational dataset(s).

Another example of a feature for a foreign key proposal is a feature whose value indicates a position of a field for the primary key candidate relative to a last column field of the first relational dataset. This feature may be termed "PrimaryLastFieldPositionFromEnd". The value of this feature may be integer. For example, when the primary key candidate corresponds to a column of the table, the value of this feature indicates a position of that column relative to a last column of the first relational dataset. In some embodiments, the value of this feature may be determined after the profiling of the relational dataset(s).

Another example of a feature for a foreign key proposal is a feature whose value indicates a maximum length of field values in fields for the primary key candidate. This feature may be termed "Primary MaxFieldLength". The value of this feature may be integer. For example, when the primary key candidate corresponds to a column of a table, the value of this feature indicates a maximum length of the values in that column of the table. In some embodiments, the value of this feature may be determined during the profiling of the relational dataset(s).

Another example of a feature for a foreign key proposal is a feature whose value indicates how far from the left of a relational dataset a first field of the primary key candidate is. This feature may be termed "PrimaryMinFieldPosition." The value of this feature may be integer. For example, when a multi-field primary key candidate corresponds to multiple columns of a table, the value of this feature includes how from the left of the table a first column of the candidate is. In some embodiments, the value of this feature may be determined after the profiling of the relational dataset(s).

Another example of a feature for a foreign key proposal is a feature whose value indicates a proportion of field values in fields of the foreign key proposal that are distinct. This feature may be termed "ReferenceFractionDistinct". The value of this feature may be float. For example, when the foreign key proposal corresponds to a column of the table, the value of this feature indicates a proportion of values in that column that are distinct. In other words, the value indicates a proportion of distinct rows (i.e., non-duplicative rows) for the column. In some embodiments, the value of this feature may be determined after the profiling of the relational dataset(s).

Another example of a feature for a foreign key proposal is a feature whose value indicates a proportion of field values in fields of the foreign key proposal that are unique. This feature may be termed "ReferenceFractionUnique". The value of this feature may be float. For example, when the foreign key proposal corresponds to a column of the table, the value of this feature indicates a proportion of values in that column that are unique. In other words, the value indicates a proportion of rows for the column having unique values. In some embodiments, the value of this feature may be determined after the profiling of the relational dataset(s).

Another example of a feature for a foreign key proposal is a feature whose value indicates a number of values inside a field for the foreign key proposal. This feature may be termed "ReferenceCount". The value of this feature may be integer. For example, when the foreign key proposal corresponds to a column of the table, the value of this feature indicates a number of values in that column of the table. In some embodiments, the value of this feature may be determined after the profiling of the relational dataset(s).

Another example of a feature for a foreign key proposal is a feature whose value indicates a number of distinct values inside a field for the foreign key proposal. This feature may be termed "ReferenceCountDistinct". The value of this feature may be integer. For example, when the foreign key proposal corresponds to a column of the table, the value of this feature indicates a number of distinct values in that column of the table. In some embodiments, the value of this feature may be determined after the profiling of the relational dataset(s).

Another example of a feature for a foreign key proposal is a feature whose value indicates a number of values in a field for the foreign key proposal that do not exist in a field for the primary key candidate. This feature may be termed "Reference Violations." The value of this feature may be integer. In some embodiments, the value of this feature may be determined during the profiling of the relational dataset(s).

Another example of a feature for a foreign key proposal is a feature whose value indicates a fraction of values in a field for the foreign key proposal that do not exist in a field for the primary key candidate. This feature may be termed "ReferenceFraction Violations." The value of this feature may be integer. In some embodiments, the value of this feature may be determined after the profiling of the relational dataset(s).

Another example of a feature for a foreign key proposal is a feature whose value indicates how far from the left of a relational dataset a first field of the foreign key proposal is. This feature may be termed "ReferenceMinFieldPosition." The value of this feature may be integer. For example, when a multi-field primary key proposal corresponds to multiple columns of a table, the value of this feature includes the number of columns from the left of the table that a first column of the foreign key proposal is situated in the table. In some embodiments, the value of this feature may be determined after the profiling of the relational dataset(s).

Another example of a feature for a foreign key proposal is a feature whose value indicates a number of fields in a second relational dataset for which the foreign key proposal is identified. This feature may be termed "DatasetFieldCount". The value of this feature may be integer. In some embodiments, the value of this feature may be determined during the profiling of the relational dataset(s).

Another example of a feature for a foreign key proposal is a feature whose value indicates a proportion of field values in fields of the foreign key proposal that are blank. This feature may be termed "ReferenceFractionBlank". The value of this feature may be float. For example, when the foreign key proposal corresponds to a column of the table, the value of this feature indicates a proportion of values in that column that are blank. In some embodiments, the value of this feature may be determined during the profiling of the relational dataset(s).

Another example of a feature for a foreign key proposal is a feature whose value indicates a proportion of field values in fields of the foreign key proposal that are empty. This feature may be termed "ReferenceFractionEmpty". The value of this feature may be float. For example, when the foreign key proposal corresponds to a column of the table, the value of this feature indicates a proportion of values in that column that are empty. In other words, the value indicates a proportion of rows for the column that are empty. In some embodiments, the value of this feature may be determined after the profiling of the relational dataset(s).

Another example of a feature for a foreign key proposal is a feature whose value indicates a proportion of field values in fields of the foreign key proposal that are null. This feature may be termed "ReferenceFractionNull". The value of this feature may be float. For example, when the foreign key proposal corresponds to a column of the table, the value of this feature indicates a proportion of values in that column that are null. In other words, the value indicates a proportion of rows for the column having null values. In some embodiments, the value of this feature may be determined after the profiling of the relational dataset(s).

Another example of a feature for a foreign key proposal is a feature whose value indicates a proportion of field values in fields of the foreign key proposal that are invalid. This feature may be termed "ReferenceFractionInvalid". The value of this feature may be float. For example, when the foreign key proposal corresponds to a column of the table, the value of this feature indicates a proportion of values in that column that are invalid. In other words, the value indicates a proportion of rows for the column having invalid values. In some embodiments, the value of this feature may be determined after the profiling of the relational dataset(s).

Another example of a feature for a foreign key proposal is a feature whose value indicates a maximum length of field values in fields for the foreign key proposal. This feature may be termed "ReferenceMaxFieldLength". The value of this feature may be integer. For example, when the foreign key proposal corresponds to a column of a table, the value of this feature indicates a maximum length of the values in that column of the table. In some embodiments, the value of this feature may be determined during the profiling of the relational dataset(s).

Another example of a feature for a foreign key proposal is a feature whose value indicates an average length of field values in fields for the foreign key proposal. This feature may be termed "ReferenceAverageLengthField". The value of this feature may be float. For example, when the foreign key proposal corresponds to a column of a table, the value of this feature indicates average length of the values in that column of the table. In some embodiments, the value of this feature may be determined during the profiling of the relational dataset(s).

Another example of a feature for a foreign key proposal is a feature whose value indicates whether a name of a field for the foreign key proposal contains a name of the first relational dataset (e.g., dataset that contains the primary key candidate). This feature may be termed "ReferenceContainsPrimaryDatasetName". The value of this feature may be Boolean, where the value "0" indicates that a name of a field for the foreign key proposal does not contain a name of the first relational dataset and the value "1" indicates that a name of a field for the foreign key proposal contains a name of the first relational dataset. For example, when the foreign key proposal corresponds to a column of the table, the value of this feature indicates whether that column's name contains a name of the first relational dataset. In some embodiments, the value of this feature may be determined after the profiling of the relational dataset(s).

Another example of a feature for a foreign key proposal is a feature whose value indicates whether field values for fields of the foreign key proposal contain an integer. This feature may be termed "ReferenceHasInteger". The value of this feature may be Boolean, where a value of "0" indicates that the field value does not contain an integer and a value of "1" indicates that the field value contains an integer. For example, when the foreign key proposal corresponds to a column of the table, the value of this feature indicates whether values of that column contain an integer. In some embodiments, the value of this feature may be determined during the profiling of the relational dataset(s).

Another example of a feature for a foreign key proposal is a feature whose value indicates whether field values for fields of the foreign key proposal contain a float. This feature may be termed "ReferenceHasFloat". The value of this feature may be Boolean, where a value of "O" indicates that the field value does not contain a float and a value of "1" indicates that the field value contains a float. For example, when the foreign key proposal corresponds to a column of the table, the value of this feature indicates whether values of that column contain a float. In some embodiments, the value of this feature may be determined during the profiling of the relational dataset(s).

Another example of a feature for a foreign key proposal is a feature whose value indicates whether field values for fields of the foreign key proposal contain a date. This feature may be termed "ReferenceHasDate". The value of this feature may be Boolean, where a value of "0" indicates that the field value does not contain a date and a value of "1" indicates that the field value contains a date. For example, when the foreign key proposal corresponds to a column of the table, the value of this feature indicates whether values of that column contain a date. In some embodiments, the value of this feature may be determined during the profiling of the relational dataset(s).

Another example of a feature for a foreign key proposal is a feature whose value indicates whether field values for fields of the foreign key proposal contain a datetime. This feature may be termed "ReferenceHasDateTime". The value of this feature may be Boolean, where a value of "0" indicates that the field value does not contain a datetime and a value of "1" indicates that the field value contains a datetime. For example, when the foreign key proposal corresponds to a column of the table, the value of this feature indicates whether values of that column contain a datetime. In some embodiments, the value of this feature may be determined during the profiling of the relational dataset(s).

Another example of a feature for a foreign key proposal is a feature whose value indicates whether field values for fields of the foreign key proposal contain a string. This feature may be termed "ReferenceHasString". The value of this feature may be Boolean, where a value of "0" indicates that the field value does not contain a string and a value of "1" indicates that the field value contains a string. For example, when the foreign key proposal corresponds to a column of the table, the value of this feature indicates whether values of that column contain a string. In some embodiments, the value of this feature may be determined during the profiling of the relational dataset(s).

III. Machine Learning Models

In some embodiments, a first trained machine learning model used for identifying primary key candidates may comprise a plurality of parameter values, and processing set(s) of primary key feature values using the first trained machine learning model includes determining one or more scores by using the set(s) of primary key feature values and the plurality of parameter values of the first trained machine learning model.

The first trained machine learning model includes inputs, parameters, and outputs. The set(s) of primary key features values used to identify the primary key candidates may be provided as inputs to the first trained machine learning model. The first trained machine learning model determines score(s) for the primary key proposals by using the set(s) of primary key feature values and the parameters of the first trained machine learning model. In some embodiments, primary key feature values associated with any number of features described in Section I above may be used. For example, 1, 2, 3, 4, 5, 6, 7, 8, 9, 10, 11, 12, 13, 14, 15, 16, 17, 18, 19, 20, 21, or 22 features may be used without departing from the scope of this disclosure.

In some embodiments, the first trained machine learning model comprises a trained random forest model. The random forest model that may be an ensemble of multiple decision tree models. The prediction (e.g., classification) generated by the random forest model is formed based on the predictions generated by the multiple decision tress part of the ensemble. Any suitable random forest model may be used, such as those described in article titled "Random Decision Forests," by Ho (Proceedings of the 3rd International Conference on Document Analysis and Recognition, Montreal, QC, 14-16 Aug. 1995. pp. 278-282); article titled "The Random Subspace Method for Constructing Decision Forests," by Ho (IEEE Transactions on Pattern Analysis and Machine Intelligence. 20 (8): 832-844); and article titled "Random Forests," by Breiman (Machine Learning 45, 5-32 (2001), each of which are incorporated by reference herein in its entirety.

In some embodiments, training data used to train the first machine learning model may include hundreds, thousands, or ten thousands of relational datasets (e.g., tables) of varying sizes (e.g., including different numbers of rows and columns). The training data may also include information regarding characteristics or features (e.g., features described above in Section I) of known primary and/or unique keys for the relational datasets. In some embodiments, the training data may include information regarding the features derived from test, benchmarking, or example datasets obtained from remote or online sources (e.g., publicly available databases such as Kaggle, Microsoft, etc.) and/or internal sources (e.g., datasets managed by the system described herein).

In an example implementation, the first machine learning model was trained using training data including 100 to 1000 tables, 10000 to 100,000 columns, 500-3000 primary keys, 500-2000 foreign keys, and/or 500-2000 unique keys. It will be appreciated that the first machine learning model may be trained using any suitable training data that can be used to estimate values of parameters in the first machine learning model as aspects of the disclosure are not limited in this respect.

In an example implementation, the first machine learning model was trained using the "sklearn.ensemble.RandomForestClassifier" class in the scikit-learn (sklearn) machine learning library using default parameters. Other random forest model training algorithms may be used without departing from the scope of this disclosure.

In some embodiments, a second trained machine learning model used for identifying foreign key candidates may comprise a plurality of parameter values and processing the set(s) of foreign key feature values using the second trained machine learning model includes determining one or more scores for one or more foreign key proposals by using the one or more sets of foreign key feature values and the plurality of parameter values of the second trained machine learning model.

The second trained machine learning model includes inputs, parameters, and outputs. The set(s) of foreign key feature values used to identify foreign key candidates may be provided as input to the second trained machine learning model. The second trained machine learning model determines score(s) for the foreign key proposals by using the set(s) of foreign key feature values and the parameters of the second trained machine learning model. In some embodiments, foreign key feature values associated with any number of features described in Section II above may be used. For example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 features may be used without departing from the scope of this disclosure.

In some embodiments, the second trained machine learning model comprises a trained random forest model. The random forest model that may be an ensemble of multiple decision tree models. The prediction (e.g., classification) generated by the random forest model is formed based on the predictions generated by the multiple decision tress part of the ensemble. Any suitable random forest model may be used, such as those described in article titled "Random Decision Forests," by Ho (Proceedings of the 3rd International Conference on Document Analysis and Recognition, Montreal, QC, 14-16 Aug. 1995. pp. 278-282); article titled "The Random Subspace Method for Constructing Decision Forests," by Ho (IEEE Transactions on Pattern Analysis and Machine Intelligence. 20 (8): 832-844); and article titled "Random Forests," by Breiman (Machine Learning 45, 5-32 (2001), each of which are incorporated by reference herein in its entirety.

Training data used to train the second machine learning model may include hundreds, thousands, or ten thousands of relational datasets (e.g., tables) of varying sizes (e.g., including different numbers of rows and columns). The training data may also include information regarding characteristics or features (e.g., features described above in Section II) of known primary and/or foreign keys for the relational datasets. In some embodiments, the training data may include information regarding the features derived from test, benchmarking, or example datasets obtained from remote or online sources (e.g., publicly available databases such as Kaggle, Microsoft, etc.) and/or internal sources (e.g., datasets managed by the system described herein).

In an example implementation, the second machine learning model was trained using training data including 100 to 1000 tables, 10000 to 100,000 columns, 500-3000 primary keys, 500-2000 foreign keys, and/or 500-2000 unique keys. It will be appreciated that the second machine learning model may be trained using any suitable training data that can be used to estimate values of parameters in the second machine learning model as aspects of the disclosure are not limited in this respect.

In an example implementation, the second machine learning model was trained using the "sklearn.ensemble.RandomForestClassifier" class in the scikit-learn (sklearn) machine learning library using default parameters. Other random forest model training algorithms may be used without departing from the scope of this disclosure.

It will be appreciated that other trained machine learning models may be used as first and second trained machine learning models without departing from the scope of this disclosure. Examples of other trained machine learning models may include a decision tree model, gradient boosted decision tree model, a neural network model, a support vector machine, a logistic regression model, a non-linear regression model, and a Bayesian model.

Following below are more detailed descriptions of various concepts related to, and embodiments of, methods and systems for discovering primary, unique, and/or foreign keys. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

FIG. 1A is a diagram illustrating an example environment including a data processing system 105 in which primary and foreign key discovery techniques may be applied, in accordance with some aspects of the technology described herein. FIG. 1A illustrates an enterprise system comprising systems 120a, 120b, 120c distributed across multiple geographic locations (e.g., different cites, countries, continents, etc.). Each of the systems 120a, 120b, 120c may store vast amounts of data (e.g., in one or more database systems, data warehouses, data lakes, etc.). For example, the systems 120a, 120b, 120c may be components of an enterprise system of a global bank, with the system 120a being located in the United States, system 120b being located in Europe, and system 120c being located in India. During operation of the enterprise system, each of the systems 120a, 120b, 120c may generate and/or store large amounts of data (e.g., terabytes of data). For example, the enterprise system may be for a credit card company, where each of the systems 120a, 120b, 120c generates and/or stores transaction data, credit scores, and/or any other suitable data. In another example, the enterprise system may be for a bank, where each of the systems 120a, 120b, 120c generates and/or stores data about bank records, loans, account holders, and/or any other suitable data. In another example, the enterprise system may be for a phone company, where each of the systems 120a, 120b, 120c generates and/or stores data about phone calls, text messages, data usage, and/or any other suitable data.

In some embodiments, each of the systems 120a, 120b, 120c may store the data in one or more database systems. The one or more database systems may comprise a database, data warehouse, data lake, and/or any other database system. The database systems(s) of each system 120a, 120b, 120c may be of any suitable type(s), either the same type or different types. For example, each of these systems may include one or more relational database systems (e.g., ORACLE, SQL SERVER, etc.) As another example, in some embodiments, each of these systems may include one or more other types of database systems (e.g., non-relational (e.g., NoSQL) database system, a multi-file system, or any other suitable type of database system). As shown in the example embodiment of FIG. 1A, each of the systems 120a, 120b, 120c stores data in one or more relational database systems, where the data is stored in relational datasets, such as, tables comprising data fields.

In the example embodiment of FIG. 1A, the data processing system 105 stores information describing data stored in the systems 120a, 120b, 120c. In this sense, the information may be considered to be metadata. The metadata may include any of numerous types of information about the data stored in the enterprise systems 120a, 120b, 120c. For example, the metadata may include information about systems that process data (e.g., servers or other computing devices executing on systems 120a, 120b, 120c), software applications executing on the enterprise system that are used to process data, and/or rules for the applications in storing the data. In another example, the metadata may include information about data throughout the enterprise software system such as how the data were generated, the size of data, description of the data, which user(s) are permitted to read, update, create, delete or perform any other action with respect to the data, and/or any other suitable information about the data.

In some embodiments, the data processing system 105 may be configured to obtain the information about data from the various systems 120a, 120b, 120c. For example, the data processing system 105 may query the respective database system(s) for metadata of the various systems 120a, 120b, 120c. In some embodiments, the data processing system 105 may be configured to generate metadata using information obtained from the systems 120a, 120b, 120c (e.g., by querying the respective database system(s) for metadata). In some embodiments, the data processing system 105 may be configured to store metadata about data stored in the systems 120a, 120b, 120c. For example, the systems 120a, 120b, 120c may each be a data lake, data warehouse, database system, or other type of system.

As shown in FIG. 1A, one or more users 102 may access the information about the data in the enterprise systems by interacting with the data processing system 105. For example, the user(s) 102 may interact with the data processing system 105 using one or more computing devices through one or more interfaces (e.g., user interface(s)) provided by the data processing system 105). Example interfaces through which the user(s) 102 may interact with the data processing system 105 are described herein with reference to FIGS. 6A-6B, 7-8, 9A-9B, 10, 11A-11B, 12, 13A-13C, 14A-14B, 15A-15B, 16, and 18.

Figure 1B:
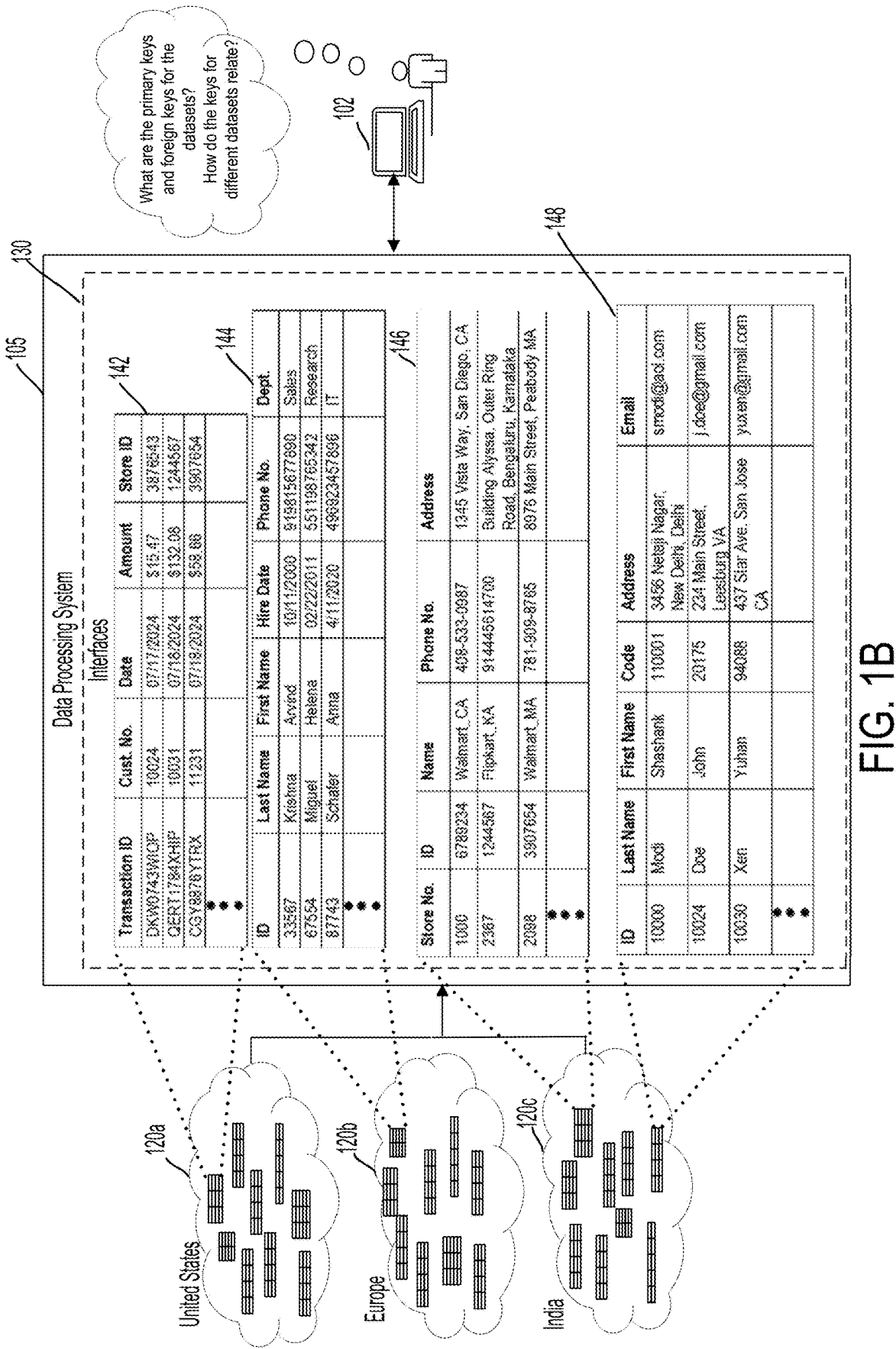
FIG. 1B is a diagram illustrating example relational datasets stored in a portion of the enterprise system, in accordance with some aspects of technology described herein.

FIG. 1B is a diagram illustrating example relational datasets stored in a portion of the enterprise system, according to some embodiments of technology described herein. As shown in the example of FIG. 1B, each of systems 120a, 120b, and 120c may store large numbers (e.g., thousands, millions, billions) of relational datasets, where each relational dataset (e.g., a table) may include several data fields. Typically, primary keys and foreign keys enable faster querying and retrieval of data in relational datasets. However, determining which of the several data fields of a table can serve as a primary key or a foreign key is a difficult task.

As shown in FIG. 1B, system 120a may store a transaction table 142, storing information about individual transactions made with a business, and including data fields "Transaction ID", "Customer number", "Date", "Amount", and "Store ID"; system 120b may store an employee table 144, storing information about individual employees of the business, and including data fields "ID", "Last Name", "First Name", "Hire Date", "Phone Number", "Department"; system 120c may store a customer table 146, storing information about individual customers that may have made a transaction with the business, and including data fields "ID", "Last Name", "First Name", "Code", "Address", and "Email", and a store table 148, storing information about individual stores of the business at which customers can shop, including data fields "Store number", "ID", "Name", "Phone Number", and "Address".

Data processing system 105 may include interfaces 130 that are configured to include user interfaces (e.g., graphical user interfaces) that allow users 102 to access information stored in the tables including the tables illustrated in FIG. 1B. A explained above, identification of primary keys and foreign keys in the tables is extremely difficult and time consuming when performed manually by a user of an application utilizing the tables. This is not only because of the sheer size of the tables, the number of data fields in the tables, and the lack of knowledge of relationships between fields of different table, but also because of different and non-user-friendly data field naming conventions used across the different tables. As one example, a data field may be named "Code," which may refer to different information in different tables—indeed "Code" in the customer table may refer to zip code whereas "Code" in a project table may refer to a project code. As another example, different tables may have data fields that have the same name but include different information, for example, the employee table, the store table, and the customer table all have an "ID" data field but the field refers to employee ID in the employee table, store ID in the store table, and customer ID in the customer table. As yet another example, two data fields in different tables may be used to store customer ids but the two data fields may be named differently in those tables, for example, "Customer Number" in a transaction table and "ID" in the customer table.

Figure 1C:
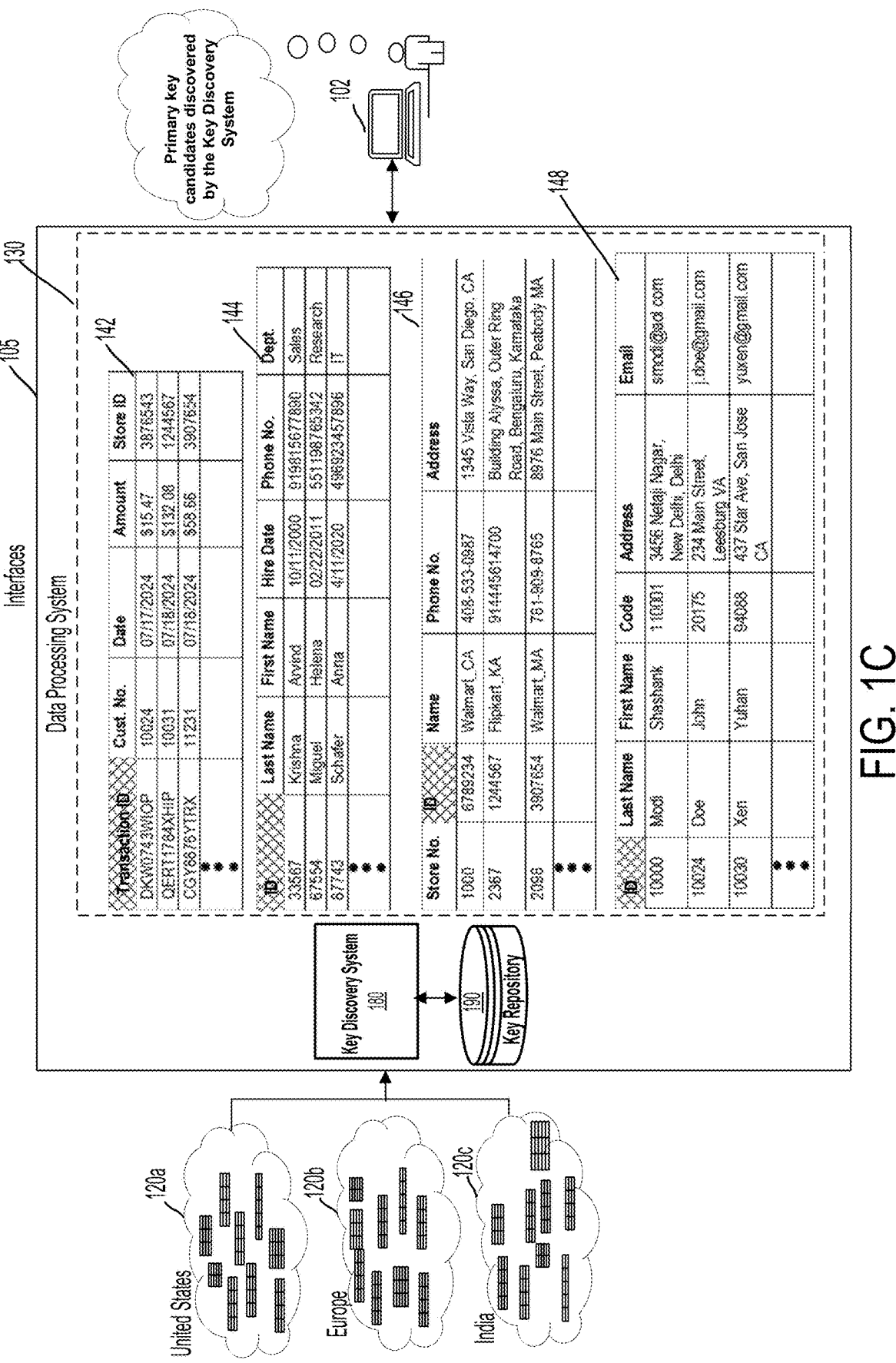
FIG. 1C is a block diagram of an illustrative data processing system 105 and a key discovery system 180 that is part of the data processing system 105 and relational datasets stored in a portion of the enterprise system with key discovery performed by the key discovery system 180, in accordance with some aspects of the technology described herein.
Figure 1D:
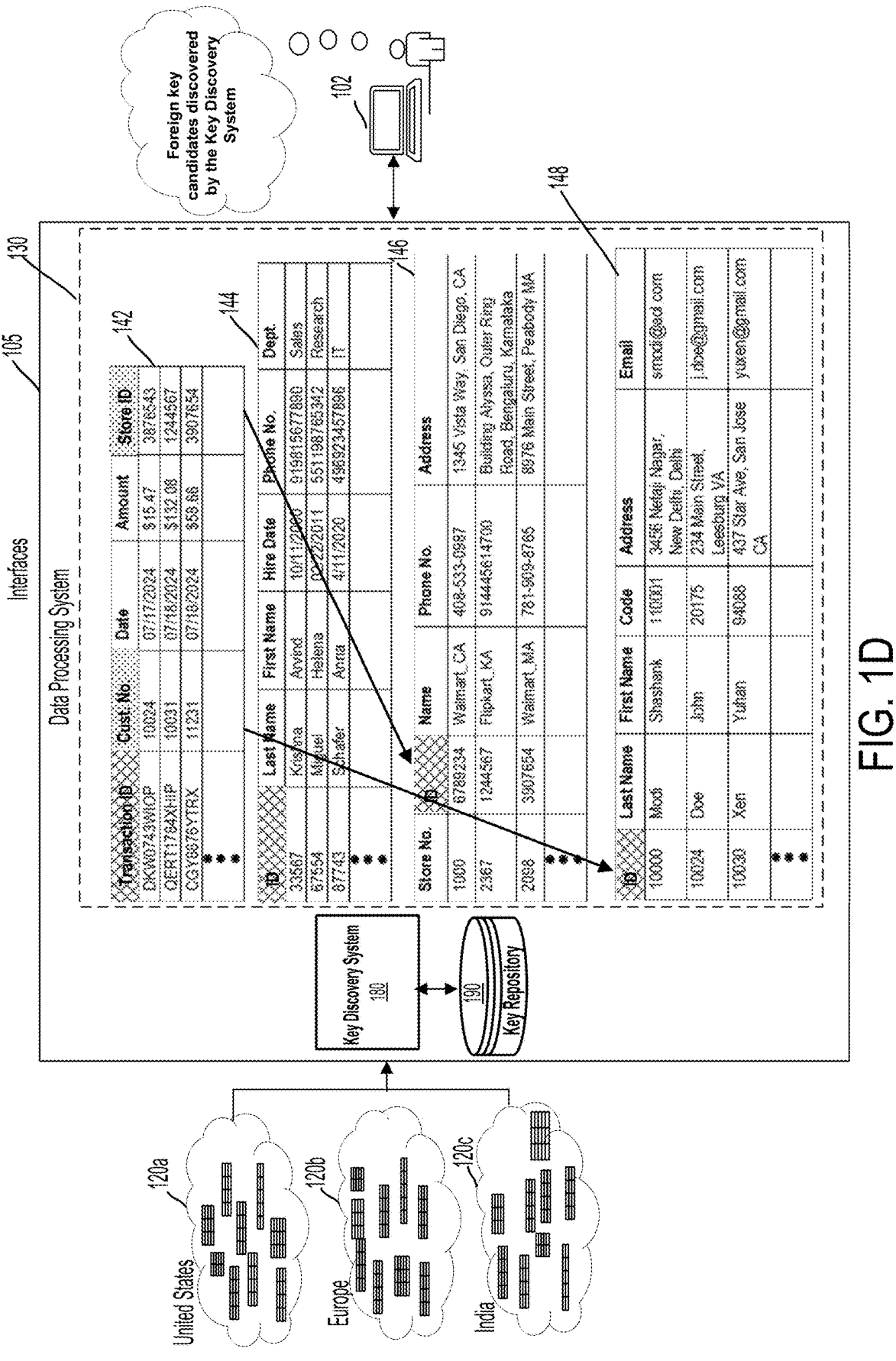
FIG. 1D is a diagram illustrating example relational datasets stored in a portion of the enterprise system with key discovery performed by the key discovery system 180, in accordance with some aspects of technology described herein.

To address the challenges of conventional techniques, the inventors have developed new technology, for example, a key discovery system 180 shown in FIGS. 1C-1D, that efficiently and accurately discovers primary key candidates, unique key candidates and/or foreign key candidates for relational datasets managed by data processing systems. FIG. 1C is a block diagram of an illustrative data processing system 105 and a key discovery system 180 that is part of the data processing system 105, in accordance with some aspects of the technology described herein. As shown in FIG. 1C, data processing system 105 includes a key discovery system 180 and a key repository 190.

Key discovery system (KDS) 180 is configured to perform various functions related to discovering primary, unique, and/or foreign key candidates for relational datasets managed by an enterprise system. The KDS 180 uses a data profile associated with each relational dataset to identify primary key, unique key, and/or foreign key proposals for the relational dataset. The proposals indicate which field or a combination of fields in the relational dataset may be considered for a primary key, unique key, and/or foreign key. The KDS 180 utilizes machine learning models to assess an extent to which a primary key proposal, a unique key proposal, and/or a foreign key proposal can serve as a primary key, unique key and/or foreign key, respectively, for the relational dataset. Aspects of KDS 180 are described herein including with reference to FIG. 2.

In some embodiments, the results generated by the KDS 180 may include one or more primary key candidates, unique key candidates and/or foreign key candidates for each relational dataset. The results may be accessed by user(s) 102 via interfaces 130. The GUIs generated by the interfaces 130 may include the results along with any supporting information that may assist user(s) 102 in determining which of the primary key candidates, unique key candidates and/or foreign key candidates should be designated as primary, unique and/or foreign keys respectively.

The KDS 180 may be configured to not only automatically identify or discover primary key candidates, unique key candidates and/or foreign key candidates for a large number of relational datasets but also generate graphical user interfaces that allow for efficient evaluation of whether these candidates can serve as keys for the relational datasets. As shown in FIGS. 1C and 1D, the key discovery performed by the KDS 180 significantly reduces the cognitive burden on database administrators by accurately and efficiently discovering the primary key and/or foreign key candidates and providing the user(s) with appropriate supporting information relating to the key discovery.

As shown in FIG. 1C, "Transaction ID" is identified as the primary key for the transaction table 142, "ID" is identified as the primary key for the employee table 144, "ID" is identified as the primary key for the store table 146, and "ID" is identified as the primary key for the customer table 148. As shown in FIG. 1D, "Customer Number" and 'Store ID" in the transaction table are identified as foreign keys for the transaction table, where "Customer Number" refers to "ID" in the customer table 148 and "Store ID" refers to "ID" in the store table 146. In some embodiments, the primary and foreign keys may be stored in key repository 190.

Figure 2:
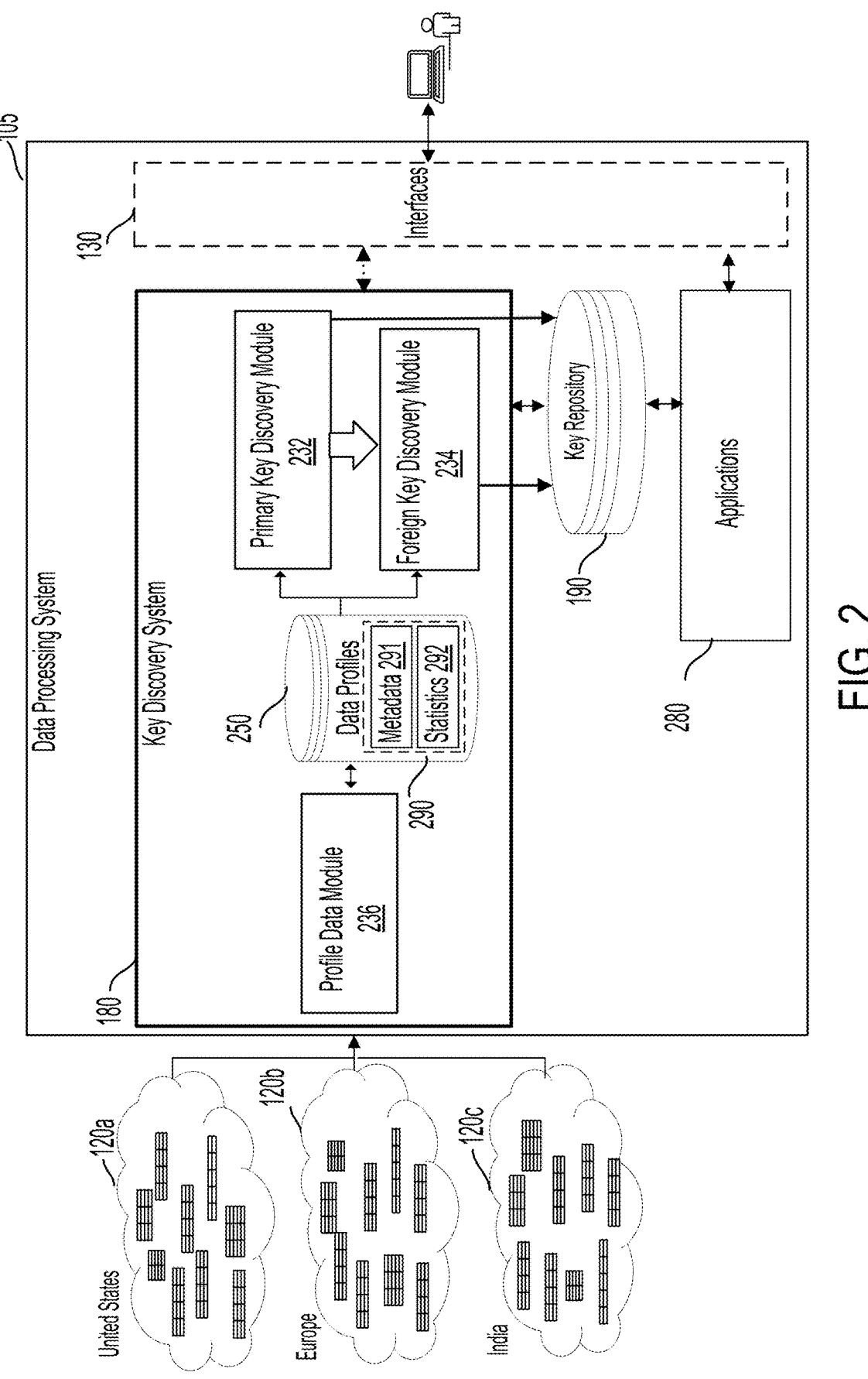
FIG. 2 is a block diagram of an illustrative key discovery system, in accordance with some aspects of the technology described herein.

As shown in FIG. 2, the key discovery system 180 includes, among other components: (1) profile data module 236; (2) primary key discovery module 232; and (3) foreign key discovery module 234. Database 250 provides access to data profiles associated with relational datasets managed by the data processing system 105.

Interfaces 130 may be configured to include user interfaces through which user(s) 102 may access information from the data processing system 105 (e.g., using computing devices(s)). The interfaces 130 may be configured to generate graphical user interfaces (GUIs) through which users may access data from the information about data stored in systems 120a, 120b, 120c. The GUIs may allow user(s) to review the primary key, unique key, and/or foreign key candidates identified by the key discovery system 180.

According to some aspects, the GUIs may allow users to access information (e.g., metadata) stored about data stored by systems 120a, 120b, 120c. For example, the GUIs may allow user(s) 102 to track data being generated in an enterprise system (e.g., quality metrics, and other characteristics of the data). In another example, the GUIs may allow the user(s) 102 to visualize information describing components of a process flow including: input data, a description of a process performed on the input data, and output data. In another example, the interfaces 130 may include scripting interfaces through which scripts may be received for execution by the data processing system 105. In another example, the interfaces 130 may include graph-based computer programs(s), third party application(s), and/or other interfaces.

In the context of metadata management, in some embodiments, the interfaces 130 may be configured to generate graphical user interfaces (GUIs) through which users may access data from the information about data stored in systems 120a, 120b, 120c. The GUIs may allow the users to: (1) request information about data stored by the data processing system; and (2) view information about data stored by the data processing system. In some embodiments, the GUIs may allow users to access information (e.g., metadata) stored about data stored by systems 120a, 120b, 120c. For example, the GUIs may allow user(s) 102 to track data being generated in an enterprise software system (e.g., quality metrics, and other characteristics of the data). In another example, the GUIs may allow user(s) 102 to visualize lineage information. Lineage information may include information about relationships between data components. Aspects of lineage information are described in U.S. Pat. No. 10,489,384, entitled "SYSTEMS AND METHODS FOR DETERMINING RELATIONSHIPS AMONG DATA ELEMENTS", which is incorporated herein by reference in its entirety. In yet another example, the GUIs may allow user(s) 102 to review labels proposed for fields in the data. Aspects of identifying label proposals are described in U.S. Patent Application No. 2020/0380212, entitled "DISCOVERING A SEMANTIC MEANING OF DATA FIELDS FROM PROFILE DATA OF THE DATA FIELDS," which is incorporated herein by reference in its entirety.

In some embodiments, profile data module 236 is configured to profile the relational datasets to obtain respective data profiles, where each data profile corresponds to a respective one of the relational datasets. In some embodiments, profiling a relational dataset comprises determining metadata for each of one or more fields in the relational dataset, and determining one or more statistics about each of the one or more fields from data stored in the each of the one or more fields. The profile data module 236 may generate a data profile (e.g., data profile 290) for each relational dataset, where the data profile may include the metadata (e.g., metadata 291) for field(s) in the relational dataset and one or more statistics about the field(s) (e.g., statistics 292).

In some embodiments, determining metadata for a field in the relational dataset comprises determining an ordinal position of the column or row in the relational dataset storing values for the field, a datatype for the data stored in the field, a format for the data stored in the field, and/or a name for the field. In some embodiments, determining the one or more statistics about the field comprises determining one or more statistics from the data stored in the field including by determining a maximum of the values of the data stored in the field, a minimum of the values of the data stored in the field, a maximum length of the values of the data stored in the field, and/or a minimum length of the values of the data stored in the field.

Profile data module 236 may generate data profiles for the relational datasets at a first time and load the data profiles into database 250 for one or more downstream applications. At a later time, once all the data from systems 120a, 120b, 120c for a given time period has been profiled by the profile data module 236, the key discovery system 180 can use the data profiles to discover primary, unique, and/or foreign keys for the relational datasets.

Profile data module 236 may be configured to receive source data (e.g., relational datasets from system 120a, 120b, 120c) and generate data profile(s) of the source data. The profile data module 236 discovers fields of each relational dataset. The profile data module 236 can discover fields by identifying rows of tables, finding field names, references to fields, or using any similar process. The profile data module 236 determines statistical attribute(s) of the fields and generates a data profile including those statistical attributes. The data profile may include statistics about the values of fields of tables. For example, the data profile can include information specifying whether the data values of a field include numerical data, character strings, etc. For example, the statistics about the data values can include a maximum value, a minimum value, a standard deviation, a mean, maximum length, minimum length, and so forth of the values that are included in each of the fields (if the data are numerical). In some implementations, the statistics about the data can include how many digits or characters are in each entry of the data values. For example, the data profile can indicate that each data value of a field includes seven (or ten) numbers, which may provide a contextual clue indicating that the field includes telephone numbers.

In some embodiments, the data profiles include metadata and statistical information associated with the fields of the source data. The profile data can also include data specifying relationships (e.g., statistical correlations, dependencies, and so forth) between or among the fields of the source data.

Data ingestion for the profile data module 236 includes analyzing the field names of the fields, the location of the fields in the tables (or files in the file system), and analysis of the schema of the data. In other words, data ingestion occurs at the field level, the dataset level, and the schema level.

For the field level, the profile data module 236 analyzes the values of the fields and entries of the fields to generate the data profile. The profile data module 236 can determine whether the value of the field or its entries are null, blank, valid for a particular data type, and so on. The data profile can include statistics on null percentages, blank percentages, and value per field percentages. The profile data module 236 can also generate data indicating a change of these percentages from a baseline percentage (which can be specified by a user through the development environment or automatically generated). In another example, the data profile can include an indication of whether the data of an entry is valid for implicit data type. For example, if a data field is known to be a string field, but date data is found, it may be inferred that the data are invalid for that entry. In another example, the data profile can include an indication that data of an entry are valid for a specified format (e.g., two decimal places are required, but no explicit type is specified).

For the dataset level, the profile data module 236 can provide statistics that relate a portion of the source data to the relational dataset of the source data overall. For example, the profile data module 236 includes an indication of natural key uniqueness and key cardinality. The profile data module 236 indicates whether there exist duplicates on key values of the source data. The profile data module 236 indicates whether there are duplicates on approximate natural key matches. The profile data module 236 indicates a count of records with one or more of these features. In some implementations, this information is determined by key discovery system 180 after, for example, a field is determined to include key values.

For the schema level, the profile data module 236 is configured to determine the statistical information of a field with respect to the source data over time. For example, the profile data module 236 detects whether there are added or removed columns in a new version of the source data. The profile data module 236 detects delimited fields. In some implementations, the profile data module 236 performs a lineage count to determine whether any records were dropped from a prior version of the source data. Other schema evolution can be detected.

The profile data module 236 generates data profiles from the source data by scanning the entire datasets of the source data before generating the data profiles. The profile data module 236 does not need to copy the entire datasets from the source data, though this could be performed to generate the data profiles. Because the datasets can be large (e.g., many gigabytes in size or even many terabytes in size), wholesale copying of the data to a local system for analysis may be impractical. Generally, the profile data module 236 scans over the source data during periods of low activity for the data sources.

In some embodiments, a data profile corresponding to a relational dataset may include statistical information about the field names and the entries of each of the fields. For example, a data profile for a table may include information about four fields: Date1, Date2, Place, and ID, that are identified by the profile data module 236. The profile data module 236 may have determined that the data values (also called entries) of Date1 include the same format: ##/##/ ####. In practice, the profile data module 236 can determine that nearly all the values have this format, and discard outliers. In addition to determining a format of the values of Date1, the profile data module 236 may have determined that the values of Date1 all fall within 1-12 for the first two digits. This data can indicate that the values of the entries for Date1 are dates.

Similarly, the profile data module 236 may perform a format analysis and a statistical analysis on each of the fields Date2, Place, and ID. Date2 also has a ##/##/####format for its entries. The profile data module 236 may have also determined that the values of the last four-digit portion of Date2 are always greater than the corresponding values of the last four-digit portion of the entries of Date1. This indicates that, if both Date1 and Date2 include dates, that the date values of Date2 are always later in time than the corresponding date values of Date1 for each entry in the table. The profile data module 236 may have determined that Place is a character string in which a two-character code always follows a first word. The profile data module 236 may have determined that ID always includes an alphanumeric string of length 7, which may provide clues to the key discovery system 180 that the value of ID is a code, user ID, etc.

In some embodiments, the KDS 180 receives one or more data profiles from the profile data module 236 and uses the one or more data profiles to identify primary key, unique key, and/or foreign key candidates for the corresponding one or more relational datasets. As shown in FIG. 2, primary key discovery module 232 receives the one or more data profiles and uses the profile(s) to identify primary key candidates for the corresponding relational dataset(s). In some embodiments, the primary key discovery module 232 also uses the profile(s) to identify unique key candidates for the relational dataset(s). Foreign key discovery module 234 receives the one or more data profiles and the primary key candidate(s) identified by the primary key discovery module 232 and uses the profile(s) and the primary key candidate(s) to identify foreign key candidates for the corresponding relational dataset(s).

In some embodiments, the results generated by the KDS 180 may include one or more primary key candidates, unique key candidates and/or foreign key candidates for each relational dataset. The results may be accessed by user(s) 102 via interfaces 130. The GUIs generated by the interfaces 130 may include the results along with any supporting information that may assist user(s) 102 in determining which of the primary key candidates, unique key candidates and/or foreign key candidates should be designated as primary, unique and/or foreign keys respectively.

The KDS 180 may be configured to not only automatically identify or discover primary key candidates, unique key candidates and/or foreign key candidates for a large number of relational datasets but also generate graphical user interfaces that allow for efficient evaluation of whether these candidates can serve as keys for the relational datasets.

After evaluation of one or more primary and/or foreign key candidates indicates that these candidates may serve as primary and/or foreign keys for one or more relational datasets, these primary and/or foreign keys may be stored in key repository 190. The primary and/or foreign keys stored in the key repository 190 may be utilized by various applications 280 executing in the data processing system 105, such as applications implementing the use cases described in the "Use Cases" section below.

Figure 3:
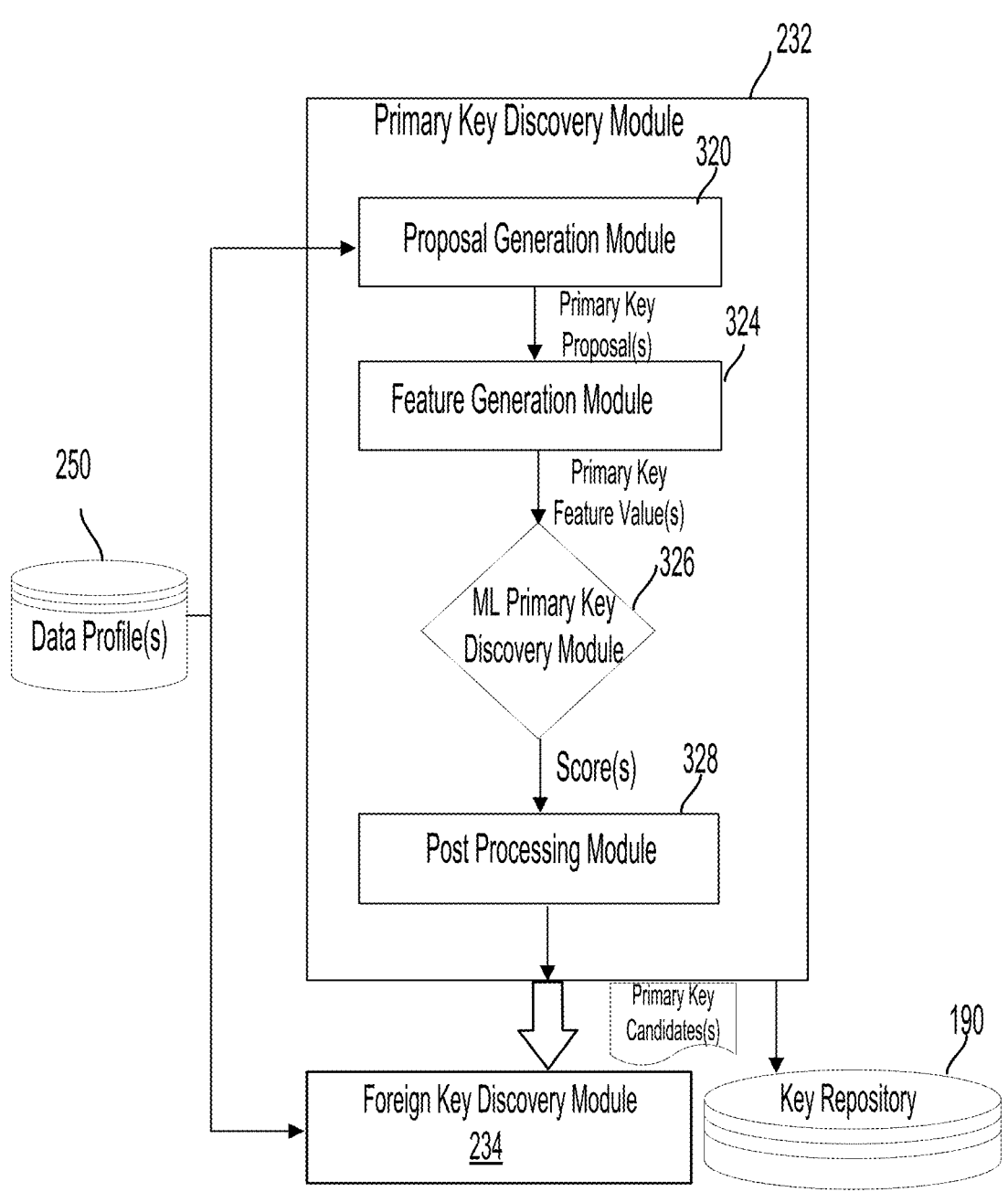
FIG. 3 is a block diagram of an illustrative primary key discovery module that is part of the key discovery system, in accordance with some aspects of the technology described herein.

FIG. 3 is a block diagram of an illustrative primary key discovery module 232 that is part of the KDS 180, in accordance with some aspects of the technology described herein. As shown in FIG. 3, primary key discovery module 232 includes a proposal generation module 320, a feature generation module 324, a machine learning (ML) primary key discovery module 326, and a post processing module 328.

The proposal generation module 320 is configured to obtain one or more data profiles from database 250 and identify one or more primary key proposals for each relational dataset of one or more relational datasets corresponding to the one or more data profiles. In some embodiments, the proposal generation module 320 identifies one or more primary key proposals for a relational dataset by selecting the one or more primary key proposals from among possible single-field and multi-field primary keys for the relational dataset. In some embodiments, the selection of primary key proposal(s) may be performed based on one or more constraints and/or algorithms. For example, selecting the one or more primary key proposals may include selecting one or more single-field primary key proposals, one or more multi-field primary key proposals, and/or a combination of single-field and multi-field primary key proposals. In some embodiments, the proposal generation module 320 identifies the one or more primary key proposals for each relational dataset using a hybrid discovery algorithm that identifies unique field combinations for the relational dataset (e.g., for multi-field proposals).

In some embodiments, the proposal generation module 320 identifies single-field or multi-field primary key proposals. In some embodiments, one or more constraints for key discovery are configurable by user(s) 102. For example, user(s) 102 may configure a key complexity constraint indicating a maximum number of fields that can be combined to produce a primary key proposal (e.g., one data field, two data fields, or no more than N data fields, where N is any suitable integer). As another example, user(s) 102 may configure an allowed deviation constraint indicating a percentage (e.g., 2%, 3% or any other suitable percentage) of values in a field or combination of fields that can violate uniqueness constraints or not meet one or more primary key characteristics. In some embodiments, the proposal generation module 320 identifies primary key proposals that satisfy the one or more constraints configured by user(s) 102.

Examples of one or more constraints or parameters for key discovery are described below. In some embodiments, these constraints may be utilized for primary, unique and/or foreign key discovery.

(1) Key_Max_Violating—Sets a threshold for the absolute number of a field's values that may be duplicated before KDS 180 withholds the field as a primary or unique key candidate. The data type for this parameter may be integer with a default value of 0. In some embodiments, the value of this parameter is derived from the value of Key_Max_Percent_Violating and a row count.

(2) Key_Max_Percent_Violating-Sets a default threshold for the percent of values that may be duplicated in a primary or unique key candidate field. The data type for this parameter may be decimal with a default value of empty. For example, setting this parameter to 0.1 allows 0.1% of records in a key field to be duplicate.

(3) Reference_Max_Violating—Sets a threshold for the maximum number of values that may be found in a foreign key candidate but not in the referenced primary or unique key. KDS 180 may not propose as a foreign key any field (or set of fields) that exceeds this threshold. The data type for this parameter may be integer with a default value of 1.

(4) Key_Max_Fields—Specifies the maximum number of fields allowed in a key. For example, if this parameter is set to 2, KDS 180 discovers single-field or two-field keys.

(5) Key_Max_Records—Specifies the maximum number of records to process for each proposed key.

(6) Key_Max_Time—Sets an upper limit (in number of seconds) on the processing time KDS 180 devotes to identifying potentially useful keys.

(7) KEY_Top_K—Controls the diversity of proposed keys. That is, keys can have different numbers of fields, and keys with a given number of fields can be considered a type of key. This parameter governs how many types of keys are required in the analysis. In some embodiments, if the KEY_Top_K parameter is set to 1, KDS 180 may stop searching after it discovers at least one key of any one type. Since KDS 180 looks first for single-field keys, typically the first keys it finds are single-field keys. But if no single-field keys are found, KDS 180 would go on to look for two-field keys, three-field keys, and so on. In some embodiments, if the KEY_TOP_K parameter is set to 2, KDS 180 may keep searching until it discovers two kinds of keys. This may yield proposals for single-field and two-field keys, but higher order keys might result if smaller keys are not found.

(8) Reference_Max_Violating—Applies to foreign key relationships. Specifies the maximum number of values allowed in a referencing (source) key that are not found in the referenced (target) key.

In some embodiments, the proposal generation module 320 identifies primary key proposals for a relational dataset by identifying one or more unique field combinations of the relational dataset such that any particular identified unique field combination contains no greater than a specified percentage (e.g., percentage configured as the allowed deviation constraint) of duplicate entries. In some embodiments, the unique field combinations may include unique column combinations or unique row combinations of the relational dataset. In some embodiments, the primary key proposals are identified using a hybrid discovery algorithm that identifies the one or more unique field combinations. For example, a hybrid discovery algorithm, such as HyUCC, may be used to identify one or more unique column combinations. A unique column combination is a set of columns in the relational dataset whose combined values uniquely identify each row in the relational dataset. The unique column combination is a set of columns that contains no greater than a specified percentage of duplicate entries. Similarly, a hybrid discovery algorithm may be used to identify one or more unique row combinations. A unique row combination is a set of rows in which the combined values of select columns uniquely identify each row in the relational dataset. Hybrid discovery algorithms may be built upon a hybrid of row efficient and column efficient approaches for minimizing or reducing the search space for proposal generation.

In some embodiments, the feature generation module 324 is configured to obtain, using a data profile associated with a relational dataset, a set of primary key feature values for each of the one or more primary key proposals identified for the relational dataset by the proposal generation module 320. In some embodiments, the feature generation module 324 generates a feature vector corresponding to each primary key proposal, where the feature vector includes a set of primary key feature values for the primary key proposal. In some embodiments, the set of primary key feature values for the primary key proposal may include values for one or more of the features described herein including in the Section titled "Machine Learning".

In some embodiments, the ML primary key discovery module 326 is configured to determine one or more scores for the one or more primary key proposals by processing the one or more sets of primary key feature values using a trained machine learning model. In some embodiments, a set of primary key feature values for a primary key proposal may be provided as input to the trained machine learning model. The trained machine learning model may output a score for the primary key proposal that is indicative of an extent to which the primary key proposal can serve as a primary key for the relational dataset. The trained machine learning model may receive as input the one or more sets of primary key feature values corresponding to the one or more primary key proposals for the relational dataset and provide as output the one or more scores for the one or more primary key proposals, where each score is indicative of an extent to which the corresponding primary key proposal can serve as a primary key for the relational dataset.

In some embodiments, the post processing module 328 is configured to identify, using the one or more scores determined by the ML primary key discovery module 326, at least one primary key candidate that can serve as a primary key for the relational dataset. The post processing module 328 may generate a quality rating for each primary key candidate based on the score for the primary key candidate. In some embodiments, the quality rating may be generated based on the score and attributes of the field(s) for the primary key candidate (e.g., field name, field type, percentage of distinct values, etc.). In some embodiment, a quality rating of high (H), medium (M), or low (L) may be generated, where a high quality rating for a primary key candidate may indicate that a likelihood of the primary key candidate serving as a primary key for the relational dataset is high. In some embodiments, a score between the range of 0 and 1 may be generated, where a score between 0-0.4 may indicate a low quality rating, between 0.4-0.7 may indicate a medium quality rating, and between 0.7-1 may indicate a high quality rating. Other suitable ranges or values for scores and/or quality ratings may be used.

In some embodiments the results generated by the post processing module 328 may include one or more primary key candidates for each relational dataset. The results may be accessed by user(s) 102 via interfaces 130. The GUIs generated by the interfaces 130 may include the results along with any supporting information that may assist user(s) 102 in determining which of the primary key candidates should be designated as the primary key for the relational dataset. FIG. 6A illustrates GUI 600 that displays one or more primary key candidates 612 identified by the post processing module 328. As shown in FIG. 6A, primary key candidates "AddressTypeID", "Name", and "rowguid" for a relational dataset named "AddressType" are displayed in GUI 600. The quality rating 614, sample data 616, and supporting information 618 (indicated as observations, for example) for each of the primary key candidates may also be displayed.

As shown in FIG. 6A, the quality rating for primary key candidate "AddressTypeID" is high whereas the quality rating for primary key candidates "Name" and "rowguid" is low. This indicates that a likelihood of "AddressTypeID" serving as a primary key for the relational dataset is high whereas the likelihood of "Name" or "rowguid" serving as the primary key is low. As shown in FIG. 6A, observations 618 may include supporting information associated with the primary key candidate, such as, a position metric indicating a position of the field with respect to a start of a record of the relational dataset, a uniqueness metric indicating a percentage of field values that are unique, a completeness metric indicating a percentage of field values that are not null, a business term metric indicating whether the field is associated with a business term, a referring keys metric indicating whether the field is a target for any foreign keys and the number of such foreign keys, and/or other supporting information.

In some embodiments, GUI 600 includes GUI elements 602, 604, 606 for receiving input from user 102 indicating a selection of a particular primary key candidate as the primary key for the relational dataset "AddressType". As shown in FIG. 6A, GUI element 602 is selected indicating that AddressTypeID is selected as the primary key for the relational dataset "AddressType".

In some embodiments, the post processing module 328 may identify a particular primary key candidate, for example, AddressTypeID, as the primary key for the relational dataset and trigger GUI 600 to show GUI element 602 (corresponding to AddressTypeID) as automatically selected. User 102 may view the automatically selected primary key candidate along with its supporting information. In some embodiments, user 102 may select an alternate primary key candidate as the primary key, such as by selecting GUI element 604 or 606 in case the user disagrees with the primary key candidate automatically suggested by the post processing module 328. Alternatively, for scenarios where no high quality primary key candidates are identified or for other reasons, GUI 600 includes GUI element 608 that allows a user to select a "No Primary Key" option to indicate that no primary key candidate is selected as the primary key for the relational dataset.

In some embodiments, the primary key discovery module 232 is configured to use one or more data profiles obtained from database 250 to identify one or more unique key candidates for each relational dataset of one or more relational datasets corresponding to the one or more data profiles.

For example, the primary key discovery module 232 may determine, using a data profile corresponding to a table, whether a column contains duplicate values, blank values, and/or null values. In response to a determination that the column does not contain duplicate values and contains zero or one null or blank values, that column may be identified as a unique key candidate for the table.

In some embodiments, the primary key discovery module 232 may generate a quality rating for each unique key candidate. In some embodiments, a quality rating of high (H), medium (M), or low (L) may be generated, where a high quality rating for a unique key candidate may indicate that a likelihood of the unique key candidate serving as a unique key for a relational dataset is high whereas a low quality rating for a unique key candidate may indicate that a likelihood of the unique key candidate serving as a unique key for a relational dataset is low.

Figure 4:
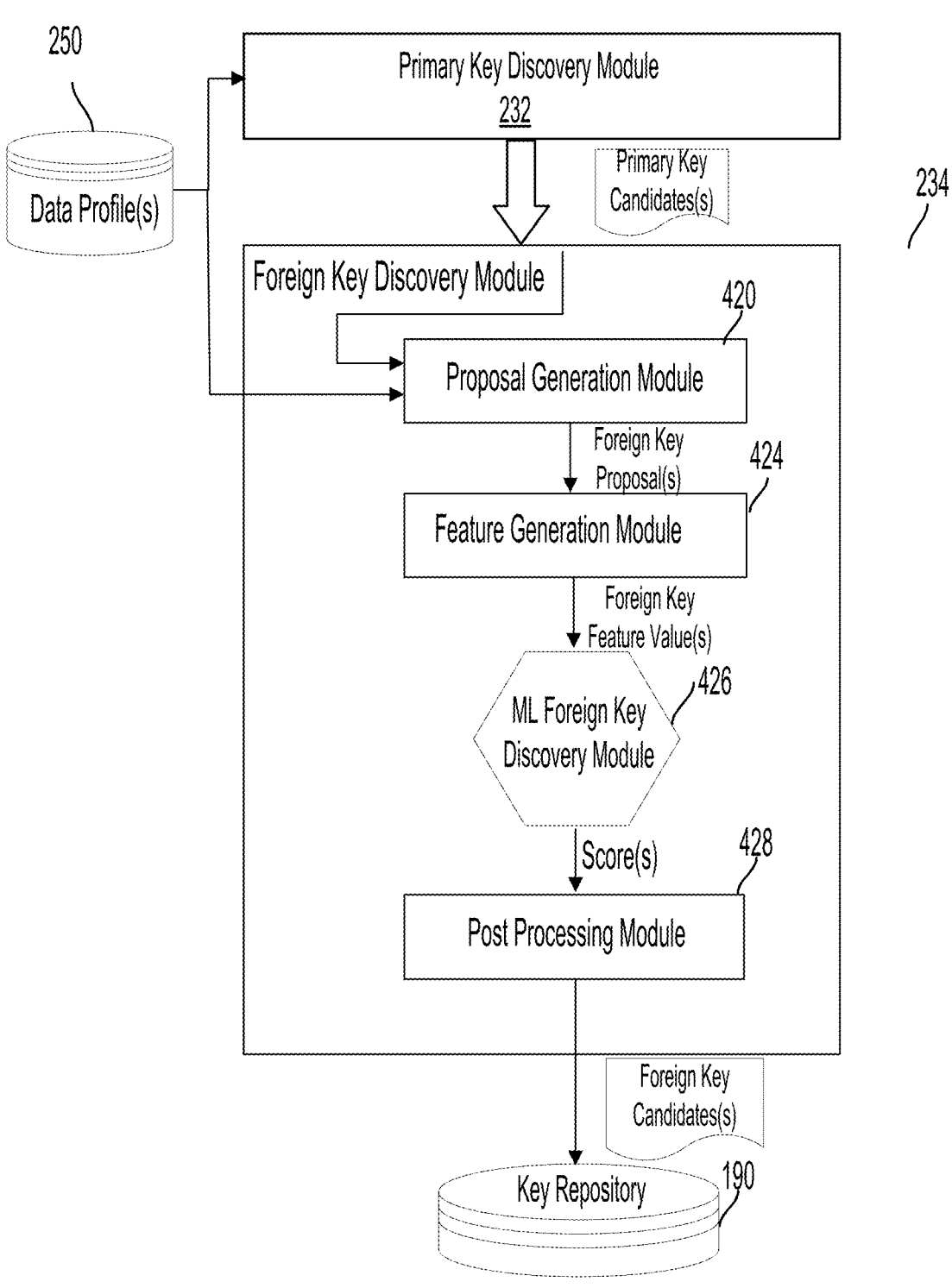
FIG. 4 is a block diagram of an illustrative foreign key discovery module that is part of the key discovery system, in accordance with some aspects of the technology described herein.

FIG. 4 is a block diagram of an illustrative foreign key discovery module 234 that is part of the KDS 180, in accordance with some aspects of the technology described herein. As shown in FIG. 4, foreign key discovery module 234 includes a proposal generation module 420, a feature generation module 424, a machine learning (ML) foreign key discovery module 426, and a post processing module 428.

The proposal generation module 420 is configured to identify one or more foreign key proposals for a second relational dataset using one or more primary key candidates for a first relational dataset. The proposal generation module 420 receives as input one or more primary key candidates for the first relational dataset identified by the primary key discovery module 232 and performs a subset analysis of the second relational dataset with respect to the first relational dataset to identify foreign key proposal(s) for the second relational dataset. In some embodiments, the proposal generation module 420 may, for each primary key candidate received as input, perform subset analysis to determine whether values of data stored in a field of the second relational dataset are a subset of values of data stored in the primary key candidate. In response to a determination that values of data stored in a field of the second relational dataset are a subset of the values of data stored in the primary key candidate, the proposal generation module 420 may identify that field of the second relational dataset as a foreign key proposal for the second relational dataset.

The feature generation module 424 is configured to obtain, using a data profile associated with the second relational dataset and a data profile associated with the first relational dataset, one or more sets of foreign key feature values for one or more foreign key proposals identified by the proposal generation module 420. In some embodiments, the feature generation module 424 generates a feature vector corresponding to each foreign key proposal, where the feature vector includes a set of foreign key feature values for the foreign key proposal. In some embodiments, the set of foreign key feature values for the foreign key proposal may include values for one or more of the features described herein including in the Section titled "Machine Learning".

In some embodiments, the ML foreign key discovery module 426 is configured to determine one or more scores for the one or more foreign key proposals by processing the one or more sets of foreign key feature values using a trained machine learning model. The trained machine learning model used to process the set(s) of foreign key feature values may be different from the trained machine learning model used to process the set(s) of primary key feature values.

In some embodiments, a set of foreign key feature values for a foreign key proposal may be provided as input to the trained machine learning model. The trained machine learning model may output a score for the foreign key proposal that is indicative of an extent to which the foreign key proposal can serve as a foreign key for the second relational dataset that references a particular primary key candidate for the first relational dataset. The trained machine learning model may receive as input the one or more sets of foreign key feature values corresponding to the one or more foreign key proposals for the second relational dataset and provide as output the one or more scores for the one or more foreign key proposals, where each score is indicative of an extent to which the corresponding foreign key proposal can serve as a foreign key for the second relational dataset.

In some embodiments, the post processing module 428 is configured to identify, using the one or more scores determined by the ML foreign key discovery module 426, at least one foreign key proposal that can serve as a foreign key candidate for the second relational dataset. The post processing module 428 may generate quality rating(s) for each foreign key candidate based on the score for the foreign key candidate. In some embodiments, a quality rating of high (H), medium (M), or low (L) may be generated, where a high quality rating for a foreign key candidate may indicate that a likelihood of the foreign key candidate serving as a foreign key for the relational dataset (that references a particular primary key candidate or target for another dataset) is high.

In some embodiments, the post processing module 428 may generate a quality rating for each possible primary key target of a foreign key candidate. For example, each possible primary key target of a foreign key candidate may be rated as high, medium, or low in quality. In some embodiments, a score between the range of 0 and 1 may be generated, where a score between 0-0.4 may indicate a low quality rating, between 0.4-0.7 may indicate a medium quality rating, and between 0.7-1 may indicate a high quality rating. Other suitable ranges or values for scores and/or quality ratings may be used.

Figure 6B:
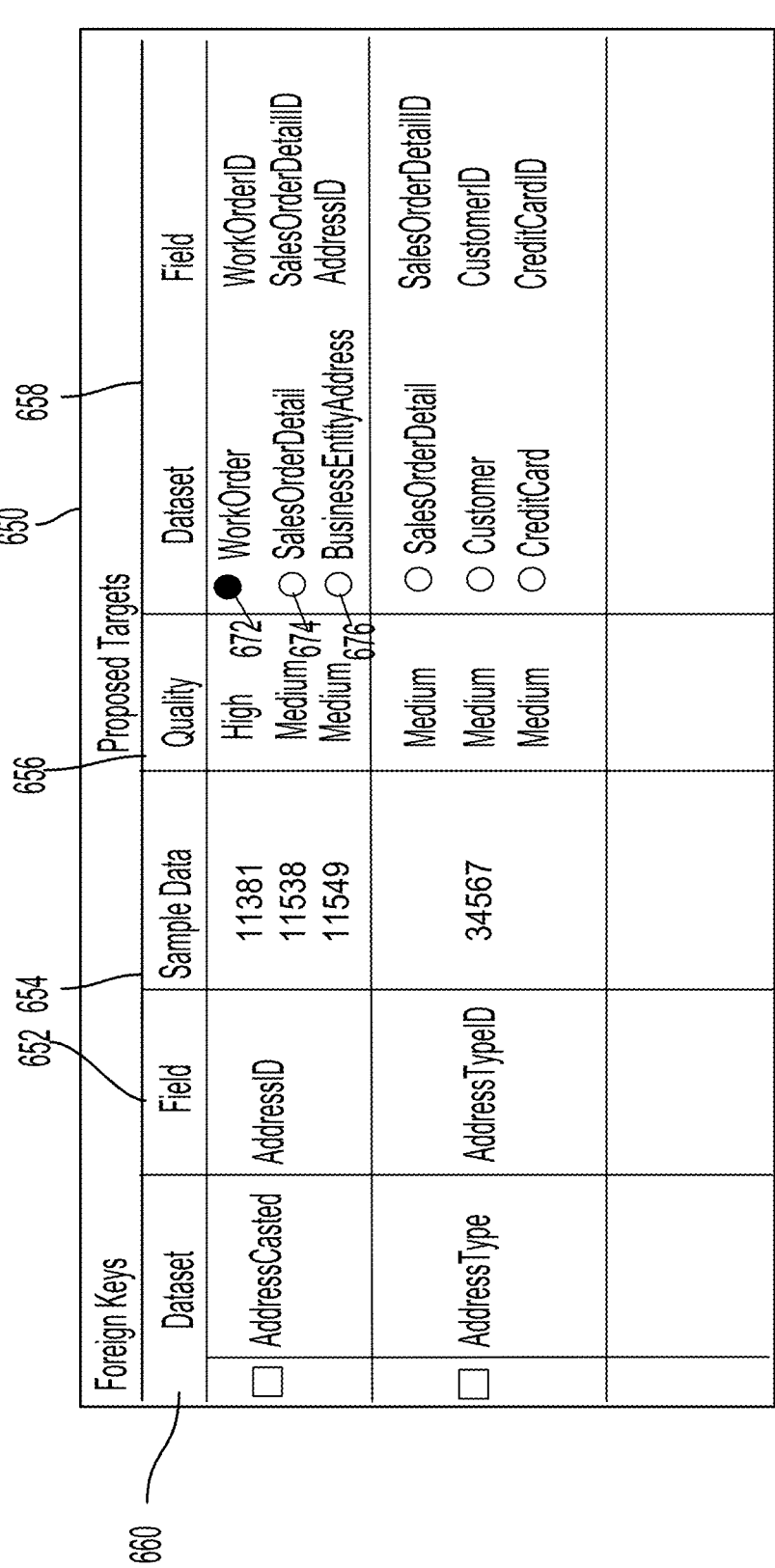
FIG. 6B is an example graphical user interface showing a listing of foreign key candidates discovered by the key discovery system, in accordance with some aspects of the technology described herein.

In some embodiments the results generated by the post processing module 428 may include one or more foreign key candidates for each relational dataset. The results may be accessed by user(s) 102 via interfaces 130. The GUIs generated by the interfaces 130 may include the results along with any supporting information that may assist user(s) 102 in determining which of the foreign key candidates should be designated as the foreign key for the relational dataset. FIG. 6B illustrates GUI 650 that displays one or more foreign key candidates 652 identified by the post processing module 428. As shown in FIG. 6B, "AddressID" is displayed as a foreign key candidate for the "AddressCasted" dataset and "AddressTypeID" is displayed as a foreign key candidate for the "AddressType" dataset. A dataset name 660, sample data 654, quality rating 654, and one or more primary key targets 658 for each of the foreign key candidates may also be displayed.

As shown in FIG. 6B, the "WorkOrderID" field is indicated as possible primary key target for the foreign key candidate "AddressID" with a high quality rating. On the other hand, "SalesOrderDetailID" and "BusinessEntityAddressID" are indicated as possible primary key targets for the foreign key candidate "AddressID" with a medium quality rating. This indicates that a likelihood of "AddressID" serving as a foreign key for the relational dataset "WorkOrder" is higher than that for the relational datasets "SalesOrderDetail" and "BusinessEntityAddress".

In some embodiments, GUI 650 includes GUI elements 672, 674, 676 for receiving input from user 102 indicating a selection of a particular primary key target for a foreign key candidate. As shown in FIG. 6B, GUI element 672 is selected indicating that "WorkOrderID" is selected as the primary key target for the foreign key candidate "AddressID". In some embodiments, the primary key targets displayed in GUI 650 may include primary key candidates identified by KDS 180. In some embodiments, the primary key candidates may be presented as possible targets after being approved by the user.

In some embodiments, the post processing module 428 may identify a particular primary key target, for example, WorkOrderID, for the foreign key candidate "AddressID" and trigger GUI 650 to show GUI element 672 (corresponding to the WorkOrder dataset) as automatically selected. User 102 may view the automatically selected primary key target along with its supporting information. In some embodiments, in response to the selection of the primary key target, the foreign key candidate may be identified as the foreign key for the second relational dataset. In some embodiments, user 102 may select an alternate primary key target for the foreign key candidate, such as by selecting GUI element 674 or 676 in case the user disagrees with the primary key target automatically suggested by the post processing module 428. Alternatively, for scenarios where no high quality primary key targets are identified or for other reasons, a user may be allowed to reject the foreign key candidate, for example, using GUIs described with respect to FIG. 12.

FIG. 5A describes a flowchart of an illustrative process 500 for identifying primary key candidate(s) for relational dataset(s), in accordance with some embodiments of the technology described herein. Process 500 may be executed by any suitable data processing system and, for example, may be executed by data processing system 105 described with reference to FIG. 2.

Process 500 begins at act 502, during which relational dataset(s) may be profiled to obtain respective data profile(s). In some embodiments, a first data profile may be generated for a first relational dataset by profile data module 236. In some embodiments, profiling the first relational dataset may include determining metadata for each of one or more fields in the first relational dataset, and determining one or more statistics about each of the one or more fields from data/values stored in the each of the one or more fields. The determined metadata and statistics(s) may form the first data profile for the first relational dataset.

Example metadata determined by the profile data module 236 may include, but not be limited to, an ordinal position of the column or row in the first relational dataset storing values for the field, information indicating a datatype for the values stored in the field, information indicating a format for the values stored in the field, and/or information indicating a name for the field. Example statistic(s) about the field determined by the profile data module 236 may include, but not be limited to, a maximum of the values for the field, a minimum of the values for the field, a maximum length of the values for the field, and a minimum length of the values for the field.

Next at act 504, at least one primary key for at least one of the relational datasets may be identified using the data profiles and a first trained machine learning model. The at least one primary key may be identified by identifying one or more primary key proposals for the first relational dataset at act 506; obtaining one or more sets of primary key feature values for the one or more primary key proposals at act 508; determining one or more scores for the one or more primary key proposals at act 510; and identifying at least one primary key proposal as a primary key candidate for the first relational dataset at act 512.

At act 506, one or more primary key proposals for the first relational dataset may be identified. In some embodiments, the primary key proposal(s) may be identified by proposal generation module 320. In some embodiments, primary key proposal(s) for the first relational dataset may be identified by selecting the one or more primary key proposals from among possible single-field and multi-field primary keys for the first relational dataset. In some embodiments, multi-field primary key proposal(s) for the first relational dataset may be identified by identifying one or more unique field combinations of the first relational dataset such that any particular identified unique field combination contains no greater than a specified percentage (e.g., percentage configured as the allowed deviation constraint) of duplicate entries. In some embodiments, the unique filed combinations may include unique column combinations or unique row combinations of the first relational dataset. In some embodiments, such multi-field primary key proposal(s) are identified using a hybrid discovery algorithm.

Next at act 508, a set of primary key feature values for each of the one or more primary key proposals identified for the first relational dataset may be obtained. The set(s) of primary key feature values may be obtained directly from or generated based on information in the data profile corresponding to the first relational dataset. The set(s) of primary key feature values may be obtained by the feature generation module 324. In some embodiments, the set(s) of primary key feature values for the primary key proposal may include values for one or more of the features described herein including in the Section titled "Machine Learning".

Next at act 510, one or more scores for the one or more primary key proposals may be determined by processing the set(s) of primary key feature values for each primary key proposal using a first trained machine learning model. The score(s) may be determined by the ML primary key discovery module 326 as described herein. In some embodiments, the trained machine learning model may receive as input the set(s) of primary key feature values corresponding to each primary key proposal for the first relational dataset and provide as output the one or more scores for the one or more primary key proposals, where each score is indicative of an extent to which the corresponding primary key proposal can serve as a primary key for the relational dataset. In some embodiments, any suitable trained machine learning model may be used as a first trained machine learning model as described herein including in the Section titled "Machine Learning".

Next at act 512, at least one primary key candidate may be identified for the first relational dataset in accordance with the score(s) determined at act 510. In some embodiments, at least one primary key proposal may be identified as a primary key candidate for the first relational dataset. The at least one primary key proposal may be identified as a primary key candidate in accordance with the score(s) determined at act 510. In some embodiments, the at least one primary key candidate may be identified by the post processing module 328. In some embodiments, quality ratings for the primary key candidate(s) may be generated based on the score(s). Example quality ratings of high (H), medium (M), or low (L) may be generated, although other types or ranges of quality ratings may be used. For example, a quality rating may include a scale from 1 to 5, the higher number assigned to a primary key candidate indicating a higher likelihood of the primary key candidate serving as a primary key for the first relational dataset.

In some embodiments, at act 514, a primary key for the first relational dataset may be selected from among the primary key candidate(s) identified at act 512. In some embodiments, a combination of various factors may be used to identify the primary key from among the primary key candidate(s). Such factors may include, but not be limited to, quality ratings, one or more metrics associated with the primary key candidate (e.g., a position, uniqueness, completeness, business term, and referring keys metrics), and information regarding the primary key candidate obtained from the data profile corresponding to the first relational dataset (e.g., record format, count, maximum and minimum lengths of values in the field, and patterns in the field values). The primary key selection may be performed automatically by the KDS 180, via user input, or a combination thereof.

In some embodiments, at an optional act 516, access may be provided to the primary key such that the primary key may be utilized by various applications executing in the data processing system 105, such as applications implementing the use cases described in the "Use Cases" section below.

FIG. 5B describes a flowchart of an illustrative process 550 for identifying foreign key candidate(s) for relational dataset(s), in accordance with some embodiments of the technology described herein. Process 550 may be executed by any suitable data processing system and, for example, may be executed by data processing system 105 described with reference to FIG. 2.

Process 550 begins at act 552, where one or more primary key candidates identified for a first relational dataset are obtained. In some embodiments, the one or more primary key candidates may be obtained from the primary key discovery module 232. In some embodiments, a data profile corresponding to the first relational dataset may also be obtained.

Next at act 554, one or more foreign key proposals for a second relational dataset may be identified using the one or more primary key candidates. In some embodiments, the one or more foreign key proposals for the second relational dataset may be identified by the proposal generation module 420. In some embodiments, the one or more foreign key proposals for the second relational dataset may be identified by performing a subset analysis of the second relational dataset with respect to the first relational dataset.

Next at act 556, one or more sets of foreign key feature values may be obtained for the one or more foreign key proposals. In some embodiments, the one or more sets of foreign key values may be obtained by the feature generation module 424. The set(s) of foreign key feature values for the foreign key proposal(s) may be obtained directly from or generated based on information in the data profiles corresponding to the first and second relational datasets. In some embodiments, the set of foreign key feature values for each foreign key proposal may include values for one or more of the features described herein including in the Section titled "Machine Learning".

Next at act 558, one or more scores for the one or more foreign key proposals may be determined. In some embodiments, the score(s) may be determined by processing the one or more sets of foreign key feature values using a second trained machine learning model that is different from the first trained machine learning model used to score the primary key proposal(s). In some embodiments, the score(s) may be determined by the ML foreign key discovery module 426. In some embodiments, the trained second machine learning model may receive as input the one or more sets of foreign key feature values corresponding to the one or more foreign key proposals for the second relational dataset and provide as output the one or more scores for the one or more foreign key proposals, where each score is indicative of an extent to which the corresponding foreign key proposal can serve as a foreign key for the second relational dataset.

Next at act 560, at least one foreign key candidate may be identified for the second relational dataset in accordance with the score(s) determined at act 558. In some embodiments, at least one foreign key proposal may be identified as a foreign key candidate for the second relational dataset. The at least one foreign key proposal may be identified as a foreign key candidate using the score(s) determined at act 558. In some embodiments, the at least one foreign key candidate may be identified by the post processing module 428. In some embodiments, quality ratings for the foreign key candidate(s) and/or primary key targets may be generated based on the score(s) and/or other information (e.g., supporting information).

In some embodiments, at act 562, a foreign key for the second relational dataset may be selected from among the foreign key candidate(s) identified at act 560. In some embodiments, a combination of various factors may be used to identify the foreign key from among the foreign key candidate(s). Such factors may include, but not be limited to, quality ratings of the primary key targets, one or more metrics associated with the primary key targets (e.g., a position, uniqueness, completeness, business term, and referring keys metrics), and information regarding the foreign key candidate obtained from the data profile corresponding to the second relational dataset (e.g., record format, count, maximum and minimum lengths of values in the field, and patterns in the field values). The foreign key selection may be performed automatically by the KDS 180, via user input, or a combination thereof.

In some embodiments, at an optional act 564, access may be provided to the foreign key such that the foreign key may be utilized by various applications executing in the data processing system 105, such as applications implementing the use cases described in the "Use Cases" section below.

FIG. 5C is a flowchart of an illustrative process 570 for identifying labels for keys discovered using the key discovery system, in accordance with some aspects of the technology described herein. Process 570 may be executed by any suitable data processing system and, for example, may be executed by data processing system 105 described with reference to FIG. 2.

Process 570 begins at act 571, where one or more primary key candidates for a first relational dataset are identified. In some embodiments, the one or more primary key candidates may be identified by the primary key discovery module 232 using a first data profile of the first relational dataset and a first trained machine learning model used to score primary key proposals for a relational dataset using feature values obtained using a data profile derived from the relational dataset.

Next at act 572, one or more foreign key candidates for a second relational dataset are identified. In some embodiments, the one or more foreign key candidates may be identified by the foreign key discovery module 234 using the first data profile, a second data profile of the second relational dataset, one or more foreign key proposals, and a second trained machine learning model different from the first trained machine learning model, where the second trained machine learning model is trained to score the one or more foreign key proposals.

Next at act 573, a primary key for the first relational dataset is identified from among the one or more primary key candidates, where the primary key is associated with first a field (column) in the first relational dataset. For example, as shown in FIG. 1C, the "Transaction ID" column is identified as the primary key for the transaction table 142, the "ID" column is identified as the primary key for the employee table 144, the "ID" column is identified as the primary key for the store table 146, and the "ID" column is identified as the primary key for the customer table 148.

Next at act 574, a foreign key for the second relational dataset is identified from among the one or more foreign key candidates, where the foreign key is associated with a second field in the second relational dataset and references the primary key for the first relational dataset. For example, as shown in FIG. 1D, the "Customer Number" column and the "Store ID" column in the transaction table are identified as foreign keys for the transaction table, where "Customer Number" refers to "ID" in the customer table 148 and "Store ID" refers to "ID" in the store table 146.

Next at act 575, a determination is made regarding whether the first field in the first relational dataset is associated with a semantic label that indicates a semantic meaning of the first field. Next at act 576, when the first field of the first relational dataset, with which the primary key is associated, is determined to be associated with the semantic label, the semantic label is assigned to the second field of the second relational dataset with which the foreign key is associated. For example, when the "ID" column in the store table 146 is determined to be associated with a semantic label, that semantic label may be assigned to the "Store ID" column in the transaction table 142. Similarly, when the "ID" column in the customer table 148 is determined to be associated with a semantic label, that semantic label may be assigned to the "Customer Number" column in the transaction table 142.

FIG. 5D is a flowchart of an illustrative process 580 for identifying data quality violations using keys discovered using the key discovery system, in accordance with some aspects of the technology described herein. Process 580 may be executed by any suitable data processing system and, for example, may be executed by data processing system 105 described with reference to FIG. 2.

Process 580 begins at act 581, where one or more primary key candidates for a first relational dataset are identified. In some embodiments, the one or more primary key candidates may be identified by the primary key discovery module 232 using a first data profile of the first relational dataset and a first trained machine learning model used to score primary key proposals for a relational dataset using feature values obtained using a data profile derived from the relational dataset.

Next at act 582, the data processing system is configured to indicate a first primary key candidate as a primary key for the first relational dataset. In some embodiments, configuring the data processing system may include storing a variable whose value indicates that the first primary key candidate is the primary key for the first relational dataset.

Next at act 583, a request to modify the first relational dataset is received. At act 584, a determination is made regarding whether modifying the first relational dataset renders the primary key unsuitable as a primary key. In some embodiments, the determination may include determining whether modifying the first relational dataset causes a uniqueness constraint associated with the primary key to be violated, wherein the uniqueness constraint is violated when the primary key does not uniquely identify each record in the first relational dataset.

Next at act 585, a determination is made regarding whether to grant the request based on a result of the determining whether modifying the first relational dataset renders the primary key unsuitable as a primary key. In some embodiments, in response to determining that modifying the first relational dataset renders the primary key unsuitable as the primary key, the request to modify the first relational dataset may be denied. In some embodiments, in response to determining that modifying the record in the first relational dataset does not render the primary key unsuitable as the primary key, the request to modify the first relational dataset may be granted.

In some embodiments, process 580 may include additional acts, such as acts for identifying one or more foreign key candidates for a second relational dataset; configuring the data processing system to indicate a first foreign key candidate as a foreign key for the second relational dataset; receiving a request to modify the second relational dataset; determining whether modifying the second relational dataset renders the foreign key unsuitable as a foreign key; and determining whether to grant the request to modify the second relational dataset based on a result of the determining whether modifying the second relational dataset renders the foreign key unsuitable as a foreign key.

FIG. 5E is a flowchart of an illustrative process 590 for performing join operations in a dataflow graph using keys discovered using the key discovery system, in accordance with some aspects of the technology described herein. Process 590 may be executed by any suitable data processing system and, for example, may be executed by data processing system 105 described with reference to FIG. 2.

Process 590 begins at act 591, where one or more primary key candidates for a first relational dataset are identified. In some embodiments, the one or more primary key candidates may be identified by the primary key discovery module 232 using a first data profile of the first relational dataset and a first trained machine learning model used to score primary key proposals for a relational dataset using feature values obtained using a data profile derived from the relational dataset.

Next at act 592, one or more foreign key candidates for a second relational dataset are identified. In some embodiments, the one or more foreign key candidates may be identified by the foreign key discovery module 234 using the first data profile, a second data profile of the second relational dataset, one or more foreign key proposals, and a second trained machine learning model different from the first trained machine learning model, where the second trained machine learning model is trained to score the one or more foreign key proposals.

Next at act 593, the data processing system is configured to indicate a first primary key candidate as a primary key for the first relational dataset and a first foreign key candidate as a foreign key for the second relational dataset, where the foreign key for the second relational dataset references the primary key for the first relational dataset.

Next at act 594, a dataflow graph is processed, where the dataflow graph comprises a plurality of components representing a plurality of operations to be performed on input data, the plurality of components including a first component representing a join operation that combines records from the first relational dataset and the second relational dataset. In some embodiments, processing the dataflow graph may include automatically configuring the first component to use the primary key for the first relational dataset and the foreign key for the second relational dataset to perform the join operation on the first relational dataset and the second relational dataset.

Figure 7:
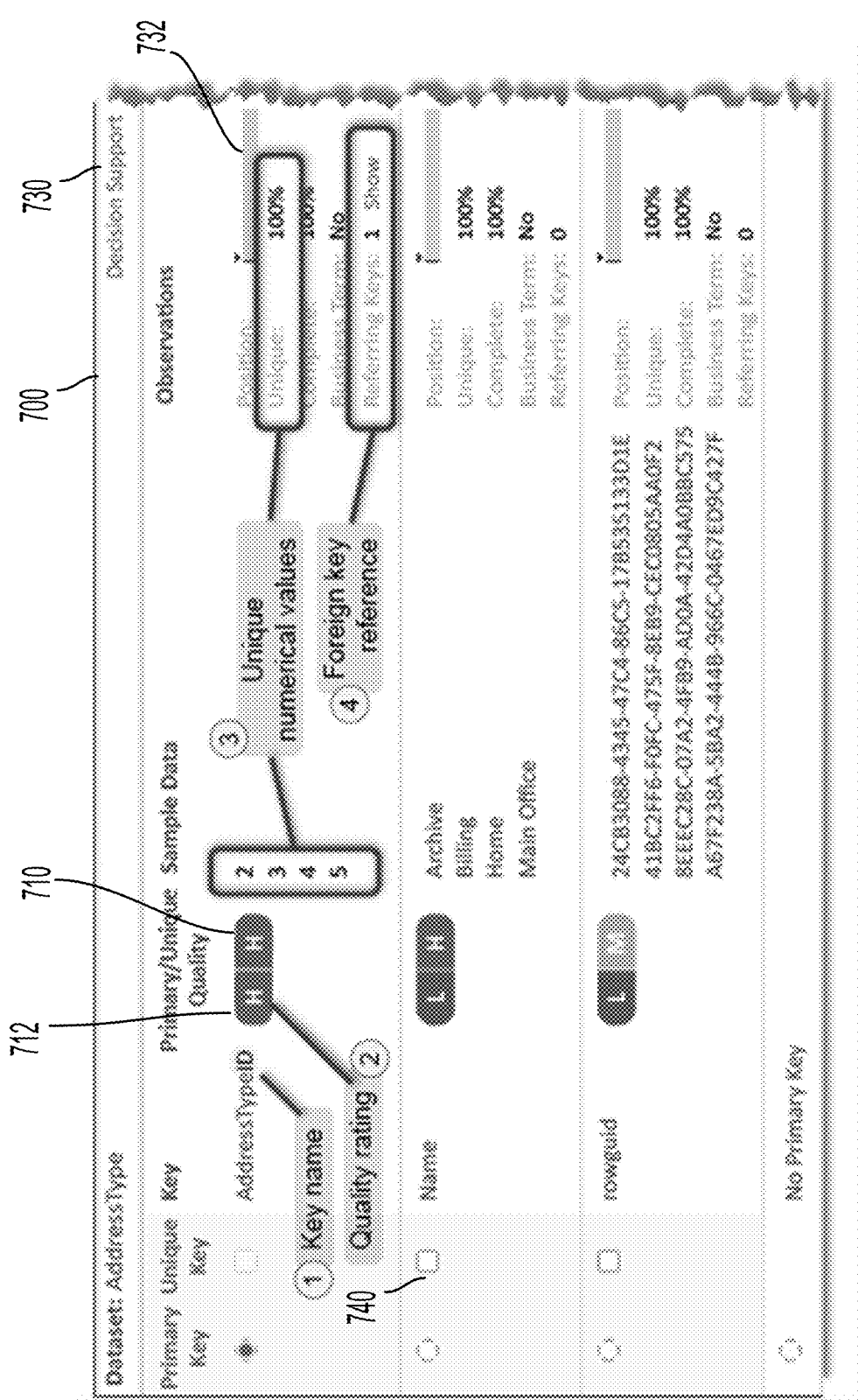
FIG. 7 is an example graphical user interface showing a listing of primary key candidates discovered by the key discovery system, in accordance with some aspects of the technology described herein.
Figure 8:
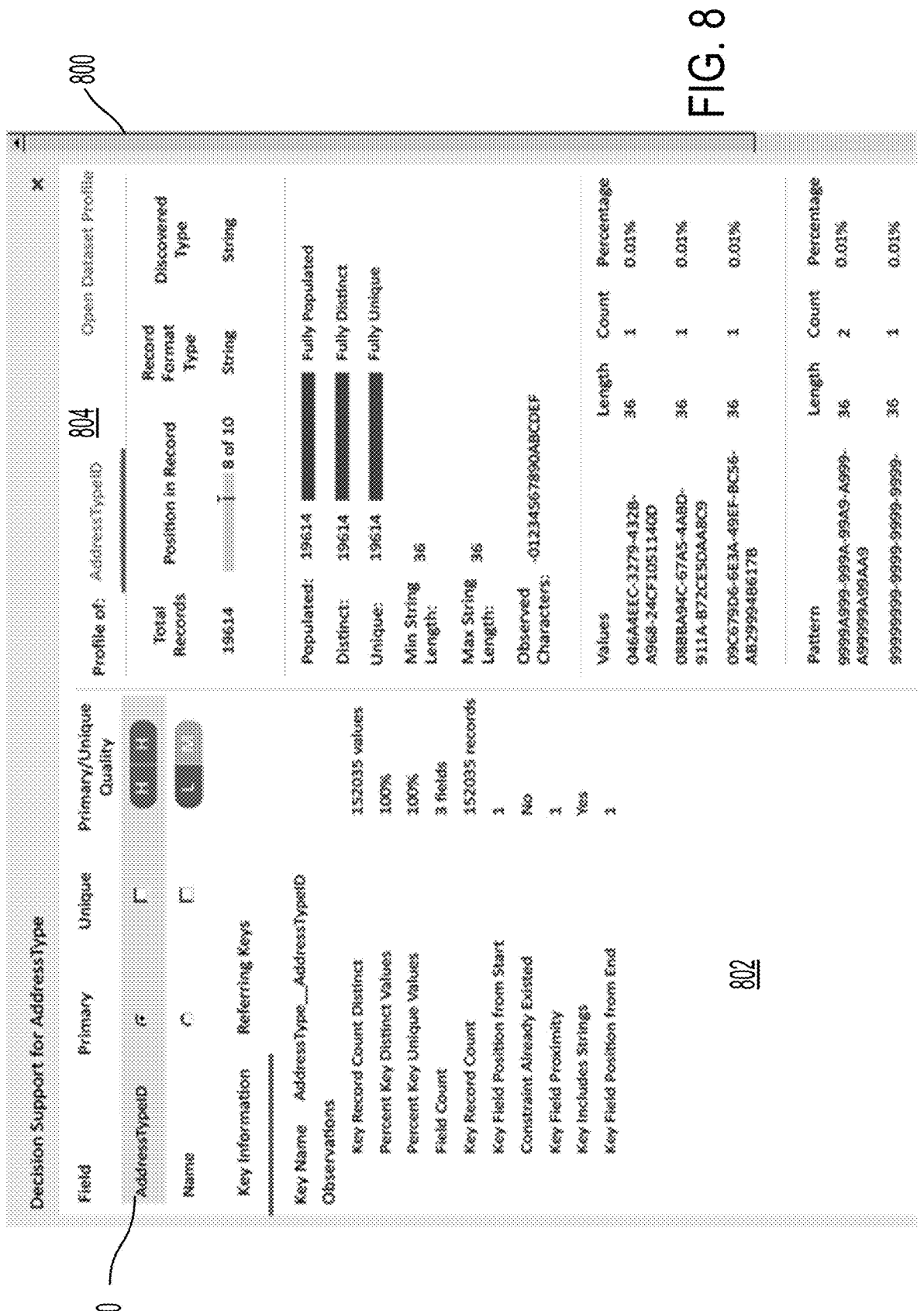
FIG. 8 is an example graphical user interface showing supporting information relating to the primary key candidates discovered by the key discovery system, in accordance with some aspects of the technology described herein.

FIG. 7 is an example GUI 700 showing a listing of primary key and unique key candidates for the dataset "AddressType". As shown in FIG. 7, in addition to the quality rating for primary key candidates, GUI 700 displays quality ratings high, medium, or low for unique key candidates. For example, AddressTypeID may be identified as both a primary key candidate and a unique key candidate. GUI element 710 may display a high quality rating for AddressTypeID as a unique key candidate and GUI element 712 may display a high quality rating for AddressTypeID as a primary key candidate. As shown in FIG. 7, even though the "Name" field is identified as both a primary key candidate and a unique key candidate, the likelihood of this field serving as a unique key is higher than it serving as a primary key as indicated by a high quality rating for Name as a unique key candidate and low quality rating for Name as a primary key candidate.

In some embodiments, based on the supporting information provided as observations in GUI 700 and/or other information, the following characteristics can be noted which weigh towards selecting AddressTypeID as the primary key for the AddressType dataset: (i) the AddressTypeID primary key candidate contains the name of the dataset AddressType; (ii) the AddressTypeID primary key candidate has the highest primary key quality rating of those on offer;

(iii) the AddressTypeID primary key candidate consists of unique numerical values; (iv) the Address TypeID primary key candidate is being referred to by a foreign key and the other candidates do not have any such references; and (v) the AddressTypeID primary key candidate appears as first in the record, as shown by the position indicator 732.

GUI 700 includes GUI element 740 for receiving input from user 102 indicating a selection of a particular unique key candidate as the unique key for the relational dataset "AddressType". Selection of GUI element 740 may indicate that Name is selected as unique key for the relational dataset AddressType.

As shown in FIG. 7, GUI 700 may include GUI element 730 labeled "Decision Support". Selection of GUI element 730 may cause GUI 800 of FIG. 8 to be displayed. GUI 800 includes additional supporting information that may assist the user in determining which primary and/or unique key candidate can serve as a primary and/or unique key for the AddressType dataset. GUI 800 includes a first portion 802 and a second portion 804. First portion 802 includes a listing of primary and/or unique key candidates along with information regarding the candidates. For example, first portion 802 shows key information such as key name, number of referring keys, and/or other observations for primary key candidate 810. Selection of a different primary key candidate may cause the key information to be updated to reflect the information for that primary key candidate. Also, selection of primary key candidate 810 causes the second portion 804 of GUI 800 to be populated with additional information regarding the primary key candidate AddressTypeID. In some embodiments, the second portion 804 may include information about the Address TypeID field obtained using the data profile of the AddressType dataset, such as length, content, count of field values, patterns identified in those values, and/or other information.

In some embodiments, the user is guided to select a primary/unique candidate as a primary key based on the various pieces of information provided in the GUIs. For example, based on information provided in GUIs 700 and 800, a user may be guided to select the AddressTypeID primary key candidate as the primary key for the AddressType dataset. As shown in FIG. 7, the AddressTypeID primary key candidate has a high quality rating, has a value of 100% for the uniqueness metric, is being referred to by a foreign key as indicated by the referring keys metric, and appears first in the record as indicated by the position metric. Also, FIG. 8 displays additional supporting information (e.g., fully populated, fully distinct, etc.) which in combination with the information provided via FIG. 7 may guide the user to select the AddressTypeID primary key candidate as the primary key.

Figures 9A, 9B:
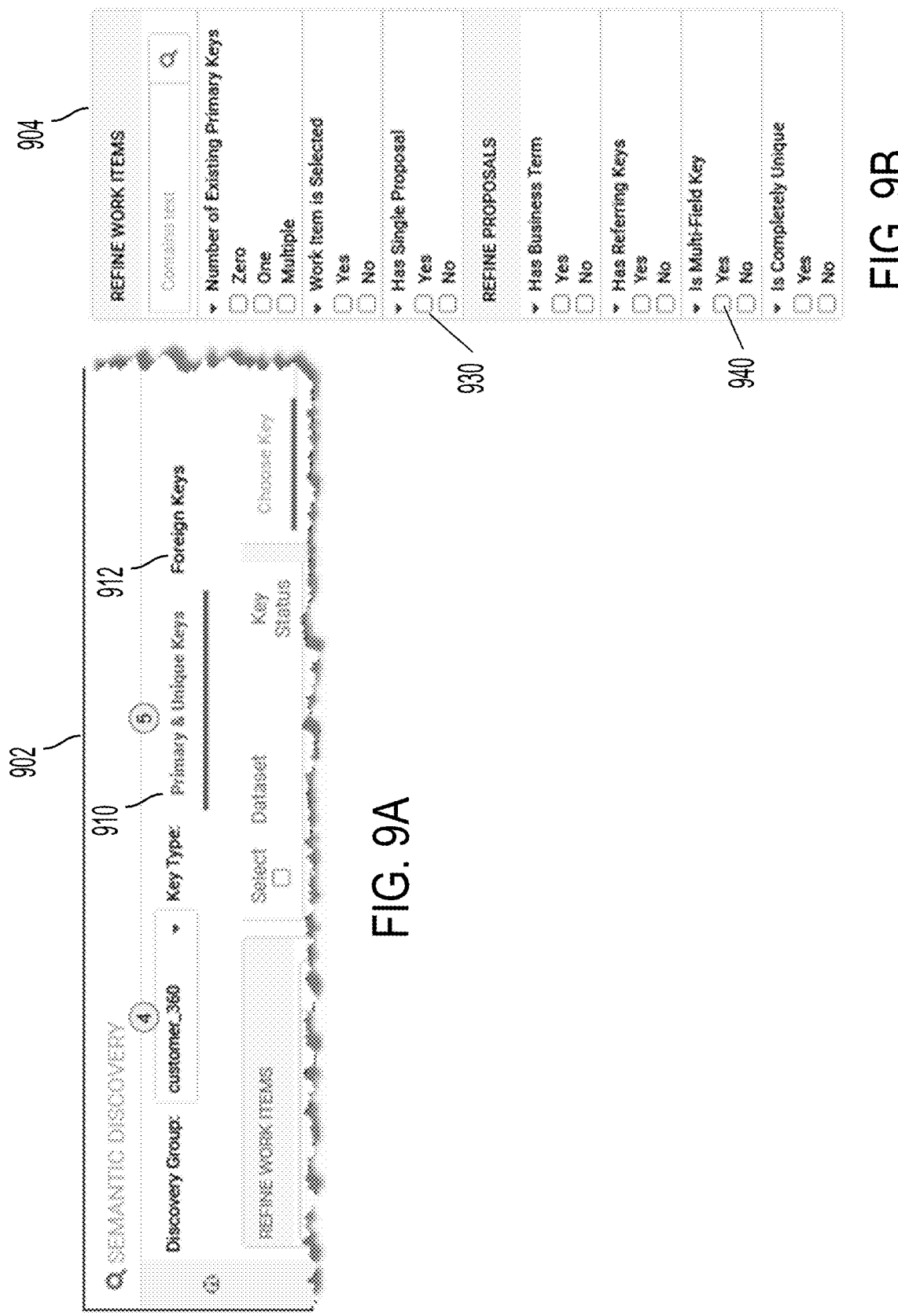
FIGS. 9A and 9B are example portions of a graphical user interface that allow selection of types of keys to review and various criteria for filtering the results of primary key discovery, in accordance with some aspects of the technology described herein.

FIGS. 9A and 9B show example portions 902 and 904 of a GUI that allows a user to indicate whether primary and unique key candidates are being reviewed or foreign key candidates are being reviewed. For example, selection of GUI element 910 in portion 902 may indicate that primary and unique key candidates are being reviewed and selection of GUI element 912 in portion 902 may indicate that foreign key candidates are being reviewed. GUI portion 904 may enable a user to specify various criteria for filtering the results of key discovery such that only those key candidates that satisfy the specified criteria are shown. Example criteria are listed below:

(1) Number of Existing Primary Keys—A dataset might be assigned primary keys before being analyzed by the key discovery system. This filter enables the results to be filtered to show datasets based on the number of primary keys (e.g., zero, one or multiple) that are already assigned.

(2) Work Item is Selected—When this filter is enabled (e.g., "yes" is selected), the results may be filtered to only show datasets that the user has selected for submission (or rejection).

(3) Has Single Proposal—When this filter is enabled (e.g., "yes" is selected), the results may be filtered to only show datasets for which the key discovery system discovers a single primary key candidate (or No Primary Key option).

(4) Has Business Term—When this filter is enabled (e.g., "yes" is selected), the list of primary and unique key candidates for a dataset is limited to primary and unique fields that are associated with a business term.

(5) Has Referring Keys—When this filter is enabled (e.g., "yes" is selected), the list of primary and unique key candidates for a dataset is limited to fields that are targeted by one or more foreign keys. Reference from a single foreign key is good evidence that the field is a primary or unique key, and the evidence becomes stronger as the number of referring keys increases.

(6) Is Multi-Field Key—When this filter is enabled (e.g., "yes" is selected), the list of primary and unique key candidates for a dataset is limited to those key candidates made up of multiple fields.

(7) Is Completely Unique—When this filter is enabled (e.g., "yes" is selected), the list of primary and unique key candidates for a dataset is limited to those key candidates including completely unique values.

As an example, selection of GUI elements 930, 940 may cause the results to be filtered to show datasets for which the key discovery system 180 discovered a single primary key candidate made up of multiple fields.

Figure 10:
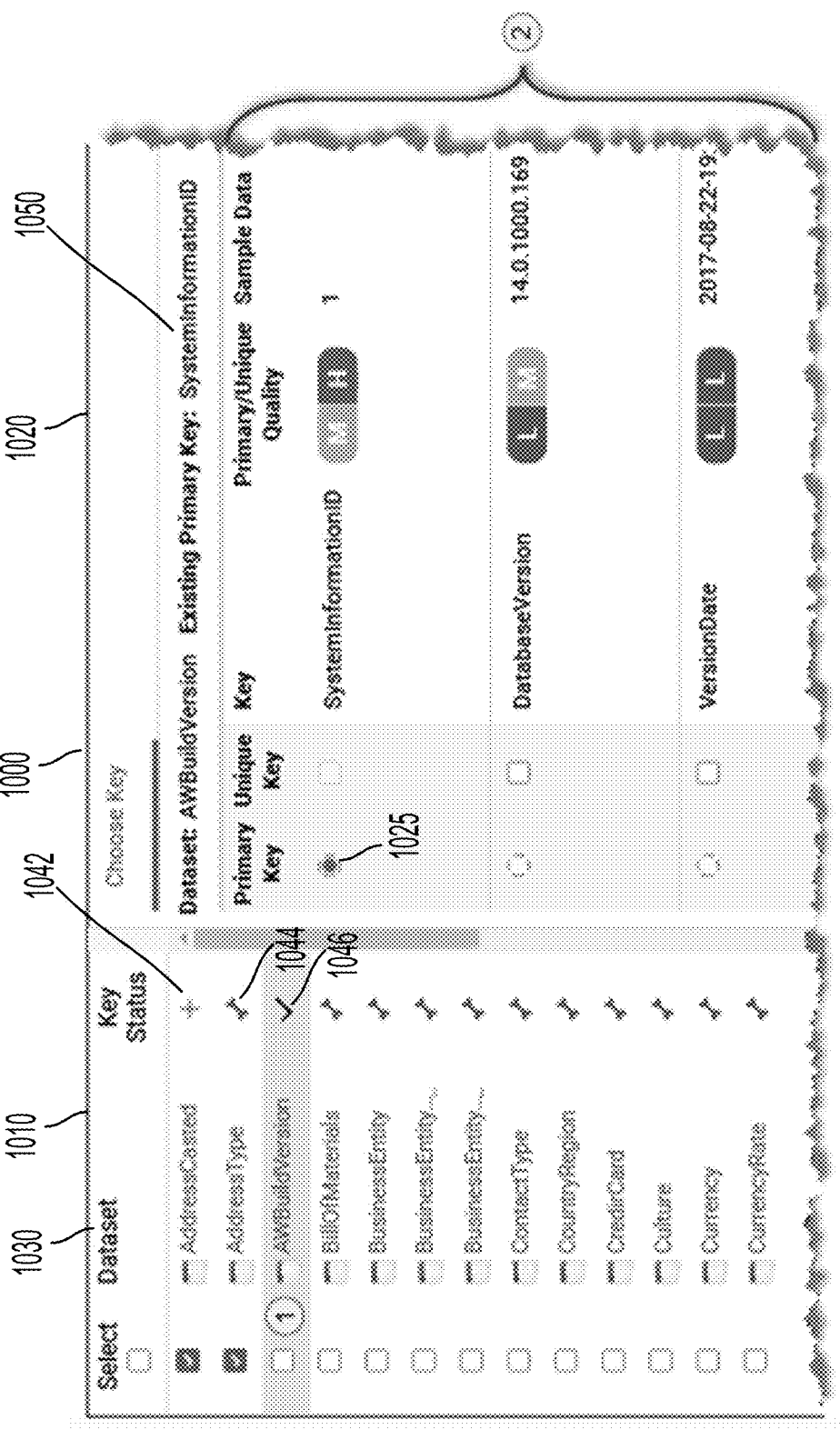
FIG. 10 is an example graphical user interface showing a listing of primary and unique key candidates discovered by the key discovery system along with information regarding key status, in accordance with some aspects of the technology described herein.

In some embodiments, selection of GUI element 910 in GUI portion 902 may cause GUI 1000 of FIG. 10 to be displayed. GUI 1000 includes GUI portion 1010 and GUI portion 1020. GUI portion 1010 includes a listing 1030 of various relational datasets for which the key discovery system 180 has discovered primary and/or unique key candidates. Selection of a particular dataset in GUI portion 1010 causes the primary and/or unique key candidates for the selected dataset to be displayed in GUI portion 1020. For example, as shown in FIG. 10, GUI portion 1020 shows the primary and/or unique key candidates for the dataset "AWBuildVersion" that is selected in GUI portion 1010.

As shown in FIG. 10, "SystemInformationID", "Database Version", and "VersionDate" are listed as both primary key and unique candidates for the dataset "AWBuildVersion" in GUI portion 1020. The quality ratings for each candidate are also shown. For example, the quality rating for "SystemInformationID" as a unique key candidate is high and as a primary key candidate is medium. Similarly, the quality rating for "Database Version" as a unique key candidate is medium and as a primary key candidate is low.

In some embodiments, the selected GUI element 1025 indicates that "SystemInformationID" is identified and suggested by the key discovery system 180 as the primary key candidate for the "AWBuildVersion" dataset. In some embodiments, "SystemInformationID" may be selected as the primary key candidate for the "AWBuildVersion" dataset by user 102, where the user may click the GUI element 1025 to provide the selection. In some embodiments, user 102 may override the automated selection made by the key discovery system 180 by selecting a different field as the primary key candidate and/or unique key candidate.

In some embodiments, as shown in FIG. 10, GUI portion 1010 may include a key status column that indicates, for each dataset including in the listing 1030, a status of existing primary keys for the dataset. GUI elements 1042, 1044, 1046 indicate different key statuses for datasets "Address-Casted", "AddressType", and "AWBuildVersion". Example key statuses are listed below:

(1) Create a new primary key (indicated by GUI element 1042)—no primary key is currently defined for this dataset; a selection by the user creates a new primary key for the dataset.

(2) Confirm the current primary key (indicated by GUI element 1046)—one primary key already exists for the dataset; a selection by the user confirms it.

(3) Replace existing primary key (indicated by GUI element 1112 of FIG. 11A)—a single primary already exists for the dataset; a primary key selection by the user replaces the existing primary key; once replaced, the original primary key is assigned a unique key for the dataset.

(4) Reassign unwanted primary keys (indicated by GUI element 1044)—multiple primary keys already exist for the dataset; a primary key selection replaces all the existing primary keys and causes them to be assigned as unique keys for the dataset.

As shown in FIG. 10, GUI portion 1020 includes a description 1050 of the key status for the selected dataset "AWBuildVersion". The description 1050 indicates that "SystemInformationID" already exists as a primary key for the "AWBuildVersion" dataset, where a selection by the user, for example, via selection of GUI element 1025 or selection of a submit button described below, would confirm "SystemInformationID" as the primary key.

Figure 11A:
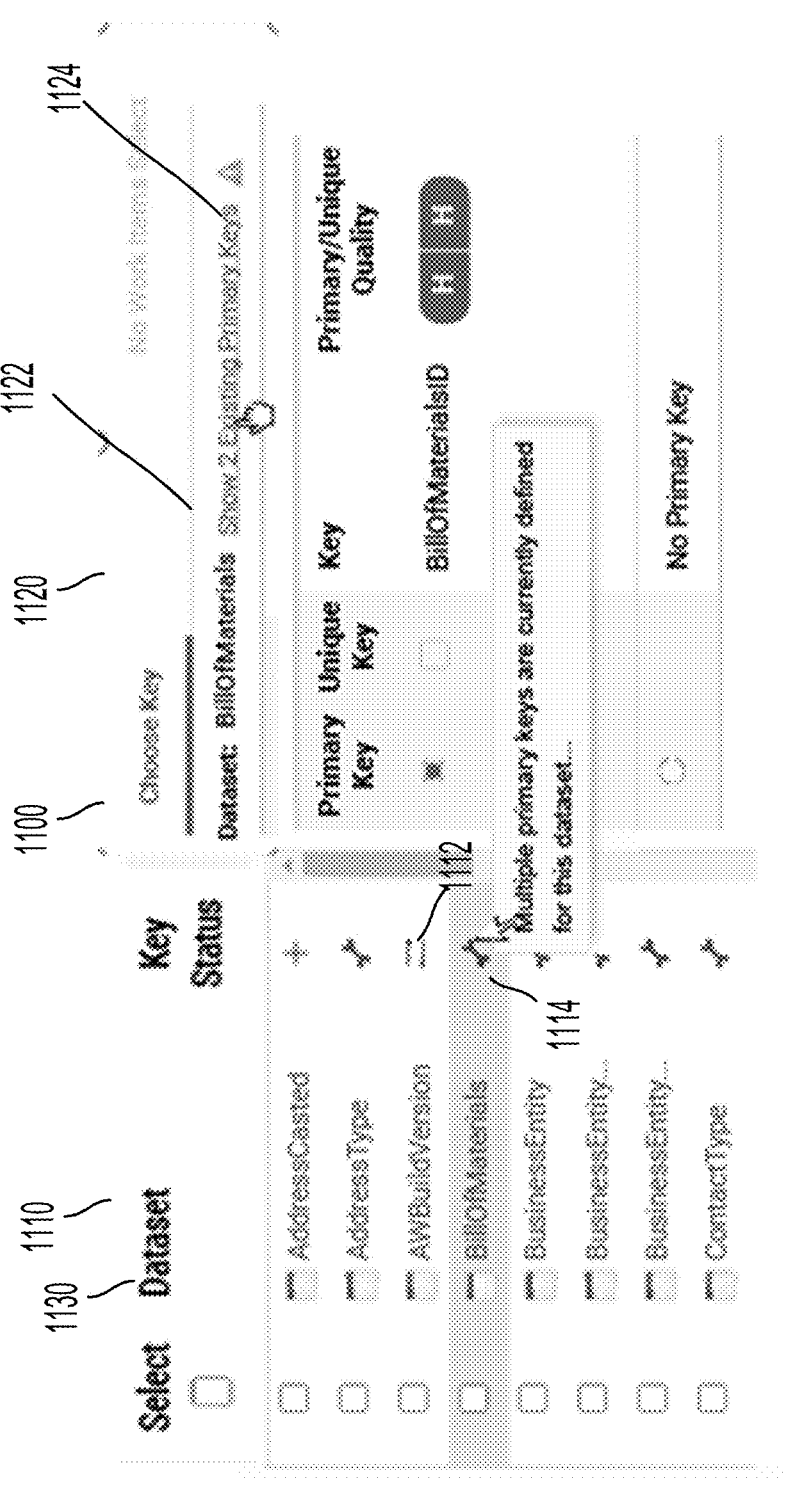
FIGS. 11A and 11B are example graphical user interfaces showing key status information, in accordance with some aspects of the technology described herein.

FIG. 11A shows an example GUI 1100 including GUI portion 1110 and GUI portion 1120. GUI portion 1110 includes a listing 1130 of various relational datasets for which the key discovery system 180 has discovered primary and/or unique key candidates. Selection of a particular dataset in GUI portion 1110 causes the primary and/or unique key candidates for the selected dataset to be displayed in GUI portion 1120. For example, as shown in FIG. 11A, GUI portion 1120 shows the primary and/or unique key candidates for the dataset "BillOfMaterials" that is selected in GUI portion 1110.

Figure 11B:
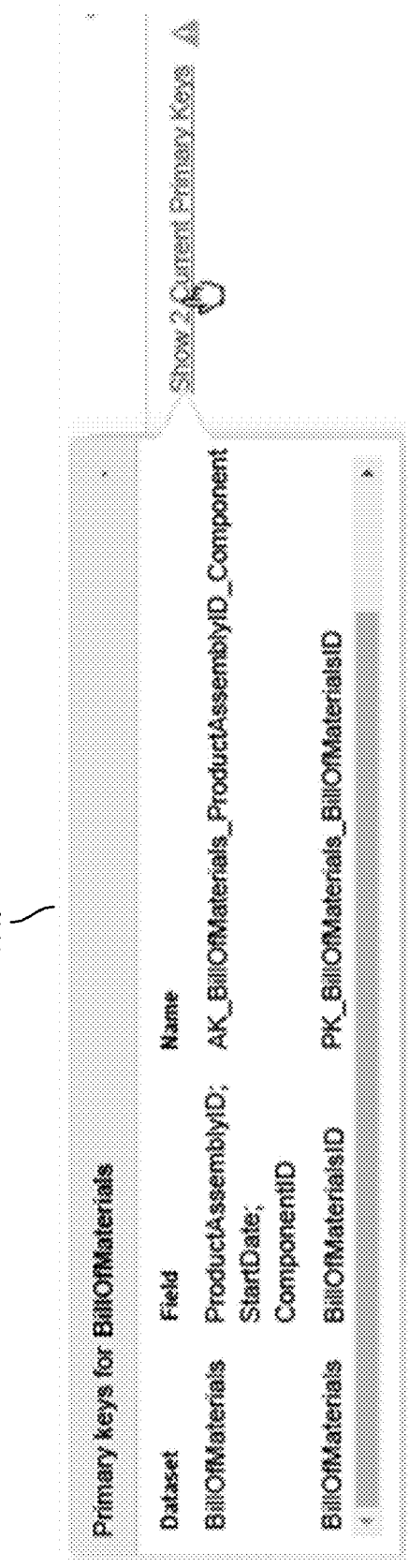

In some embodiment, GUI element 1114 indicates the key status of the dataset "BillOfMaterials," which indicates that multiple primary keys already exist for the dataset. The description 1122 of the key status is shown in GUI portion 1120. As shown in FIG. 11A, description 1122 indicates that the "BillOfMaterials" dataset already has two existing primary keys. Selection of GUI element 1124 (shown as a link) causes GUI 1140 of FIG. 11B to be displayed that includes details regarding the existing primary keys. One of the existing primary keys "BillOfMaterialsID" in FIG. 11B is the same as that identified by the key discovery system 180 (as shown in FIG. 11A). The other existing primary key shown in FIG. 11B is made of three fields. Certain factors such as, being a single field primary key rather than a multi-field one, a high quality rating, the name of the key, and/or other factors may indicate that "BillOf MaterialsID" is a better primary key candidate than the existing multi-field key. Accordingly, "BillOf MaterialsID" may be selected as the primary key candidate for the "BillOfMaterials" dataset. In some embodiments, such information may guide the user to select "BillOf MaterialsID" as the primary key for the "BillOfMaterials" dataset.

Figure 12:
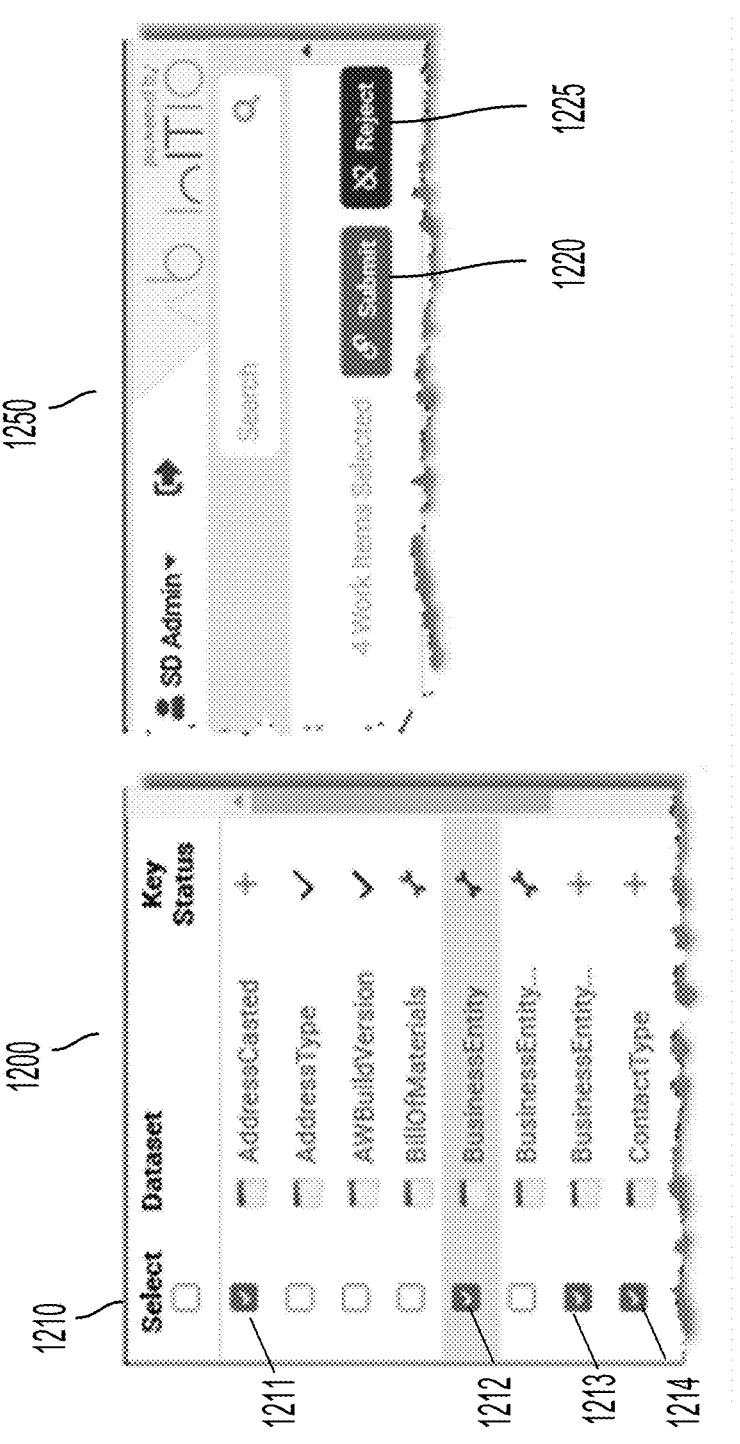
FIG. 12 shows example portions of a graphical user interface showing selection of primary and/or unique key candidates for submission or rejection, in accordance with some aspects of the technology described herein.

In some embodiments, after the primary and/or unique key candidates for one or more relational datasets in the listing 1030, 1130 are reviewed, the user 102 may select the reviewed datasets for submission. As shown in FIG. 12, selection of GUI elements 1211, 1212, 1213, and 1214 in select column 1210 causes the corresponding relational datasets to be selected for submission or rejection. A user may either submit the selected items by selecting GUI element 1220 or reject the selected items by selecting GUI element 1225. In some embodiments, a GUI element under the select column 1210 corresponding to a particular dataset may be disabled until a primary key or "no primary key" option has been selected for that dataset.

Figure 13A:
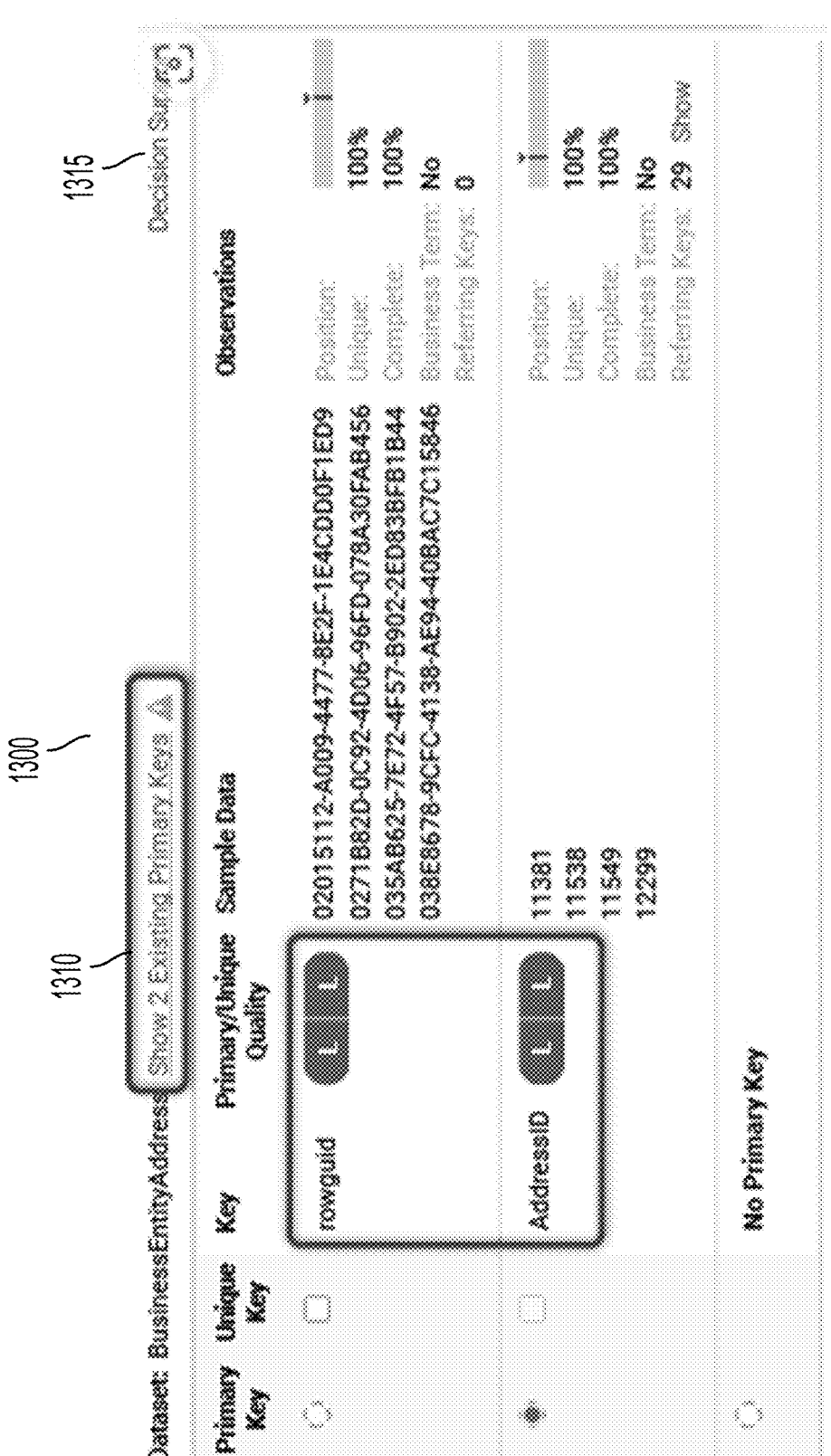
FIG. 13A is an example graphical user interface showing primary and unique key candidates discovered by the key discovery system with low quality rating, in accordance with some aspects of the technology described herein.
Figure 13B:
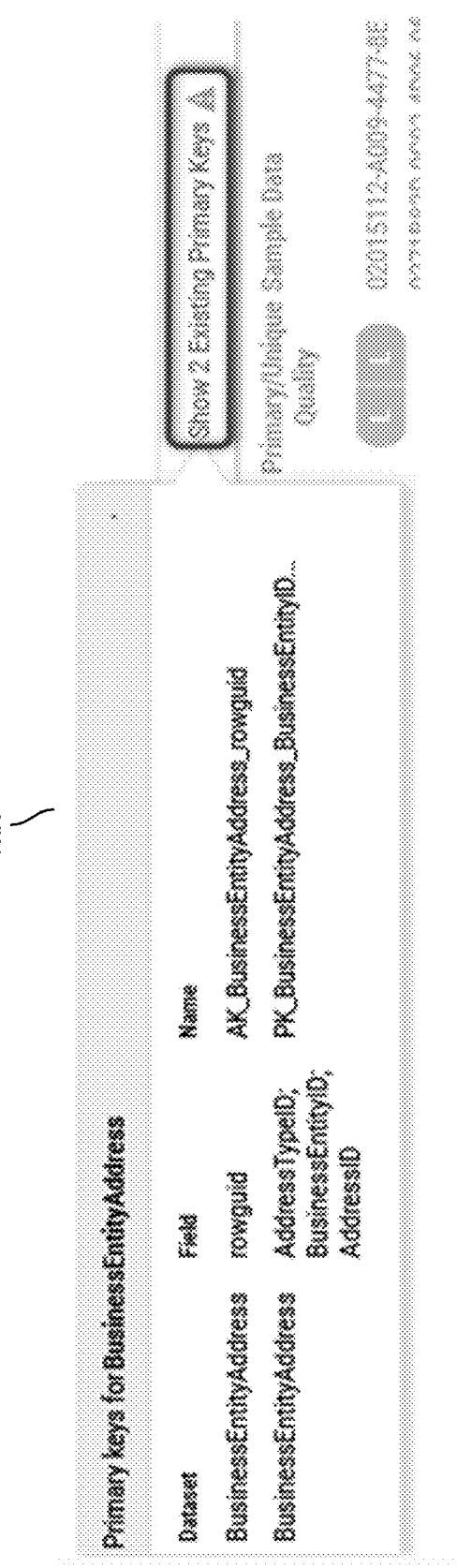
FIG. 13B is an example graphical user interface showing information regarding existing primary keys for a relational dataset, in accordance with some aspects of the technology described herein.

In some embodiments where only primary and/or unique candidates with low quality rating are identified (i.e., no candidates with high or medium quality rating are identified) by the key discovery system 180, the system may provide detailed information to the user regarding the low quality candidates to assist the user in determining whether any of the identified low quality candidates can serve as the primary/unique keys. FIG. 13A shows an example GUI 1300 that lists the primary and unique key candidates for the "BusinessEntity Address" dataset. As can be seen "rowguid" and "AddressID" are listed as primary and unique key candidates, each of them rated as low in both primary and unique key quality. Key status description may indicate that the "BusinessEntity Address" dataset already has two existing primary keys. Selection of GUI element 1310 may cause GUI 1320 to be displayed. As can be seen, one of the existing primary keys "rowguid" is also identified as a primary key candidate by key discovery system 180. The other primary key candidate "AddressID" identified by the key discovery system 180 appears as part of the existing multi-field key: AddressTypeID_BusinessEntityID_AddressID.

Figure 13C:
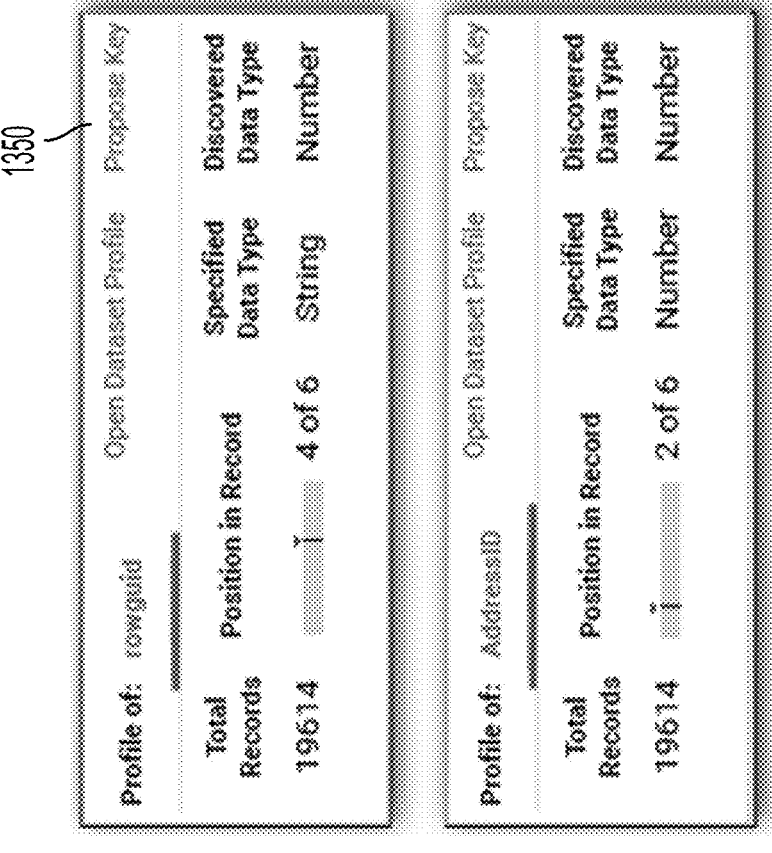
FIG. 13C is an example graphical user interface showing supporting information relating to primary and unique key candidates, in accordance with some aspects of the technology described herein.

KDS 180 identifies and provides detailed information regarding both the primary and unique key candidates. This information can be used by the user 102 to assess whether and which of the primary/unique candidates can serve as primary/unique keys for the dataset. For example, the fact that both the candidates identified by the KDS 180 are rated as low quality suggests that a multi-field key may be preferable as a primary key candidate than the "AddressID" field on its own. Some common characteristics of the candidates identified by the KDS 180 include, both candidates ranked as low in primary/unique key quality, both have fully unique and fully populated values (indicated as 100% for the uniqueness and completeness metrics under the observations column of FIG. 13A), both field names end in the string "id", and both fields contain numeric values. Some differences between the candidates identified by the KDS 180 include, the "AddressID" field is referred to by many foreign keys (e.g., 29) as shown under the observations column of FIG. 13A whereas "rowguid" has no references and the AddressID field appears earlier in the record than does the rowguid field. In some embodiments, the position indicator under the observations column of FIG. 13A provides the information regarding the position of the field in the record. Selection of the GUI element 1315 may cause a GUI to be displayed that includes supporting information regarding the identified candidates. The supporting information may include the position information regarding the fields as shown in FIG. 13C. For example, as shown in FIG. 13C, the supporting information indicates that the position of the AddressID field is 2 whereas that of the rowguid field is 4.

In some embodiments, based on the various pieces of information/metrics, such as, quality rating, position in record, number of referring keys, uniqueness, completeness, etc., a determination may be made regarding which of the two candidates is a better choice for a primary key and/or unique key. With the candidates being equal on the quality rating, uniqueness, and completeness metrics, the position and referring keys metrics may be instructive and suggest that "rowguid" be rejected as a primary key candidate. A determination may then be made regarding whether the single field "AddressID" identified by the KDS 180 or the existing multi-field primary key (AddressTypeID_BusinessEntityID_AddressID) should be selected as the primary key candidate for the dataset. In some embodiments, the various pieces of information/metrics may be displayed via the GUIs and guide the user to select a particular candidate as a primary key and/or unique key.

In some embodiments, GUI portions displayed in FIG. 13C may include a GUI element 1350 "Propose Key" that allows a user to propose a primary and/or unique key for the dataset. For example, the user may propose a primary and/or unique key for the dataset rather than select a candidate suggested by the KDS 180.

FIG. 14A illustrates GUI 1400 that displays one or more foreign key candidates 1412 identified by the KDS 180. As shown in FIG. 14A, GUI portion 1410 of GUI 1400 displays "StateProvinceID" as a foreign key candidate for the "AddressCasted" dataset, "AddressID" as a foreign key candidate for the "AddressCasted" dataset, "AddressTypeID" as a foreign key candidate for the "AddressType" dataset, and "UnitMeasureCode" as a foreign key candidate for the "BillOfMaterials" dataset.

As shown in FIG. 14A, the "StateProvinceID" primary key candidate for the dataset "StateProvince" is indicated as a possible primary key target for the foreign key candidate "StateProvinceID" with a high quality rating. On the other hand, "BusinessEntityID" and "AddressID" are indicated as possible primary key targets for the foreign key candidate "StateProvinceID" with a medium quality rating. This indicates that a likelihood of "StateProvinceID" of the dataset "StateProvince" serving as a target for the foreign key candidate is higher than that for targets "BusinessEntityID" and "AddressID".

As another example shown in FIG. 14A, the "WorkOrderID" primary key candidate for the dataset 'WorkOrder" is indicated as a possible primary key target for the foreign key candidate "AddressID" with a high quality rating. On the other hand, "SalesOrderDetailID" and "AddressID" are indicated as possible primary key targets for the foreign key candidate "AddressID" with a medium quality rating. This indicates that a likelihood of "WorkOrderID" serving as a target for the foreign key candidate is higher than that for the targets "SalesOrderDetailID" and "AddressID".

In some embodiments, the KDS 180 may identify a particular primary key target, for example, the "StateProvinceID" primary key candidate, for the foreign key candidate "StateProvinceID" and trigger GUI 1400 to show GUI element 1422 as automatically selected. User 102 may view the automatically selected primary key target along with its supporting information. In some embodiments, user 102 may select an alternate primary key target for the foreign key candidate, such as by selecting GUI element 1424 or 1426 in case the user disagrees with the primary key target automatically suggested by the KDS 180.

In some embodiments, additional primary key targets may be identified but not presented in the GUI 1400 of GUI 14A. These additional primary key targets may be viewed by selecting GUI element 1428 in GUI 1400. For example, selection of GUI element 1428 may cause GUI 1450 shown in FIG. 14B to be displayed. GUI 1450 may list the additional primary key targets for the "StateProvinceID" foreign key candidate.

Referring back to FIG. 14A, for each primary key target, the references column 1432 may show how many other foreign keys are referring to it. A high number of other foreign key references typically makes a primary or unique key a more attractive target.

Figures 15A, 15B:
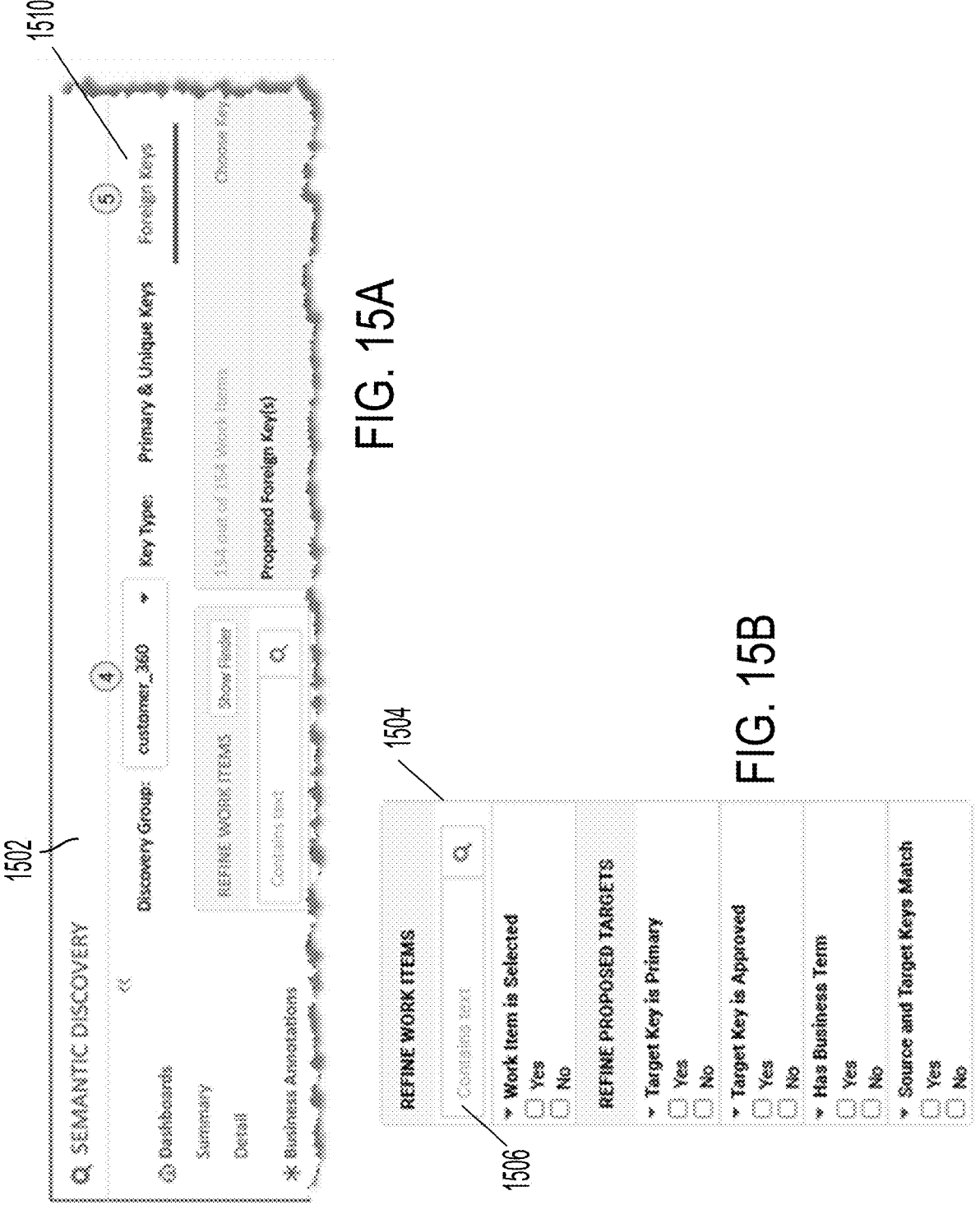
FIGS. 15A and 15B are example portions of a graphical user interface that allow selection of types of keys to review and various criteria for filtering the results of foreign key discovery, in accordance with some aspects of the technology described herein.

FIGS. 15A and 15B show example portions 1502 and 1504 of a GUI that allows a user to indicate whether primary and unique key candidates are being reviewed or foreign key candidates are being reviewed. For example, selection of GUI element 1510 in portion 1502 may indicate that that foreign key candidates are being reviewed. GUI portion 1504 may enable a user to specify various criteria for filtering the results of key discovery such that only those key candidates that satisfy the specified criteria are shown. Example criteria are listed below:

(1) Work Item is Selected—When this filter is enabled (e.g., "yes" is selected), only the fields that the user has selected to be submitted or rejected are shown.

(2) Target Key is Primary—When this filter is enabled (e.g., "yes" is selected), only foreign key targets that have been identified as primary are shown.

(3) Target Key is Approved—When this filter is enabled (e.g., "yes" is selected), only targets that have been approved as primary (or unique) keys are shown.

(5) Has Business Term—When this filter is enabled (e.g., "yes" is selected), only targets for which the primary and unique fields are associated with business terms are shown.

(5) Source and Target Keys Match—When this filter is enabled (e.g., "yes" is selected), only targets for which the target field name exactly matches a field name of the foreign key candidate (e.g., "StateProvinceID") are shown.

Figure 16:
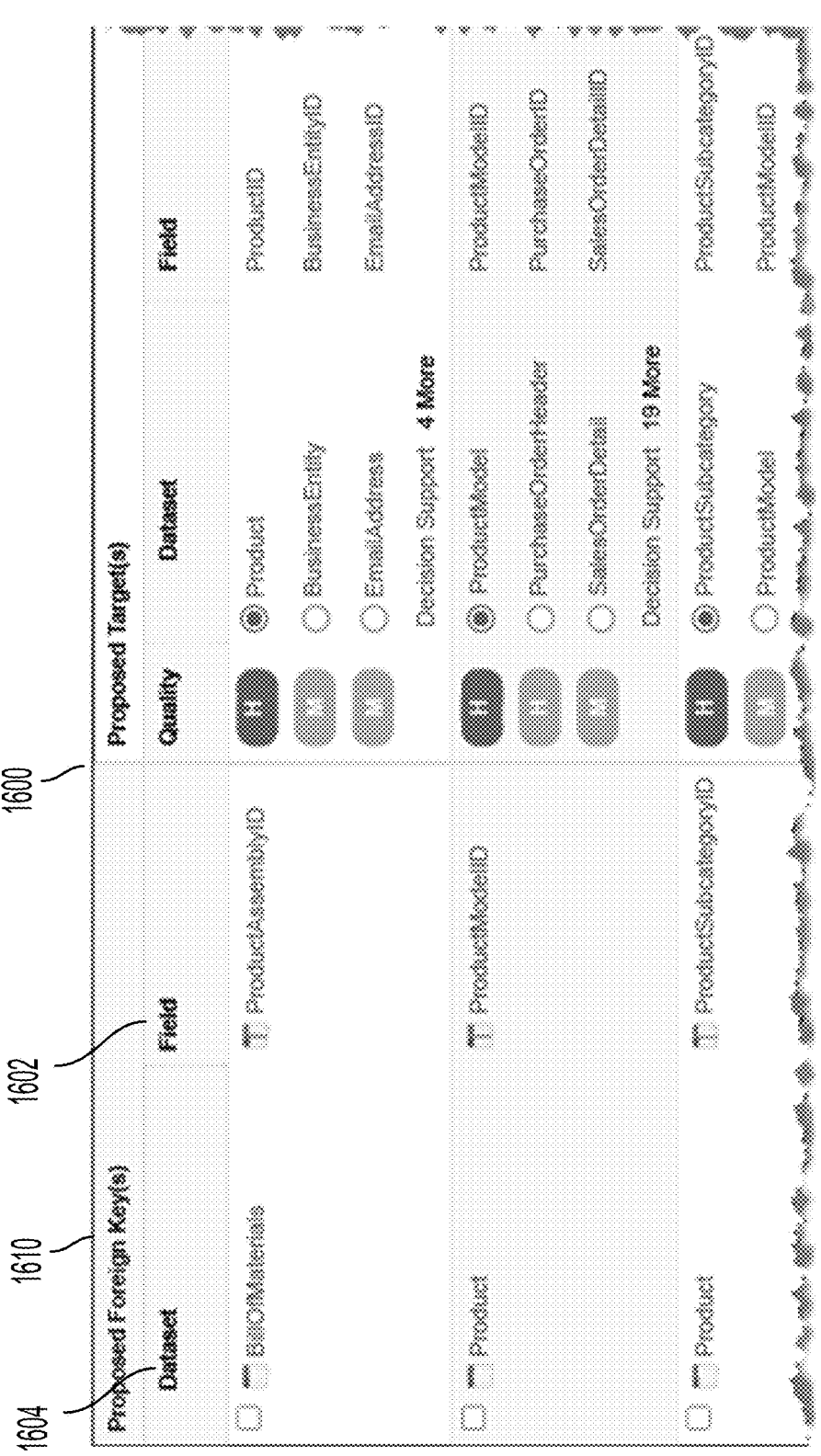
FIG. 16 is an example graphical user interface showing a filtered results of foreign key discovery, in accordance with some aspects of the technology described herein.

In some embodiments, GUI 1504 may include a text entry GUI element 1506 that allows a user to specify criteria for filtering or refining the key discovery results. For example, user 102 may enter the string "product" in the GUI element 1506. This may cause the key discovery results to be filtered such that the filtered results include only foreign key candidates that include the string "product" in either the field name or the dataset name. FIG. 16 shows a GUI 1600 that displays the filtered results. As can be seen in GUI portion 1610 of GUI 1600, either the dataset name shown in column 1604 or the field name shown in column 1602 includes the string "product".

Figure 17:
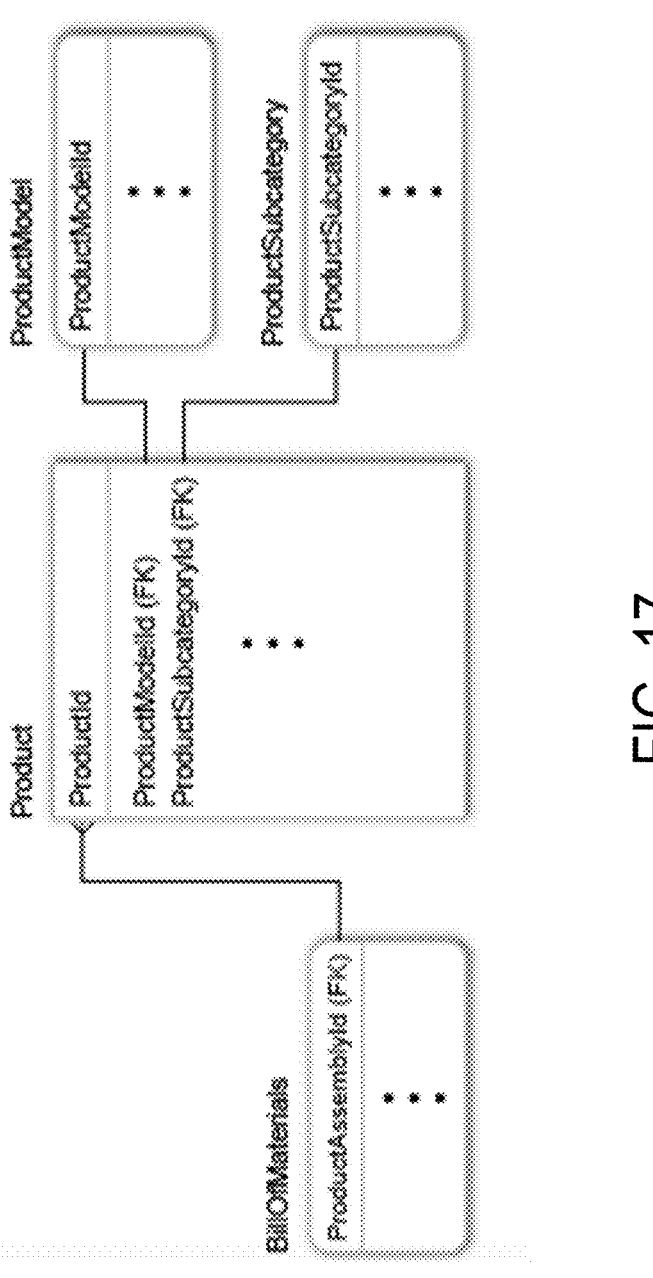
FIG. 17 is a diagram showing an example of relationships established between relational datasets in response to approval of some of the results of foreign key discovery, in accordance with some aspects of the technology described herein.

In some embodiments, a determination may be made that all three foreign key candidates shown in FIG. 16 can serve as foreign keys because of one or more factors such as, all three foreign key candidates have unambiguous high quality targets. Another factor is that the field "ProductModelID" and "ProductSubCatergoryID" in the Product dataset references an identically named field in the ProductModel and ProductSubcategory datasets, respectively. In some embodiments, the three foreign key candidates, if submitted and approved, establish the relationships shown in FIG. 17.

Figure 18:
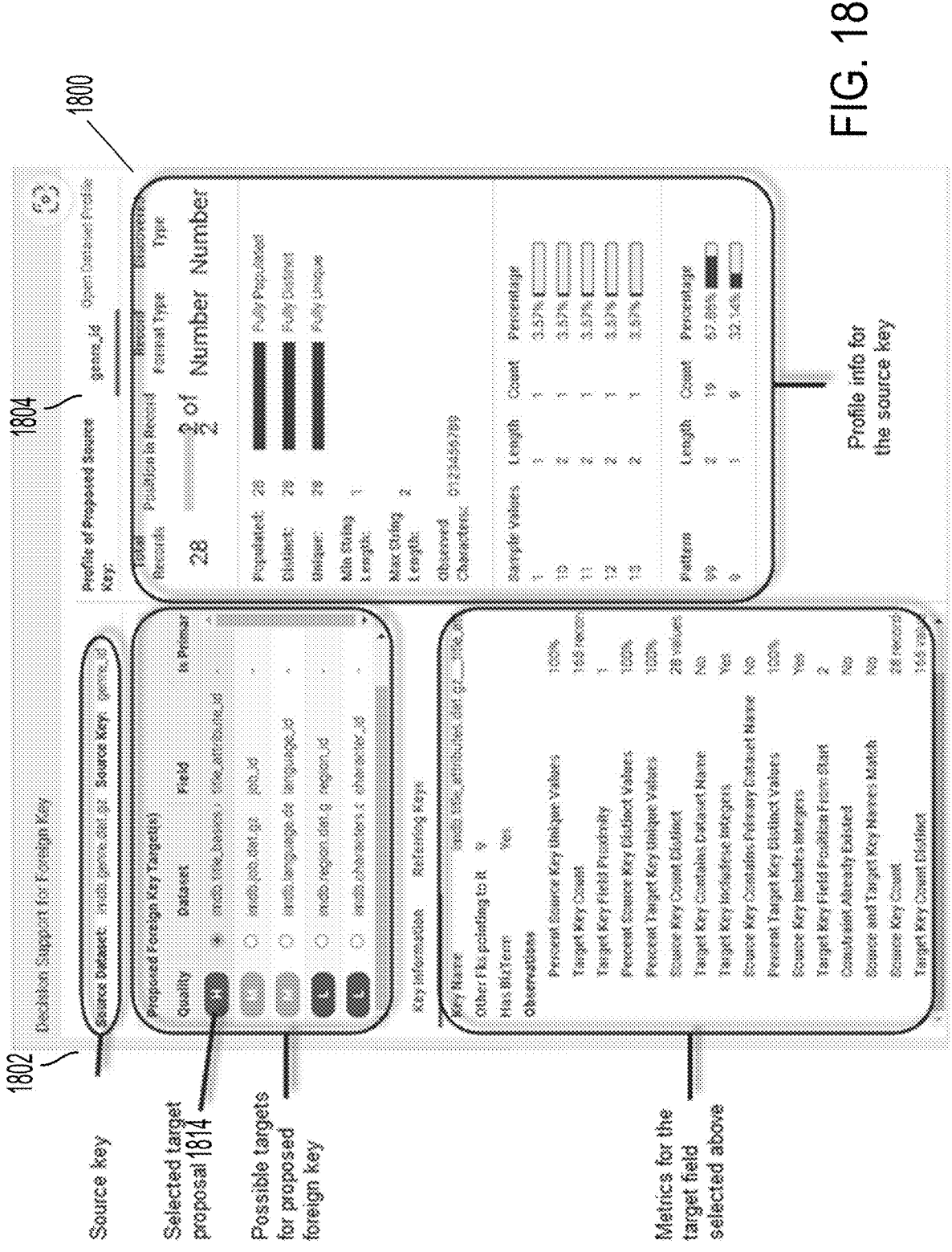
FIG. 18 is an example graphical user interface showing supporting information relating to a foreign key candidate discovered by the key discovery system, in accordance with some aspects of the technology described herein.

FIG. 18 shows a GUI 1800 that includes additional supporting information that may assist the user in determining whether the foreign key candidate "genre_id" can serve as a foreign key for the dataset "imdb.genre.dat.gz". GUI 1800 includes a first portion 1802 and a second portion 1804. First portion 1802 includes a listing of possible targets for the foreign key candidate "genre_id" along with information regarding the targets. For example, first portion 1802 shows key information such as key name, number of referring keys, and/or other observations for target 1814. Selection of a different target may cause the key information to be updated to reflect the information for that target. The second portion 1804 of GUI 800 includes information about the foreign key candidate "genre_id". This information may be obtained using the data profile of the dataset "imdb. genre.dat.gz", such as length, content, count of field values, patterns identified in those values, and/or other information. In some embodiments, information displayed via GUI 17 and/or GUI 18 may guide the user to select a particular foreign key candidate as the foreign key for the dataset.

It will be appreciated that the techniques described herein may be used to discover primary, unique, and/or foreign key candidates for any suitable type of dataset or data structure (e.g., hierarchical, flat-file and/or other types of non-tabular datasets/data structures). For example, the techniques may be used to discover keys for datasets or data structures for which initially designed key information is lost (e.g., as part of data migration or translation between formats). In some cases, such datasets/data structures may live outside the database in implementations that do not keep track of the key information (e.g., data lake implementations). The key discovery techniques described herein may be used to discover key relationships for such datasets/data structures.

Use Cases

The techniques described herein may be used in a variety of scenarios including, but not limited to the scenarios described in this section.

Auto-Join Relational Datasets Using Discovered Keys

In some embodiments, the primary and foreign keys discovered using the key discovery techniques described herein may be used to automatically perform a join operation on two or more relational datasets. For example, two or more tables may be automatically joined based on the values of their primary and foreign key columns. Aspects of auto-joining relational datasets are described herein including with reference to FIG. 5E.

In some embodiments, primary key candidates and foreign key candidates may be identified using the techniques described herein. The data processing system may be configured to indicate a particular primary key candidate as the primary key for a first relational dataset. The data processing system may be further configured to indicate a particular foreign key candidate as the foreign key for a second relational dataset. The configuring may include storing a first variable whose value indicates that the particular primary key candidate is the primary key for the first relational dataset and storing a second variable whose value indicates that the particular foreign key candidate is the foreign key for the second relational dataset. Such values maybe stored for various relational datasets managed by the data processing system. Subsequently, the stored values may be used to automatically perform join operations on two more relational datasets.

In some embodiments, the stored values may be part of schema and/or logical data that is generated based on information about the various datasets managed by the data processing system. The stored values may be accessed by a graph generator that generates a dataflow graph including a plurality of components representing a plurality of operations to be performed on input data. Aspects of the schema, logical data, and graph generator are described in U.S. Patent Publication No. 2022/0147529, entitled "GENERATION OF OPTIMIZED LOGIC FROM A SCHEMA", which is incorporated herein by reference in its entirety. One of the components of the dataflow graph may include a component representing a join operation that combines records from first and second relational datasets. This join component may be automatically configured to access the stored values and use the primary key of the first relational dataset and a foreign key of the second relational dataset to perform the join operation on the first and second relational datasets.

Identifying Data Quality Violations in Relational Datasets Using Discovered Keys In some embodiments, the primary and foreign keys discovered using the key discovery techniques described herein may be used to identify data quality violations in relational datasets. The discovered primary keys may help maintain entity integrity and the discovered foreign keys help maintain referential integrity in relational datasets. Aspects of identifying data quality violations in relational datasets are described herein including with reference to FIG. 5D.

Entity integrity refers to the uniqueness of rows in a relational dataset, such as a table. Enforcing primary key constraints ensures that no two rows have the same primary key value, which prevents duplicate records, thereby maintaining entity integrity. When a column or combination of columns that uniquely identifies each row in the table is discovered as a primary key for the table, any insertions or updates to the table can be analyzed to ensure that they satisfy the primary key constraints. For example, if a row added to the table includes a primary key value that does not satisfy the uniqueness constraint, that row may be identified as a data quality violation. Remedial actions such as, removing the row from the table, or flagging the row for further review may be taken in response to the identification of the violation.

In some embodiments, the data processing system may (1) receive a request to modify a first relational dataset; (2) determine whether modifying the first relational dataset renders the primary key unsuitable as a primary key (e.g., causes a uniqueness constraint associated with the primary key to be violated); (3) in response to determining that modifying the first relational dataset renders the primary key unsuitable as the primary key, deny the request to modify the first relational dataset; and (4) in response to determining that modifying the record in the first relational dataset does not render the primary key unsuitable as the primary key, grant the request to modify the first relational dataset. In some embodiments, the uniqueness constraint is violated when the primary key does not uniquely identify each record in the first relational dataset.

Referential integrity refers to the consistency of relationships between relational datasets, such as tables. Enforcing foreign key constraints ensures that any value in the foreign key column(s) must either match a value in the referenced primary key column(s) or be null. When a column in a first table that refers to the primary key in a second table is discovered as the foreign key for the first table, any insertions or updates to the first table can be analyzed to ensure that they satisfy the foreign key constraints. For example, if a row added to the first table includes a foreign key value that is not null and/or does not match a referenced primary key value, that row may be identified as a data quality violation. Remedial actions such as, removing the row from the first table, or flagging the row for further review may be taken in response to the identification of the violation.

In some embodiments, the data processing system may (1) receive a request to modify a second relational dataset; (2) determine whether modifying the second relational dataset renders the foreign key unsuitable as a foreign key (e.g., causes a foreign key constraint to be violated); (3) in response to determining that modifying the second relational dataset renders the foreign key unsuitable as the foreign key, deny the request to modify the second relational dataset; and (4) in response to determining that modifying the record in the second relational dataset does not render the foreign key unsuitable as the foreign key, grant the request to modify the second relational dataset. In some embodiments, the foreign key for the second relational dataset references a primary key for a first relational dataset and the foreign key constraint is violated when values of data stored in the foreign key is not a subset of values of data stored in the primary key for the first relational dataset.

Propagating Business Terms Across Relational Datasets Using Discovered Keys

In some embodiments, the data profiles described herein may be used to identify labels for fields of the relational datasets. The labels for the fields may provide information about the data content stored in the data fields. The information can indicate what kind of data content is included in the fields (e.g., phone numbers, first names, dates, etc.). To do this labeling, a descriptive definition may be mapped to the fields of the dataset, such as by assigning business terms to the fields of the dataset. A business term assigned to a field refers to a semantic label that indicates a semantic meaning of the field. For example, a column name "ccnumber" of a table may store credit card numbers of customers of an organization. Based on the analysis of the data profile of the table and/or the column name and its values, the column may be mapped to a business term "credit card," thereby allowing for business information to be readily ascertained based on the mapping. Aspects of propagating semantic labels across relational datasets are described herein including with reference to FIG. 5C.

In some embodiments, a semantic label may be a string describing data that is assigned the semantic label. In some embodiments, a semantic label may indicate metadata beyond a descriptive string. Examples of metadata beyond a descriptive string include data quality standard(s) applicable to data, a data steward, a data owner, a location where data is stored, a functional area associated with the data, a data domain, a PII classification, a security access level of the data, a geographic location the data is associated with, and/or other metadata.

In some embodiments, assigning a semantic label to a particular dataset field maps metadata associated with the field label to the particular dataset field. For example, a semantic label may be associated with a data quality standard. A data quality standard associated with a given semantic label is applied to all dataset fields that are assigned the semantic label. Thus, a sematic label allows a data processing system to apply a data quality standard to multiple dataset fields that need to be governed by the data quality standard without requiring the data quality standard to be mapped directly to each of the multiple dataset fields, which would be computationally expensive to do given the large number of dataset fields. Moreover, a data quality standard associated with a semantic label may automatically be associated with new or updated dataset fields that are assigned the semantic label. The semantic label thus allows mappings of the data quality standard and dataset semantic labels to dynamically update in response to addition or modification of data (e.g., that causes a new dataset field to be assigned the label).

In some embodiments, the data processing system may need to ascertain information about data (information about data may be referred to as "metadata") stored in one or more fields of datasets to perform various functions and/or for certain applications. The data processing system may be configured to apply metadata-based logic to the datasets. Metadata-based logic may include any logic defined based on metadata about a dataset field. For example, metadata-based logic may be employed by a software application to determine how the software application processes data from the dataset field. As another example, metadata-based logic may determine to apply masking to data from a field based on metadata about the field indicating that the field stores PII. As another example, metadata-based logic may determine to apply data quality controls to data from a field based on metadata about the field indicating that it stores a particular type of value (e.g., an email address, a telephone number, a state code, or other type of value).

When a dataset field is assigned a semantic label, the data processing system may use metadata about the dataset field indicated by the semantic label for various applications. For example, the data processing system may use the metadata to identify relationships between the dataset field and other dataset fields. As another example, the data processing system may use metadata about a dataset field to automatically generate lineage information about the dataset field that indicates how the dataset field was obtained, how the dataset field may change over time, and/or how the dataset field may be used by one or more processes over time. Lineage information for a dataset field may include upstream lineage information indicating how the dataset field was obtained (e.g., by identifying data source(s) and/or data processing operation(s) that have been applied to the dataset field). Lineage information for a dataset field may additionally or alternatively indicate downstream lineage information indicating one or more other dataset fields and/or processes that depend on and/or use the dataset field. As another example, the data processing system may apply a data standard associated with a semantic label to all fields to which the field label is assigned. The data standard may indicate data quality requirements that must be met by dataset fields to which the data standard is applied in order to comply with the data standard. When a dataset field fails to meet the data quality requirements, the dataset field may, for example, be updated or flagged for further review. Accordingly, semantic label assignments may be used by the data processing system to ensure consistent data quality across all the data managed by the data processing system.

In some embodiments, metadata about a dataset field indicated by a semantic label assigned to the dataset field may further be used by software application(s) in processing data from the dataset field. For example, a software application may need to recognize that data stored in a dataset field includes personally identifiable information (PII) (e.g., social security numbers, bank account numbers, government ID numbers, and/or other PII) to trigger functionality that is appropriate for such PII data (e.g., anonymizing data stored in the dataset field (e.g., by masking), restricting access to such data, de-identifying such data, etc.). As another example, a software application may need to recognize a category of data (e.g., a phone number social security number, name, address, and/or other categories of data) stored in a dataset field to determine how to format the data and/or how the data should be formatted (e.g., to meet a data quality standard.

In some embodiments, when a foreign key is discovered, a semantic label mapped to the primary key of the referenced table can be propagated to the foreign key column. For example, a first column in a first table may be discovered as a primary key for the first table and a second column in a second table may be discovered as a foreign key for the second table. If the first column in the first table is mapped to a business term, the second column in the second table may also be mapped to the same business term.

In some embodiments, a data profile of a relational dataset may be used to identify a semantic meaning for a field (column) identified as the primary key of the relational dataset. The data profile of the relational dataset may be analyzed to generate one or more business term proposals for the primary key column. Aspects of identifying business term proposals for fields of relational datasets using semantic discovery techniques are described in U.S. Patent Application No. 2020/0380212, entitled "DISCOVERING A SEMANTIC MEANING OF DATA FIELDS FROM PROFILE DATA OF THE DATA FIELDS," which is incorporated herein by reference in its entirety.

In some embodiments, one of the one or more business term proposals may be selected as a business term to be mapped to the primary key column of the relational dataset. In some embodiments, the selection may be performed automatically by the system. For example, a score may be determined for each business term proposal, where the score is indicative of an extent to which the business term proposal can serve as a semantic meaning for the primary key column. The system may automatically select a particular business term proposal from among the generated business term proposals based on the scores. For example, a business term proposal with a higher score (e.g., 0.8 or higher in the range of 0-1) may be selected over a business term proposal with a lower score (e.g., lower than 0.8). In other embodiments, the selection may be made by a user. For example, the generated business proposals may be presented to the user via a user interface and the user may be prompted to select a particular business proposal from among the generated business proposals. In yet other embodiments, the system may first filter the generated business term proposals based on the scores such that a subset of the generated business term proposals is presented to the user for validation. For example, business term proposals with respective scores of 0.8 or higher may be presented to the user for validation. The user may then select one of these business term proposals as the business term for the primary key column.

In some embodiments, a business term mapped to column identified as a primary key of a first relational dataset may be used to assign the business term to a column identified as a foreign key of a second relational dataset. In some embodiments, the data profile of the second relational dataset may be analyzed to generate one or more business term proposals for the foreign key column. In addition, the business term mapped to the primary key column may be propagated to the foreign key column by adding a new propagated business term proposal for the foreign key column.

In some embodiments, one of the one or more business term proposals may be selected as a business term to be mapped to the foreign key column of the second relational dataset. As explained above, this selection may be performed automatically by the system, manually by a user, and/or a combination of the two.

In some embodiments, information regarding the business term propagation may be stored. This information may include, for each business term proposal, a source of the business term proposal (e.g., the primary key whose business term is propagated), a target column (e.g., the foreign key column) to which the business term is propagated, and/or the propagated business term.

Additional Implementation Detail

Figure 19:
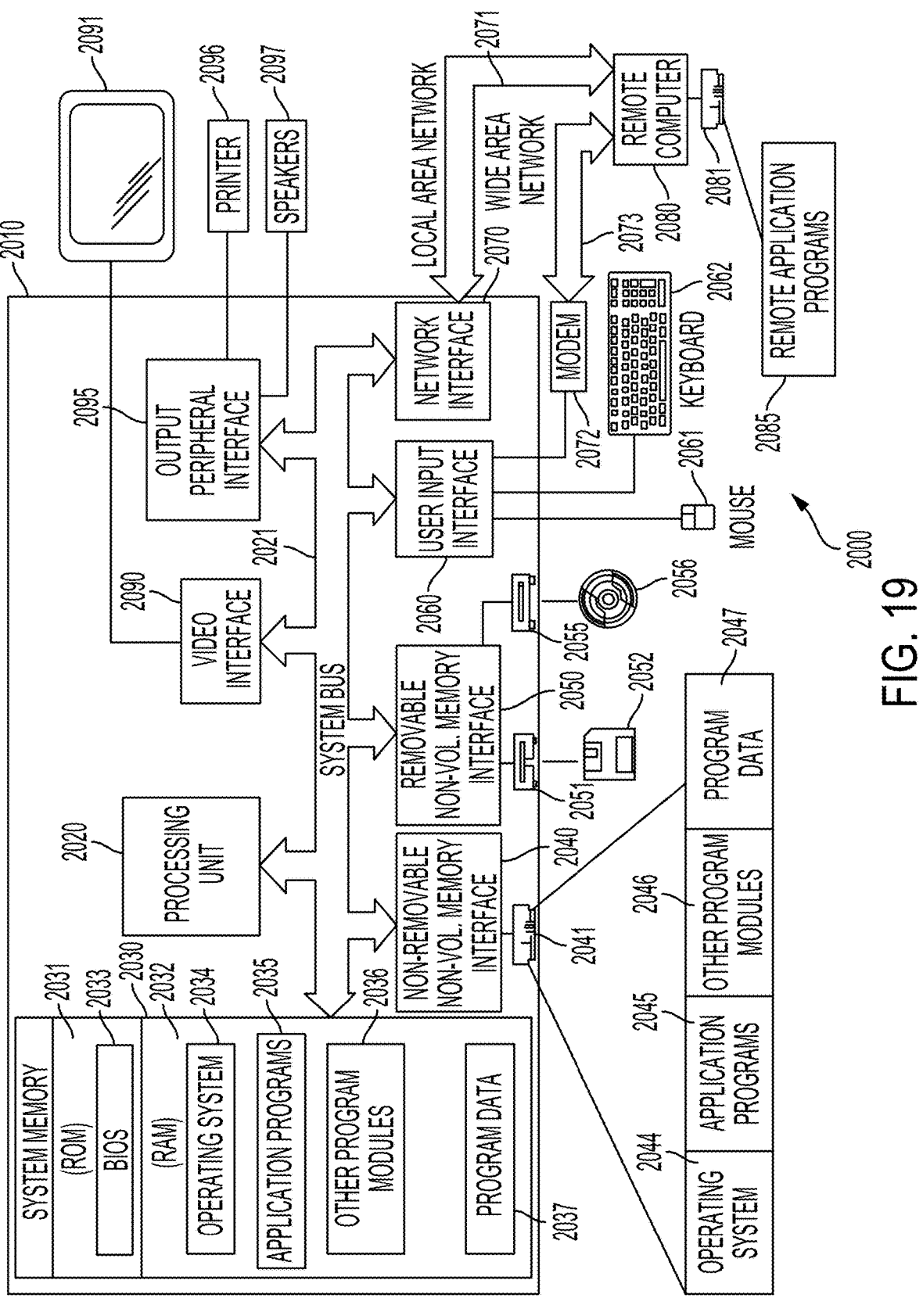
FIG. 19 is a block diagram of an illustrative computing system environment that may be used in implementing some aspects of the technology described herein.

FIG. 19 illustrates an example of a suitable computing system environment 2000 on which the technology described herein may be implemented. The computing system environment 2000 is only one example of a suitable computing environment and is not intended to suggest any limitation as to the scope of use or functionality of the technology described herein. Neither should the computing environment 2000 be interpreted as having any dependency or requirement relating to any one or combination of components illustrated in the exemplary operating environment 2000.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 19, an exemplary system for implementing the technology described herein includes a general purpose computing device in the form of a computer 2010. Components of computer 2010 may include, but are not limited to, a processing unit 2020, a system memory 2030, and a system bus 2021 that couples various system components including the system memory to the processing unit 2020. The system bus 2021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2010 typically includes a variety of computer readable media. Computer readable media can be any available media that can be accessed by computer 2010 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2030 includes computer storage media in the form of volatile and/or nonvolatile memory such as read only memory (ROM) 2031 and random access memory (RAM) 2032. A basic input/output system 2033 (BIOS), containing the basic routines that help to transfer information between elements within computer 2010, such as during start-up, is typically stored in ROM 2031. RAM 2032 typically contains data and/or program modules that are immediately accessible to and/or presently being operated on by processing unit 2020. By way of example, and not limitation, FIG. 19 illustrates operating system 2034, application programs 2035, other program modules 2036, and program data 2037.

The computer 2010 may also include other removable/non-removable, volatile/nonvolatile computer storage media. By way of example only, FIG. 19 illustrates a hard disk drive 2041 that reads from or writes to non-removable, nonvolatile magnetic media, a flash drive 2051 that reads from or writes to a removable, nonvolatile memory 2052 such as flash memory, and an optical disk drive 2055 that reads from or writes to a removable, nonvolatile optical disk 2056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2041 is typically connected to the system bus 2021 through a non-removable memory interface such as interface 2040, and magnetic disk drive 2051 and optical disk drive 2055 are typically connected to the system bus 2021 by a removable memory interface, such as interface 2050.

The drives and their associated computer storage media described above and illustrated in FIG. 19, provide storage of computer readable instructions, data structures, program modules and other data for the computer 2010. In FIG. 19, for example, hard disk drive 2041 is illustrated as storing operating system 2044, application programs 2045, other program modules 2046, and program data 2047. Note that these components can either be the same as or different from operating system 2034, application programs 2035, other program modules 2036, and program data 2037. Operating system 2044, application programs 2045, other program modules 2046, and program data 2047 are given different numbers here to illustrate that, at a minimum, they are different copies. An actor may enter commands and information into the computer 2010 through input devices such as a keyboard 2062 and pointing device 2061, commonly referred to as a mouse, trackball or touch pad. Other input devices (not shown) may include a microphone, joystick, game pad, satellite dish, scanner, or the like. These and other input devices are often connected to the processing unit 2020 through a user input interface 2060 that is coupled to the system bus, but may be connected by other interface and bus structures, such as a parallel port, game port or a universal serial bus (USB). A monitor 2091 or other type of display device is also connected to the system bus 2021 via an interface, such as a video interface 2090. In addition to the monitor, computers may also include other peripheral output devices such as speakers 2097 and printer 2096, which may be connected through an output peripheral interface 2095.

The computer 2010 may operate in a networked environment using logical connections to one or more remote computers, such as a remote computer 2080. The remote computer 2080 may be a personal computer, a server, a router, a network PC, a peer device or other common network node, and typically includes many or all of the elements described above relative to the computer 2010, although only a memory storage device 2081 has been illustrated in FIG. 19. The logical connections depicted in FIG. 19 include a local area network (LAN) 2071 and a wide area network (WAN) 2073, but may also include other networks. Such networking environments are commonplace in offices, enterprise-wide computer networks, intranets and the Internet.

When used in a LAN networking environment, the computer 2010 is connected to the LAN 2071 through a network interface or adapter 2070. When used in a WAN networking environment, the computer 2010 typically includes a modem 2072 or other means for establishing communications over the WAN 2073, such as the Internet. The modem 2072, which may be internal or external, may be connected to the system bus 2021 via the actor input interface 2060, or other appropriate mechanism. In a networked environment, program modules depicted relative to the computer 2010, or portions thereof, may be stored in the remote memory storage device. By way of example, and not limitation, FIG. 19 illustrates remote application programs 2085 as residing on memory device 2081. It will be appreciated that the network connections shown are exemplary and other means of establishing a communications link between the computers may be used.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Having thus described several aspects of at least one embodiment of the technology described herein, it is to be appreciated that various alterations, modifications, and improvements are possible.

For example, any suitable type of GUI element may be used in the various GUIs described herein. As another example, the techniques described herein may be used to discover keys for any suitable type of relational dataset or other type of dataset.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 5A and 5B. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for identifying labels for keys discovered for multiple relational datasets managed by a data processing system, the method comprising:

using at least one computer hardware processor to perform:

identifying primary key candidates for a first relational dataset using a first data profile generated using values of entries in fields of the first relational dataset and a first trained machine learning (ML) model trained to score primary key proposals for a relational dataset using feature values obtained using a data profile generated from the relational dataset, wherein identifying the primary key candidates comprises:

generating, from the first data profile, sets of primary key feature values for respective primary key proposals, each of the primary key proposals corresponding to one or more fields of the first relational dataset; and processing the sets of primary key feature values using parameter values of the first trained ML model to obtain outputs indicating an extent to which the primary key proposals can serve as primary keys for the first relational dataset;

identifying foreign key candidates for a second relational dataset using the first data profile, a second data profile generated using values of entries in fields of the second relational dataset, and a second trained ML model different from the first trained ML model, the second trained ML model trained to score foreign key proposals, wherein identifying the foreign key candidates comprises:

generating, from the first data profile and the second data profile, sets of foreign key feature values for respective foreign key proposals, each of the foreign key proposals corresponding to one or more fields of the second relational dataset; and processing the sets of foreign key feature values using parameter values of the second trained ML model to obtain outputs indicating an extent to which the foreign key proposals can serve as foreign keys for the second relational dataset;

identifying, from among the primary key candidates, a primary key for the first relational dataset, the primary key being associated with a first field in the first relational dataset;

identifying, from among the foreign key candidates, a foreign key for the second relational dataset, wherein the foreign key is associated with a second field in the second relational dataset and references the primary key for the first relational dataset;

determining whether the first field in the first relational dataset is associated with a semantic label that indicates a semantic meaning of the first field; and when the first field of the first relational dataset, with which the primary key is associated, is determined to be associated with the semantic label, assigning the semantic label to the second field of the second relational dataset with which the foreign key is associated.

2. The method of claim 1, further comprising generating data profiles for the multiple relational datasets, the generating comprising:

analyzing data stored in each of the multiple relational datasets to generate respective data profiles including the first and second data profiles for the respective first and second relational datasets, the analyzing comprising determining statistical attributes for the fields of the first and second relational datasets from values of entries in the fields.

3. The method of claim 1, wherein identifying the primary key candidates comprises:

determining scores for the respective primary key proposals by processing the sets of primary key feature values using the parameter values of the first trained ML model, wherein the scores for the primary key proposals are indicative of the extent to which the primary key proposals can serve as primary keys for the first relational dataset.

4. The method of claim 1, further comprising:

identifying the foreign key proposals for the second relational dataset using the primary key candidates for the first relational dataset by performing a subset analysis of the second relational dataset with respect to the first relational dataset.

5. The method of claim 4, wherein performing the subset analysis comprises:

determining whether values of data stored in a field of the second relational dataset are a subset of values of data stored in a primary key candidate for the first relational dataset; and identifying the field of the second relational dataset as a foreign key proposal for the second relational dataset when the values of data stored in the field of the second relational dataset are a subset of the values of data stored in the primary key candidate for the first relational dataset.

6. The method of claim 1, wherein identifying the foreign key candidates for the second relational dataset comprises:

determining scores for respective foreign key proposals by processing the sets of foreign key feature values using the parameter values of the second trained ML model, wherein the scores for the foreign key proposals are indicative of the extent to which the foreign key proposals can serve as foreign keys for the second relational dataset that references a particular primary key candidate for the first relational dataset.

7. The method of claim 1, further comprising:

outputting the primary key candidates and the foreign key candidates.

8. The method of claim 3, wherein outputting the primary key candidates and the foreign key candidates comprises:

generating a graphical user interface displaying the primary key candidates and a quality rating of each of the primary key candidates that is determined based on the scores; and generating a graphical user interface displaying the foreign key candidates, one or more primary key targets for each foreign key candidate of the foreign key candidates, and a quality rating of each of the one or more primary key targets.

9. The method of claim 8, further comprising:

receiving, via the graphical user interface, a selection of a particular primary key candidate from the displayed primary key candidates as the primary key for the first relational dataset; and in response to receiving the selection of the particular primary key candidate as the primary key for the first relational dataset:

configuring the data processing system to indicate the selected particular primary key candidate as the primary key for the first relational dataset, wherein the configuring comprises storing a variable whose value indicates that the selected particular primary key candidate is the primary key for the first relational dataset.

10. The method of claim 9, further comprising:

receiving, for each foreign key candidate of the displayed foreign key candidates and via the graphical user interface, a selection of a primary key target from among the one or more primary key targets; and in response to receiving, for a first foreign key candidate, a selection of a first primary key target from among the one or more primary key targets, identifying the first foreign key candidate as the foreign key for the second relational dataset, and configuring the data processing system to indicate the first foreign key candidate as the foreign key for the second relational dataset, wherein the configuring comprises storing a variable whose value indicates the first foreign key candidate is the foreign key for the second relational dataset, wherein the first primary key target is the primary key for the first relational dataset.

11. A system comprising:

at least one computer hardware processor; and at least one non-transitory computer-readable storage medium storing instructions that, when executed by the at least one computer hardware processor, cause the at least one computer hardware processor to perform a method for identifying labels for keys discovered for multiple relational datasets managed by a data processing system, the method comprising:

identifying primary key candidates for a first relational dataset using a first data profile generated using values of entries in fields of the first relational dataset and a first trained machine learning (ML) model trained to score primary key proposals for a relational dataset using feature values obtained using a data profile generated from the relational dataset, wherein identifying the primary key candidates comprises:

generating, from the first data profile, sets of primary key feature values for respective primary key proposals, each of the primary key proposals corresponding to one or more fields of the first relational dataset; and processing the sets of primary key feature values using parameter values of the first trained ML model to obtain outputs indicating an extent to which the primary key proposals can serve as primary keys for the first relational dataset;

identifying foreign key candidates for a second relational dataset using the first data profile, a second data profile generated using values of entries in fields of the second relational dataset, and a second trained ML model different from the first trained ML model, the second trained ML model trained to score foreign key proposals, wherein identifying the foreign key candidates comprises:

generating, from the first data profile and the second data profile, sets of foreign key feature values for respective foreign key proposals, each of the foreign key proposals corresponding to one or more fields of the second relational dataset; and processing the sets of foreign key feature values using parameter values of the second trained ML model to obtain outputs indicating an extent to which the foreign key proposals can serve as foreign keys for the second relational dataset;

identifying, from among the primary key candidates, a primary key for the first relational dataset, the primary key being associated with a first field in the first relational dataset;

identifying, from among the foreign key candidates, a foreign key for the second relational dataset, wherein the foreign key is associated with a second field in the second relational dataset and references the primary key for the first relational dataset;

determining whether the first field in the first relational dataset is associated with a semantic label that indicates a semantic meaning of the first field; and when the first field of the first relational dataset, with which the primary key is associated, is determined to be associated with the semantic label, assigning the semantic label to the second field of the second relational dataset with which the foreign key is associated.

12. The system of claim 11, wherein the method further comprises:

executing one or more database queries with respect to the first relational dataset and the second relational dataset using the primary key for the first relational dataset and the foreign key for the second relational dataset.

13. The system of claim 11, wherein identifying the primary key candidates comprises:

determining scores for the respective primary key proposals by processing the sets of primary key feature values using the parameter values of the first trained ML model, wherein the scores for the primary key proposals are indicative of the extent to which the primary key proposals can serve as primary keys for the first relational dataset.

14. The system of claim 11, wherein the method further comprises:

identifying the foreign key proposals for the second relational dataset using the primary key candidates for the first relational dataset by performing a subset analysis of the second relational dataset with respect to the first relational dataset.

15. The system of claim 14, wherein performing the subset analysis comprises:

determining whether values of data stored in a field of the second relational dataset are a subset of values of data stored in a primary key candidate for the first relational dataset; and identifying the field of the second relational dataset as a foreign key proposal for the second relational dataset when the values of data stored in the field of the second relational dataset are a subset of the values of data stored in the primary key candidate for the first relational dataset.

16. The system of claim 11, wherein identifying the one or more foreign key candidates for the second relational dataset comprises:

determining scores for the foreign key proposals by processing the sets of foreign key feature values using the parameter values of the second trained ML model, wherein the scores for the foreign key proposals are indicative of the extent to which the foreign key proposals can serve as foreign keys for the second relational dataset that references a particular primary key candidate for the first relational dataset.

17. The system of claim 13, wherein the method further comprises:

outputting the primary key candidates and the foreign key candidates, wherein the outputting comprises:

generating a graphical user interface displaying the primary key candidates and a quality rating of each of the primary key candidates that is determined based on the scores; and generating a graphical user interface displaying the foreign key candidates, one or more primary key targets for each foreign key candidate of the foreign key candidates, and a quality rating of each of the one or more primary key targets.

18. The system of claim 17, further comprising:

receiving, via the graphical user interface, a selection of a particular primary key candidate from the displayed primary key candidates as the primary key for the first relational dataset; and in response to receiving the selection of the particular primary key candidate as the primary key for the first relational dataset:

configuring the data processing system to indicate the selected particular primary key candidate as the primary key for the first relational dataset, wherein the configuring comprises storing a variable whose value indicates that the selected particular primary key candidate is the primary key for the first relational dataset.

19. The system of claim 18, further comprising:

receiving, for each foreign key candidate of the displayed foreign key candidates and via the graphical user interface, a selection of a primary key target from among the one or more primary key targets; and in response to receiving, for a first foreign key candidate, a selection of a first primary key target from among the one or more primary key targets, identifying the first foreign key candidate as the foreign key for the second relational dataset, and configuring the data processing system to indicate the first foreign key candidate as the foreign key for the second relational dataset, wherein the configuring comprises storing a variable whose value indicates the first foreign key candidate is the foreign key for the second relational dataset,

US 12,688,166 B2

77 wherein the first primary key target is the primary key for the first relational dataset.

20. At least one non-transitory computer-readable storage medium storing instructions that, when executed by at least one computer hardware processor, cause the at least one computer hardware processor to perform a method for identifying labels for keys discovered for multiple relational datasets managed by a data processing system, the method comprising:

identifying primary key candidates for a first relational dataset using a first data profile generated using values of entries in fields of the first relational dataset and a first trained machine learning (ML) model trained to score primary key proposals for a relational dataset using feature values obtained using a data profile generated from the relational dataset, wherein identifying the primary key candidates comprises:

generating, from the first data profile, sets of primary key feature values for respective primary key proposals, each of the primary key proposals corresponding to one or more fields of the first relational dataset; and processing the sets of primary key feature values using parameter values of the first trained ML model to obtain outputs indicating an extent to which the primary key proposals can serve as primary keys for the first relational dataset;

identifying foreign key candidates for a second relational dataset using the first data profile, a second data profile generated using values of entries in fields of the second relational dataset, and a second trained ML model different from the first trained ML model, the second trained ML model trained to score foreign key proposals, wherein identifying the foreign key candidates comprises:

generating, from the first data profile and the second data profile, sets of foreign key feature values for respective foreign key proposals, each of the foreign key proposals corresponding to one or more fields of the second relational dataset; and processing the sets of foreign key feature values using parameter values of the second trained ML model to obtain outputs indicating an extent to which the foreign key proposals can serve as foreign keys for the second relational dataset;

identifying, from among the primary key candidates, a primary key for the first relational dataset, the primary key being associated with a first field in the first relational dataset;

identifying, from among the foreign key candidates, a foreign key for the second relational dataset, wherein the foreign key is associated with a second field in the second relational dataset and references the primary key for the first relational dataset;

determining whether the first field in the first relational dataset is associated with a semantic label that indicates a semantic meaning of the first field; and when the first field of the first relational dataset, with which the primary key is associated, is determined to be associated with the semantic label, assigning the semantic label to the second field of the second relational dataset with which the foreign key is associated.

* * * * *